US009846507B2

(12) United States Patent
Heo et al.

(10) Patent No.: US 9,846,507 B2
(45) Date of Patent: Dec. 19, 2017

(54) MOBILE TERMINAL AND CONTROL METHOD THEREOF

(71) Applicant: LG ELECTRONICS INC., Seoul (KR)

(72) Inventors: Jeongyun Heo, Seoul (KR); Junghoon Chu, Seoul (KR); Hyungtae Jang, Seoul (KR); Minhun Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 14/818,127

(22) Filed: Aug. 4, 2015

(65) Prior Publication Data
US 2016/0283020 A1 Sep. 29, 2016

(30) Foreign Application Priority Data

Mar. 23, 2015 (KR) .......................... 10-2015-0040232

(51) Int. Cl.
*G06F 3/041* (2006.01)
*G06F 3/0488* (2013.01)
*G06F 3/0481* (2013.01)
*G06F 1/16* (2006.01)
*G06F 3/01* (2006.01)
(Continued)

(52) U.S. Cl.
CPC ............ *G06F 3/0416* (2013.01); *G06F 1/163* (2013.01); *G06F 1/1643* (2013.01); *G06F 3/017* (2013.01); *G06F 3/0412* (2013.01); *G06F 3/04817* (2013.01); *G06F 3/04886* (2013.01); *G06F 3/1462* (2013.01); *H04M 1/7253* (2013.01); *G06F 2203/04102* (2013.01); *G06F 2203/04803* (2013.01); *G06F 2203/04808* (2013.01); *G09G 2340/145* (2013.01)

(58) Field of Classification Search
None
See application file for complete search history.

(56) References Cited

U.S. PATENT DOCUMENTS

| 8,811,951 B1* | 8/2014 | Faaborg ................. H04M 1/57 340/384.1 |
| 2014/0320425 A1 | 10/2014 | Jeong et al. |
| 2015/0062022 A1 | 3/2015 | Rabii |

(Continued)

OTHER PUBLICATIONS

European Patent Application No. 15181033.0, Search Report dated Sep. 23, 2016, 8 pages.

*Primary Examiner* — Tony N Ngo
(74) *Attorney, Agent, or Firm* — Lee, Hong, Degerman, Kang & Waimey

(57) ABSTRACT

The present disclosure relates to a mobile terminal for transmitting and receiving data using a wireless communication module and a control method thereof, and there is provided a mobile terminal for performing a notification display function in cooperation with a wireless communication unit, a touch screen and a controller, wherein the controller performs the notification display function through the steps of receiving notification information for notifying that information satisfying a preset condition is displayed on the other terminal, from the other terminal connected thereto in a wireless manner, and controlling the touch screen to display visual information indicating that information satisfying the preset condition is displayed on the transmitting terminal based on the notification information.

20 Claims, 36 Drawing Sheets

(51) Int. Cl.
*G06F 3/14* (2006.01)
*H04M 1/725* (2006.01)

(56) References Cited

U.S. PATENT DOCUMENTS

| 2015/0098309 | A1* | 4/2015 | Adams | G04G 9/0064 |
| | | | | 368/10 |
| 2016/0135023 | A1* | 5/2016 | Schmit | H04W 4/16 |
| | | | | 455/417 |

* cited by examiner

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Patent Application No. 10-2015-0040232, filed on Mar. 23, 2015, the contents of which are hereby incorporated by reference herein in its entirety.

BACKGROUND OF THE INVENTION

1. Field of the Invention

The present disclosure relates to a mobile terminal in which the use of a terminal is implemented in more consideration of user's convenience and a control method thereof. More particularly, the present disclosure relates to a mobile terminal for transmitting and receiving data using a wireless communication module and a control method thereof.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, for example, such a terminal is allowed to capture still images or moving images, play music or video files, play games, receive broadcast and the like, so as to be implemented as an integrated multimedia player. In order to support and enhance the functions of the terminal, the improvement of structural or software elements of the terminal may be taken into consideration.

A mobile terminal may be extended to a wearable device that can be worn on a human body beyond a dimension that it is mainly used on a user's hand by holding it. The wearable device may include a smart watch, smart glasses, a head mounted display, and the like.

A smart phone or tablet PC may be conveniently used using a touch means such as a finger, a touch pen or the like, but also have inconvenience in which it should be carried in a pocket or bag or carried by holding it on his or her hand.

On the contrary, a wearable device can be more easily carried than a smart phone or table PC since it can be worn on his or her wrist or worn like glasses. However, in case of a wearable device, it is worn on a user's body and thus has a relatively small size of touch screen for displaying visual information, thereby limiting the type and amount of visual information displayed on the touch screen. Furthermore, it has a small area to which a touch can be applied, thereby causing difficulty in manipulating the wearable device using a touch.

SUMMARY OF THE INVENTION

An object of the present disclosure is to solve the foregoing and other problems.

Another object of the present disclosure is to provide a mobile terminal system in which a wearable device and a mobile terminal connected in a wireless manner are operated in a mutually linked manner, thereby providing a more convenient interface for a user.

Still another object of the present disclosure is to provide a mobile terminal and a control method thereof for automatically displaying a notification when the help of the mobile terminal connected to a wearable device is required while the user uses the wearable device. In addition, an object of the present disclosure is to provide a mobile terminal and a control method thereof for displaying additional information that is not displayed on the wearable device or executing a function associated with information being displayed on the wearable device.

Yet still another object of the present disclosure is to provide a graphic user interface (GUI) capable of easily and quickly executing a file on a mobile terminal when the file that is non-executable on the wearable device should be executed (or the file that is not supported by the wearable device should be executed). Furthermore, an object of the present disclosure is to provide a mobile terminal and a control method thereof capable of generating a control command for an execution screen when the execution screen of the file is displayed on the mobile terminal.

In order to accomplish the task, A communication system according to an aspect of the present disclosure may include a first terminal comprising a display and a first wireless communication unit and a second terminal comprising a touch screen and a second wireless communication unit, wherein the second terminal is configured to communicate with the first terminal wirelessly via the second wireless communication unit, display, via the touch screen, a first notification when an event associated with an application is detected and transmit a signal to the first terminal via the second wireless communication unit to cause the display of the first terminal to display a second notification indicating that the first notification is displayed on the touch screen of the second terminal.

According to an embodiment, the first terminal is further configured to display, via the display, a third notification instead of the second notification when an execution screen of the application is displayed on the touch screen of the second terminal in response to an input received via the touch screen displaying the first notification, the third notification informing presence of extra information associated with the execution screen and a type of the extra information.

According to an embodiment, the second terminal is further configured to display, via the touch screen, first information relating to the first notification in response to a touch input applied to the touch screen displaying the first notification.

According to an embodiment, the second terminal is further configured to display, via the touch screen, an icon for performing a function related to the first information while the first information is displayed on the touch screen.

According to an embodiment, the second terminal is further configured to display, via the touch screen, a first virtual keypad in response to an input received via the icon and the first terminal is further configured to display via the display: an indicator indicating the displaying of the first virtual keypad on the touch screen of the second terminal; and a second virtual keypad in response to an input applied via the indicator such that the second virtual keypad is displayed on the display of the first terminal while the first virtual keypad is displayed on the touch screen of the second terminal.

According to an embodiment, the first terminal is further configured to display, via the display, first text generated according to an input applied via the second virtual keypad and the second terminal is further configured to display, via the touch screen, second text corresponding to the first text based on data relating to the first text, the data received from the first terminal.

According to an embodiment, the second terminal is further configured to display via the touch screen: a link associated with a file attached to the first information while the first information is displayed on the touch screen; and a first execution screen for executing the attached file in response to a touch input applied via the link.

According to an embodiment, the first terminal is further configured to display via the display: a graphic object corresponding to the link while the first information and the link are displayed on the touch screen of the second terminal such that either the link or the graphic object can be selected to execute the attached file; or the graphic object when the attached file cannot be executed at the second terminal such that a second execution screen for executing the attached file is displayed on the display of the first terminal in response to an input applied via the graphic object.

According to an embodiment, the second terminal is further configured to generate and transmit a notification end command to the first terminal when the first notification or information associated with the first notification is no longer displayed on the touch screen and the first terminal is further configured to stop the displaying, via the display, of the second notification or information related to the first notification or the second notification in response to the notification end command.

According to an embodiment, the first notification or the information associated with the first notification is no longer displayed on the touch screen of the second terminal in response to an input received at the second terminal such that the notification end command is transmitted to the first terminal in response to the input.

Furthermore, a mobile terminal according to an embodiment of the present disclosure may include a wireless communication unit configured to communicate with a second terminal, a touch screen and a controller configured to cause the touch screen to display a second notification in response to a signal received from the second terminal displaying a first notification, the first notification displayed at the second terminal when an event associated with an application is detected, and the second notification indicating that the first notification is displayed at the second terminal.

According to an embodiment, the controller is further configured to cause the touch screen to display a third notification instead of the second notification when an execution screen of the application is displayed at the second terminal in response to an input received at the second terminal displaying the first notification, the third notification informing presence of extra information associated with the execution screen and a type of the extra information.

According to an embodiment, the controller is further configured to cause the touch screen to display first information relating to the second notification in response a touch input applied to the touch screen displaying the second notification, the touch input applied while the first notification is displayed at the second terminal, and the displaying of the first information on the touch screen causing the second terminal to stop the displaying of the first notification at the second terminal.

According to an embodiment, when the second terminal displays a first virtual keypad for performing a function related to the first notification, the controller is further configured to cause the touch screen to display: an indicator indicating the displaying of the first virtual keypad at the second terminal; and a second virtual keypad in response to an input applied via the indicator such that the second virtual keypad is displayed on the touch screen while the first virtual keypad is displayed at the second terminal.

According to an embodiment, the controller is further configured to cause the touch screen to display first text generated in response to an input applied via the second virtual keypad and transmit data relating to the first text to the second terminal such that second text corresponding to the first text is displayed at the second terminal based on the data.

According to an embodiment, when first information relating to the first notification is displayed at the second terminal and the first information is associated with second information, the controller is further configured to cause the touch screen to display: a link associated with the second information; and an execution screen for executing the second information in response to a touch input applied via the link.

According to an embodiment, the second information is a file attached to the first information, and the controller is further configured to convert a format of the file from a first format that is not executable at the second terminal to a second format that is executable at the second terminal and cause the wireless communication unit to transmit the file of the second format to the second terminal.

According to an embodiment, the second information is a uniform resource locator (URL), and the controller is further configured to cause the touch screen to display a web document corresponding to the URL as the execution screen in response to the touch input applied via the link.

According to an embodiment, the signal is received when the touch screen is in an inactive state in which illumination is off, and the controller is further configured to switch at least a portion of the touch screen to an active state in which illumination is on in response to the signal and cause the touch screen to display the second notification in at least the portion of the touch screen that is in the active state.

According to an embodiment, the controller is further configured to cause the touch screen to not display the second notification and switch the touch screen to the inactive state when the second terminal no longer displays the first notification or information associated with the first notification.

A mobile terminal according to an embodiment of the present disclosure as a wearable device may include a touch screen, a wireless communication unit configured to communicate with a second terminal and a controller configured to receive a message via the wireless communication unit, cause the touch screen to display a first notification notifying the received message and cause the wireless communication unit to transmit a signal to the second terminal to notify the received message, wherein the signal causes the second terminal to display a second notification indicating that the first notification is displayed on the touch screen.

According to an embodiment, the controller is further configured to cause the wireless communication unit to transmit a file attached to the message or a link for executing the attached file to the second terminal such that an execution screen of the file is displayed at the second terminal in response to an execution command for the file received at the second terminal.

According to an embodiment, the controller is further configured to cause the touch screen to display a graphic object associated with the execution screen displayed at the second terminal.

According to an embodiment, the controller is further configured to cause the wireless communication unit to transmit a control command to the second terminal to cause the second terminal to execute a control function linked to the graphic object in response a touch applied to the graphic object.

The effects of a mobile terminal and a control method thereof according to an embodiment of the present disclosure will be described as follows.

According to at least one of the embodiments of the present disclosure, when information satisfying a preset condition is displayed on a wearable device, a user may know that information satisfying the preset condition is displayed since visual information is displayed on the mobile terminal. Moreover, when a touch is applied to the visual information, the mobile terminal may assist the wearable device to execute an additional function or display additional information, thereby allowing the user to easily receive the additional function/information.

Furthermore, according to at least one of the embodiments of the present disclosure, the mobile terminal and wearable device may perform a link operation due to a preset gesture, thereby allowing the user to continuously perform a task by transferring the task that has been carried out in either one terminal to the other terminal as it is as well as providing a new type of user convenience.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
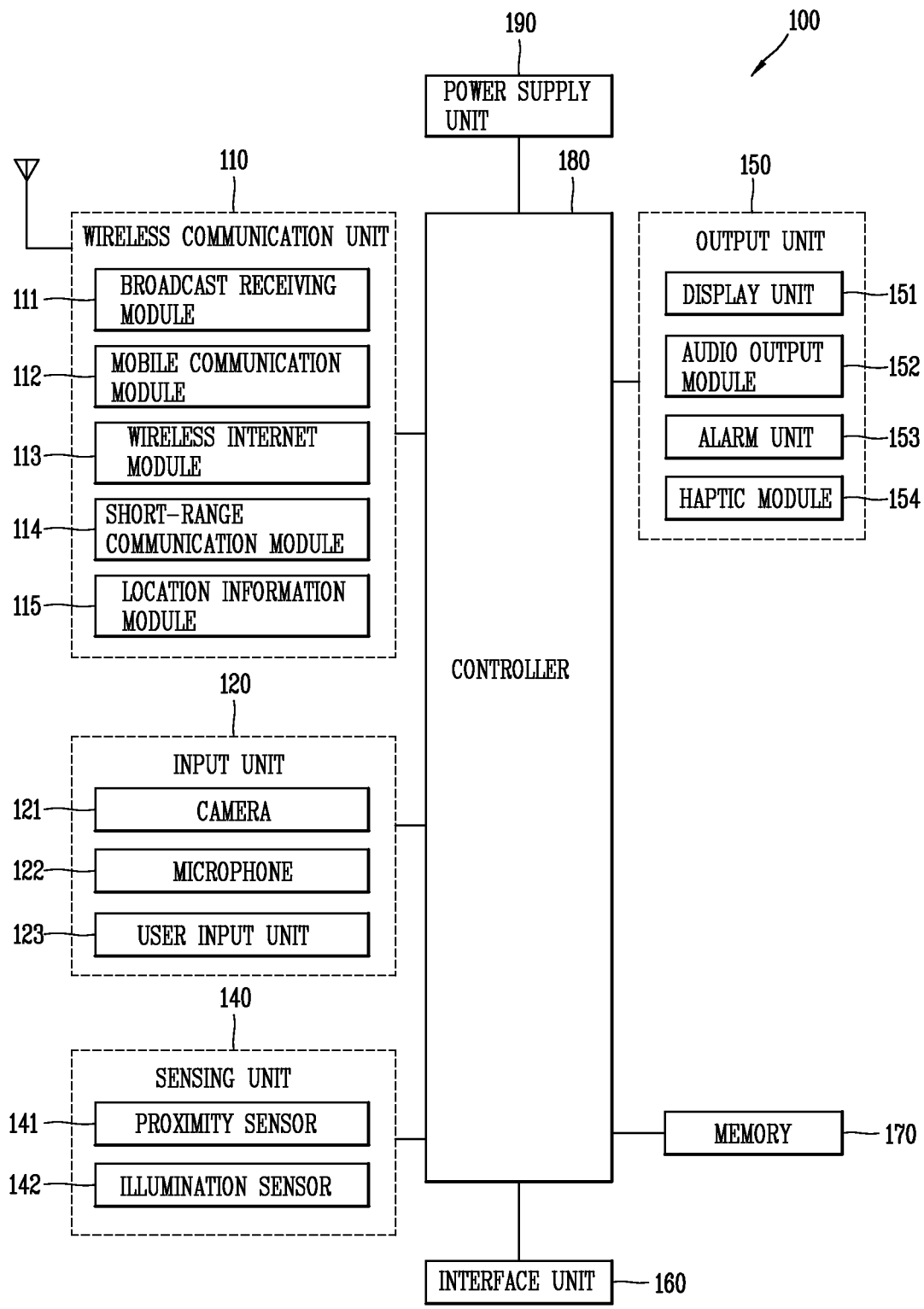
FIG. 1A is a block diagram for explaining a mobile terminal associated with the present disclosure.
Figure 1B:
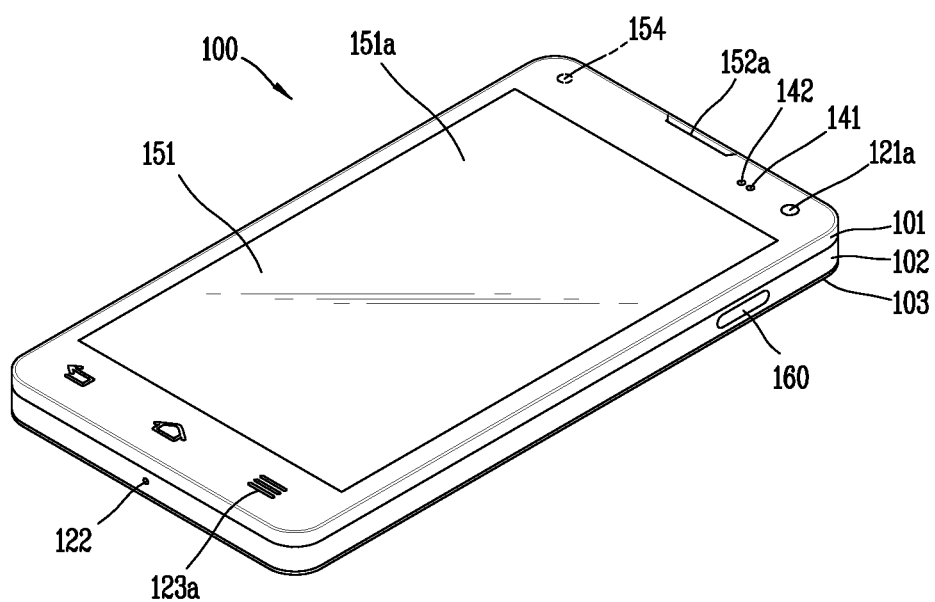
FIGS. 1B and 1C are conceptual views illustrating an example in which a mobile terminal associated with the present disclosure is seen from different directions.
Figure 1C:
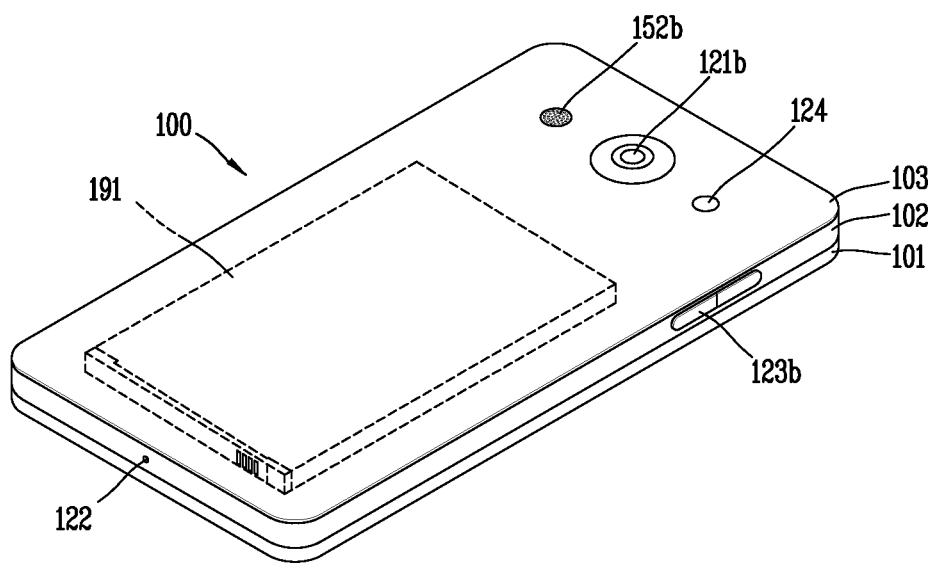

FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body.

The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Meanwhile, the present disclosure may display information processed in the mobile terminal using a flexible display. Hereinafter, description thereof will be given in detail with reference to the accompanying drawings.

Figure 2:
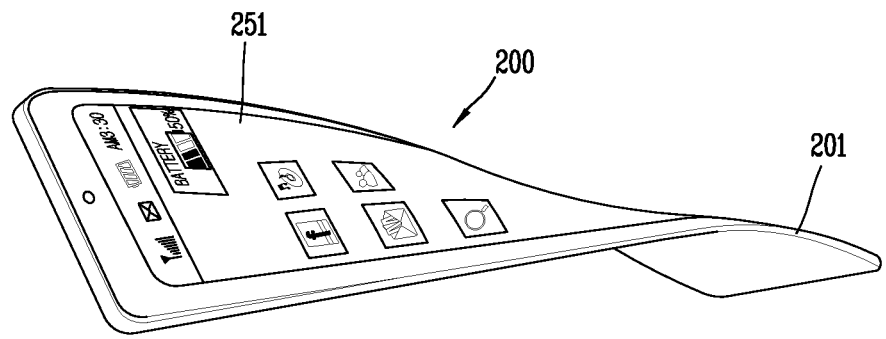
FIG. 2 is a conceptual view for explaining a modified example of a mobile terminal according to the present disclosure.

FIG. 2 is a conceptual view illustrating an exemplary variation of a mobile terminal 200 according to the present disclosure.

As illustrated in FIG. 2, a display unit 251 may be deformable by an external force. The deformation may be at least one of curving, bending, folding, twisting and rolling of the display unit 251. The deformable display unit 251 may be referred to as a 'flexible display unit.' Here, the flexible display unit 251 may include both a general flexible display and an e-paper.

The general flexible display denotes a light, non-fragile display, which still exhibits characteristics of the conventional flat panel display and is fabricated on a flexible substrate which can be curved, bent, folded, twisted or rolled.

Also, the e-paper is a display technology employing the characteristic of a general ink, and is different from the conventional flat panel display in view of using reflected light. The e-paper may change information by using a twist ball or an electrophoresis using a capsule.

In a state that the flexible display unit 251 is not deformed (for example, in a state with an infinite radius of curvature, hereinafter, referred to as a first state), a display region of the flexible display unit 251 may become a flat surface. In a state that the flexible display unit 251 is deformed from the first state by an external force (for example, a state with a finite radius of curvature, hereinafter, referred to as a second state), the display region may become a curved surface (or a bent surface). As illustrated, information displayed in the second state, may be visual information output on the curved surface. The visual information may be realized in such a manner that a light emission of each unit pixel (sub-pixel) arranged in a matrix configuration is controlled independently. The unit pixel denotes an elementary unit for representing one color.

The flexible display unit 251 may be placed in a curved state (for example, a state of being curved from up to down or from right to left), other than a flat state, in the first state. In this case, when an external force is applied to the flexible display unit 251, the flexible display unit 251 may be deformed back into the flat state or into a more curved state.

On the other hand, the flexible display unit 251 may implement a flexible touch screen by a combination with a touch sensor. When a touch is input onto the flexible touch screen, the controller 180 (see FIG. 1A) may execute a control corresponding to the touch input. The flexible touch screen may be configured to sense a touch input even in the second state as well as in the first state.

The mobile terminal 200 according to the exemplary variation may include a deformation sensor which senses the deformation of the flexible display unit 251. The deformation sensor may be included in the sensing unit 140 (see FIG. 1A).

The deformation sensor may be disposed in the flexible display unit 251 or a case 201 to sense information related to the deformation of the flexible display unit 251. Here, the information related to the deformation of the flexible display unit 251 may be a deformed direction, a deformed degree, a deformed position, a deformed time, an acceleration that the deformed flexible display unit 251 is restored, and the like. In addition to those, such information may be various information which is sensible in response to curving of the flexible display unit 251.

Also, the controller 180 may change information displayed on the flexible display unit 251 or generate a control signal for controlling a function of the mobile terminal 200, based on the information related to the deformation of the flexible display unit 251 sensed by the deformation sensor.

The mobile terminal 200 according to the exemplary embodiment may include a case 201 for accommodating the flexible display unit 251. The case 201 may be deformable together with the flexible display unit 251, taking into account the characteristic of the flexible display unit 251.

A battery (not shown) disposed in the mobile terminal 200 may also be deformable together with the flexible display unit 261, taking into account the characteristic of the flexible display unit 251. To implement the battery, a stack and folding method of stacking battery cells may be applied.

On the other hand, a mobile terminal may extend to a wearable device which is wearable on a human body, going beyond usually using the mobile terminal by a user with grabbing it with a hand. Examples of the wearable device may include a smart watch, a smart glass, a head mounted display (HMD), and so on. Hereinafter, description will be given of examples of a mobile terminal extending to the wearable device.

A wearable device may exchange data with (or cooperate with) another mobile terminal 100. The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

Figure 3:
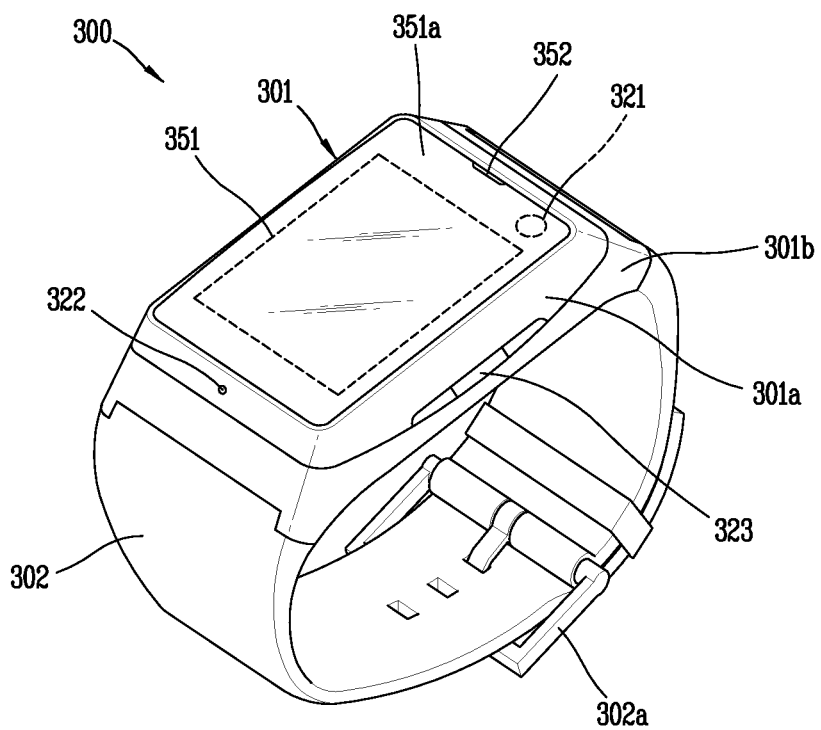
FIG. 3 is a perspective view illustrating an example of a wearable device as a watch-type mobile terminal associated with another embodiment of the present disclosure.

FIG. 3 is a perspective view illustrating one example of a watch type mobile terminal 300 in accordance with another exemplary embodiment.

As illustrated in FIG. 3, the watch type mobile terminal 300 may include a main body 301 with a display unit 351, and a band 302 connected to the main body 301 to be wearable on a wrist.

The main body 301 may include a case defining an appearance. As illustrated, the case may include a first case 301a and a second case 301b cooperatively defining an inner space for accommodating various electronic components. However, the present disclosure may not be limited to this. One case may be configured to define the inner space, thereby implementing a mobile terminal 300 with a uni-body.

The watch type mobile terminal 300 may be allowed to perform wireless communication, and an antenna for the wireless communication may be installed in the main body 301. The antenna may extend its function using a case. For example, a case including a conductive material may be electrically connected to the antenna so as to extend a ground area or a radiation area.

The display unit 351 may be disposed on a front surface of the main body 301 to output information thereon. The display unit 351 may be provided with a touch sensor so as to implement a touch screen. As illustrated, a window 351a of the display unit 351 may be mounted onto the first case 301a to form a front surface of the terminal body together with the first case 301a.

An audio output module 352, a camera 321, a microphone 322, a user input unit 323 and the like may be disposed on the main body 301. When the display unit 351 is implemented as the touch screen, it may function as the user input unit 323, which may result in excluding a separate key on the main body 301.

The band 302 may be worn on the wrist in a surrounding manner. The band 302 may be made of a flexible material for facilitating the wearing. As one example, the band 302 may be made of fur, rubber, silicon, synthetic resin or the like. The band 302 may also be configured to be detachable from the main body 301. Accordingly, the band 302 may be replaceable with various types of bands according to a user's preference.

On the other hand, the band 302 may be used for extending the performance of the antenna. For example, the band may include therein a ground extending portion (not shown) electrically connected to the antenna to extend a ground area.

The band 302 may be provided with a fastener 302a. The fastener 302a may be implemented into a buckle type, a snap-fit hook structure, a Velcro type, or the like, and include a flexible section or material. The drawing illustrates an example that the fastener 302a is implemented into the buckle type.

Figure 4:
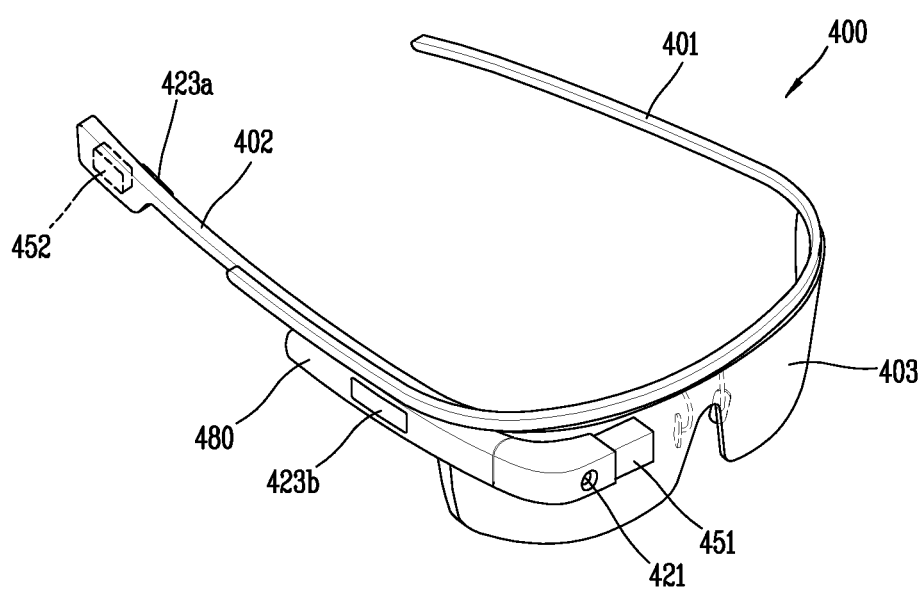
FIG. 4 is a perspective view illustrating an example of a glasses-type mobile terminal associated with still another embodiment of the present disclosure.

FIG. 4 is a perspective view illustrating one example of a glass type mobile terminal 400 in accordance with another exemplary embodiment.

The glass type mobile terminal 400 may be wearable on a head of a human body and provided with a frame part (case, housing, etc.) therefor. The frame part may be made of a flexible material to be easily worn. The drawing exemplarily illustrates that the frame part includes a first frame 401 and a second frame 402 which are made of different materials from each other.

The frame part may be supported on the head and define a space for mounting various components. As illustrated, electronic components, such as a control module 480, an audio output module 452 and the like, may be mounted to the frame part. Also, a lens 403 for covering at least one of a left eye and a right eye may be detachably coupled to the frame part.

The control module 480 may control various electronic components disposed in the mobile terminal 400. The control module 480 may be understood as a component corresponding to the aforementioned controller 180. The drawing exemplarily illustrates that the control module 480 is installed in the frame part on one side of the head. However, the position of the control module 480 may not be limited to this.

The display unit 451 may be implemented into a type of head mounted display (HMD). The HMD type refers to a displaying method by which a display is mounted to a head so as to show an image directly in front of a user's eyes. In order to provide an image directly in front of the user's eyes when the user wears the glass type mobile terminal 400, the display unit 451 may be disposed to correspond to at least one of a left eye and a right eye. The drawing exemplarily illustrates that the display unit 451 is located on a portion corresponding to the right eye to output an image toward the user's right eye.

The display unit 451 may project an image into the user's eye using a prism. Also, the prism may be formed transparent such that the user can view both the projected image and a general visual field (a range that the user views through the eyes) in front of the user.

In such a manner, the image output through the display unit 451 may be viewed with overlapping the general visual field. The mobile terminal 400 may provide an augmented reality (AR) of showing a single image by overlaying a virtual image on a realistic image or background using the characteristic of the display.

The camera 421 may be disposed adjacent to at least one of the left eye and the right eye to capture an image in front thereof. Since the camera 421 is located adjacent to the eye, the camera 421 may acquire a scene that the user is viewing as an image.

The drawing exemplarily illustrates that the camera 421 is provided at the control module 480, but the present disclosure may not be limited to this. The camera 421 may be installed on the frame part or provided in plurality to acquire a stereoscopic image.

The glass type mobile terminal 400 may include user input units 423a and 423b manipulated by the user to input a control command. The user input units 423a and 423b may employ any method if it is a tactile manner allowing the user to perform manipulation with a tactile feeling such as touch, push, or the like. The drawing exemplarily illustrates that the user input units 423a and 423b operable in a pushing manner and a touching manner are disposed on the frame part and the control module 480, respectively.

Also, the glass type mobile terminal 400 may include a microphone (not shown) which processes input sound into electric audio data, and an audio output module 452 for outputting an audible sound. The audio output module 452 may be configured to transfer the audible sound in a general audio output manner or an osteoconductive manner. When the audio output module 452 is implemented in the osteoconductive manner, the audio output module 452 may be closely adhered onto the head when the user wears the mobile terminal 400 and vibrate the user's skull to transfer sounds.

Hereinafter, a mobile terminal illustrated in FIG. 1B is referred to as a "mobile terminal 100" and a mobile terminal illustrated in FIGS. 3 and 4 is referred to as a "wearable device 300." For the sake of convenience of explanation, the mobile terminal 100 may be replaced with a first terminal, and the wearable device 300 may be replaced with a second terminal, and the wearable device 300 and mobile terminal 100 may include constituent elements illustrated in FIG. 1A.

On the other hand, the wearable device 300 may include a display unit for displaying information like the mobile terminal 100. However, the wearable device 300 may include a relatively smaller sized display unit compared to that of the mobile terminal 100 having a smart phone shape, due to the characteristics of the product that should be worn on a user.

Furthermore, due to a spatial limitation, since the same level of constituent elements as those of the mobile terminal 100 cannot be provided in the wearable device 300, the wearable device may have a lower performance compared to the mobile terminal 100. Due to this, it may occur a case where a file that is executable on the mobile terminal 100 cannot be executed on the wearable device 300.

On the other hand, since the wearable device 300 is worn on a user, when an event or the like occurs, the user may check an event that has occurred using the wearable device other than the mobile terminal 100. The examples of an event occurring in the wearable device 300 and/or mobile terminal 100 may include message received, call signal received, missed call, alarm, event notification, email received, information received through an application, and the like.

However, due to a structural problem of the foregoing wearable device 300, it causes inconvenience that information associated with an event cannot be displayed on the wearable device 300 or an amount of information to display is large even when the information can be displayed on the wearable device 300.

For example, in case where a word processor file containing several tens of pages is attached to a received email, if the user wants to check the content of the word processor file using the wearable device 300, then a lot of time and effort should be consumed. It is because the amount of information that can be displayed on a display area of the wearable device 300 is limited.

For another example, when a virtual keypad is displayed on the wearable device 300, it is almost impossible to apply an accurate touch to any one of a plurality of virtual keys arranged on a small screen.

As described above, when the user uses only the wearable device 300, it may cause great inconvenience. In other words, due to a spatial limitation of the wearable device 300, it may be difficult to provide all functions that have been supported in the mobile terminal 100 through the wearable device 300, and also difficult to display a lot of information required by the user.

However, since a penetration rate of the mobile terminal 100 is higher than that of the wearable device 300, when the user has the wearable device 300, he or she is highly likely to have the mobile terminal 100, too. Accordingly, the wearable device 300 and mobile terminal 100 may be operated in a mutually linked manner, thereby maximizing synergy between these two products.

Of course, the user may check an event from the wearable device 300, and check specific information associated with the event using the mobile terminal 100. However, in order to display the specific information on the mobile terminal 100, the user should apply an additional user input to the mobile terminal 100, thereby causing an inconvenient problem. For example, an additional user input such as releasing a locked state of the mobile terminal 100, searching an icon corresponding to the relevant application, and then executing the relevant application or the like should be applied to the mobile terminal 100.

In order to solve the foregoing problems, the present disclosure is to provide a mobile terminal system in which a function which is not supported by the wearable device 300 or which is inconvenient when executed on the wearable device 300 can be more easily used using the mobile terminal 100. Specifically, the present disclosure is to provide the mobile terminal 100, the wearable device 300 and a mobile terminal system including the same in which when the mobile terminal 100 supports the wearable device 300 to execute an additional function or display additional information, it is notified to the user, and allows the user to easily receive the additional function/information.

Hereinafter, for the wearable device 300 and mobile terminal 100 having the foregoing configuration, the operation implemented by the present disclosure will be described with reference to the accompanying drawings.

FIGS. 5A, 5B, 5C and 5D are conceptual views illustrating an operation implemented by the present disclosure.

Referring to the present drawings, a mobile terminal may include a smart phone shaped mobile terminal 100a and a smart watch shaped wearable device 300. However, the present disclosure may not be necessarily limited to this, and may be also applicable to a wearable device having various structures such as a glasses type, a HMD type or the like.

According to the present disclosure, the mobile terminal 100 and wearable device 300 operated in a mutually linked manner is presented, and a new type of user interface using the same is provided. Here, the operations implemented by the mobile terminal 100 and wearable device 300 will be described in more detail with reference to the accompanying drawings.

The mobile terminal 100 and wearable device 300 may include touch screens 151, 351, and configured to switch between an active state in which the illumination is on and an inactive state in which the illumination is off.

The "state in which the touch screen is inactive" denotes a state in which an illumination provided therein illuminating the touch screen is off, and the "state in which the touch screen is inactive" denotes a state in which an illumination provided therein illuminating the touch screen is on.

Figure 5A:
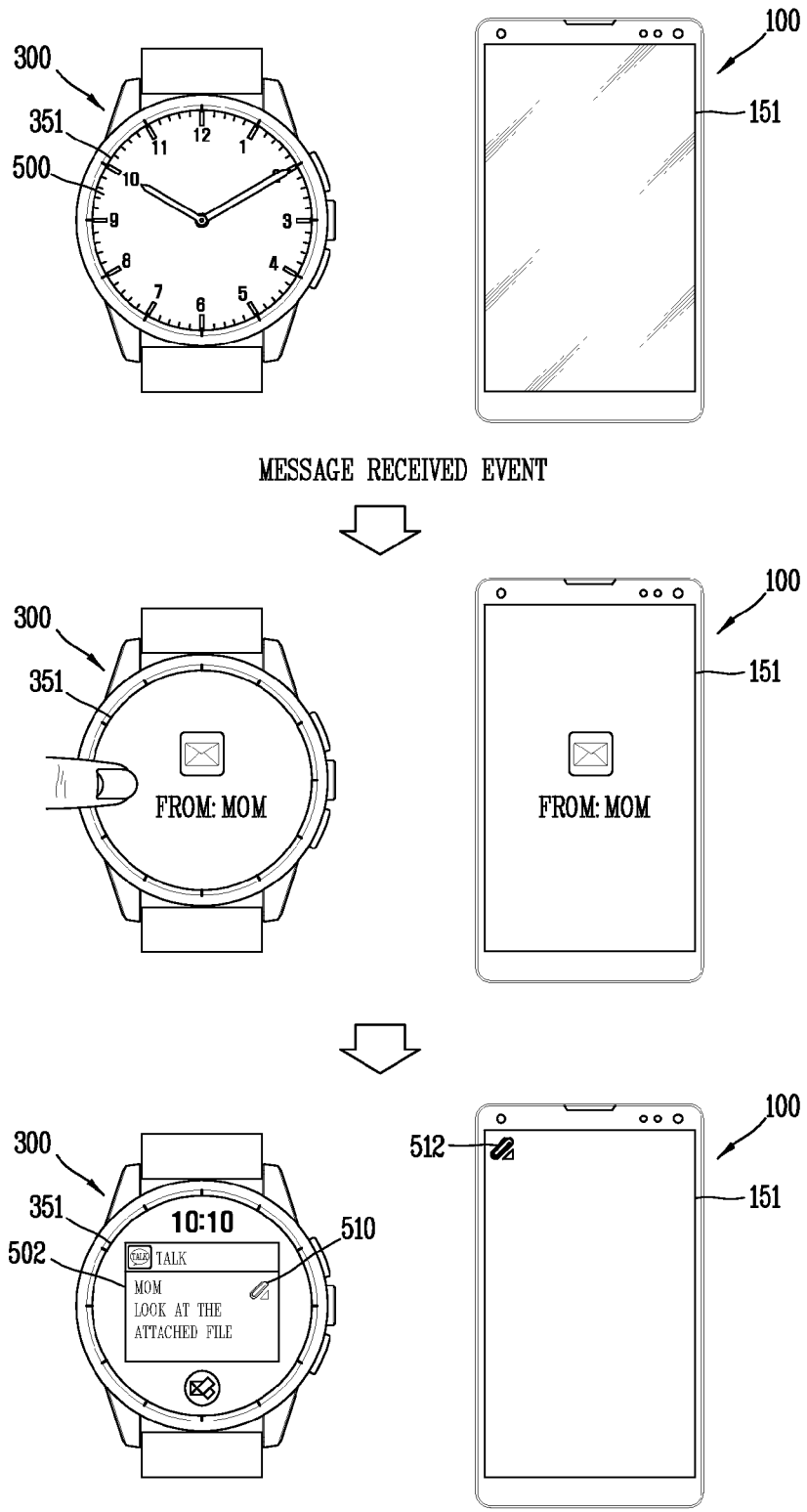
FIGS. 5A, 5B, 5C and 5D are conceptual views illustrating an operation implemented by the present disclosure.

Referring to FIG. 5A, the touch screen 351 of the wearable device 300 may display time information 500 in the active state. Here, the time information 500 may include an index including a number or the like indicating time, and an indicating hand including an hour hand displayed to indicate an index corresponding to an hour according to the flow of time, a minute hand displayed to indicate an index corresponding to a minute according to the flow of time, a second hand displayed to indicate an index corresponding to a second according to the flow of time.

The wearable device 300 controls the touch screen 351 such that an hour hand a minute hand show a current time according to the flow of time. Accordingly, the user may check the touch screen 351 of the wearable device 300 to check a current time without applying an additional control command.

On the other hand, the wearable device 300 may perform communication with various types of external devices, and perform pairing with at least one of the external devices.

Pairing indicates a connection for data transmission and reception between the wearable device 300 and the mobile terminal 100. When pairing is carried out, the wearable device 300 and mobile terminal 100 may perform a communication connection to transmit and receive data in a bidirectional way. Here, pairing may be carried out through the wireless communication unit 110 (refer to FIG. 1) such as Bluetooth, Near Field Communication (NFC) or the like.

The mobile terminal 100 is required to be prevented from being paired with a user's unintentional external terminal. To this end, the mobile terminal 100 and wearable device 300 may perform pairing only when a password set by the user is entered to at least one of the mobile terminal 100 and wearable device 300. The password may be substituted by a fingerprint registered with the mobile terminal 100, a cloud server or the like. Communication between the mobile terminal 100 and the wearable device 300 which will be described below may be carried out only when the pairing has been completed.

On the other hand, when a communication connection is carried out, the wearable device 300 may transmit and receive data to and from the mobile terminal 100 in a state that a session is open. Accordingly, the wearable device 300 may detect an event occurred on the mobile terminal 100 and/or wearable device 300, and share information associated with the occurrence of the event with the mobile terminal 100.

More specifically, the wearable device 300 senses that an event has occurred in at least one application installed in the wearable device 300 and/or the mobile terminal 100 in the state of being paired with the mobile terminal 100.

As a concept including a widget, a home launcher or the like, the application denotes all types of programs that can be driven on the wearable device 300 and/or mobile terminal 100. Accordingly, the application may be an application for performing a function of web browser, video play, message transmission and reception, schedule management, and application update.

The occurrence of an event may be when there is a missed call, when there is an application subject to update, when a message has arrived, charging, terminal power on, power off, a display activation key pressed (LCD awake key), an alarm, an incoming call, a missed notification, execution of an application by a user input, a user input to a graphic object linked with a control function, and the like.

For another example, when specific information is received through the wireless communication unit of the wearable device 300, it denotes that an event has occurred on an application associated with the specific information, and the wearable device 300 may sense it. Otherwise, in case where there is an item entered by the user on schedule management, if the date becomes a date corresponding to the item, then it denotes that an event has occurred on a schedule management application.

For example, as illustrated in FIG. 5A, time information 500 may be displayed on the touch screen 351 of the wearable device 300, and a message reception event may occur while the touch screen 151 of the mobile terminal 100 is in an inactive state.

An event may occur on the wearable device 300 or occur on the mobile terminal 100 or occur on the wearable device 300 and mobile terminal 100 at the same time.

At least one of the mobile terminal 100 and wearable device 300 may generate a notification notifying the occurrence of an event to the user according to the occurrence of the event. The notification may include at least one of auditory information, visual information and tactile information. Accordingly, at least one of the mobile terminal 100 and wearable device 300 may provide a notification for the event to the user in the form of an alarm sound, an icon, a vibration or the like.

When the notification is time information, the notification may include at least one of a graphic object (for example, an icon) corresponding to an event, title information of an event, cumulative occurrences information of an event, generation subject information from which an event has been generated, and time information at which an event has occurred.

For example, as illustrated in FIG. 5A, when a text reception event has occurred, the notification may include a graphic object corresponding to the text reception event, information on the counterpart terminal that has sent text, and the like. The wearable device 300 displays a notification corresponding to the text reception event instead of the time information 500 in response to the text reception event. The mobile terminal 100 switches the touch screen 151 in an inactive state to an active state and displays a notification corresponding to the text reception event in response to the text reception event.

It is illustrated in FIG. 5A that the same notification is displayed on the mobile terminal 100 and wearable device 300, but a different notification may be displayed for the same event.

Furthermore, either one of the mobile terminal 100 and wearable device 300 may display a notification, and the other one may limit the display of the notification in response to an event occurrence. For example, a notification may be displayed only on the wearable device 300 in a state that the wearable device 300 is worn on the user, and notifications may be displayed on the wearable device 300 and mobile terminal 100, respectively, in a state that the wearable device 300 is not worn on the user.

On the other hand, when a user input for a notification is sensed, the wearable device 300 may display information associated with an event instead of the notification. For example, as illustrated in FIG. 5A, when a touch is sensed on the touch screen 351 in a state that a notification corresponding to a text reception event is displayed on the touch screen 351, the wearable device 300 may display information associated with the text reception event on the touch screen 351 of the wearable device 300.

For example, the event may be a message received, and information associated with the event may be the content of the message. For another example, the event may be a notification of a set schedule, and information associated with the event may be the detailed information of the set schedule, and the like. For still another example, the event may be the occurrence of an application which is an update target, and information associated with the event may be the detailed information of the update target, and the like. For yet still another example, the event may be a touch to a graphic object linked with the execution of a mail application, and information associated with the event may be an execution screen of the mail application, and the like.

On the other hand, when content associated with an event instead of a network is displayed on the wearable device 300, the mobile terminal 100 ends the display of the notification. Here, the mobile terminal 100 switches the touch screen 151 that has displayed the notification from an active state to an inactive state. It is to prevent the battery of the mobile terminal 100 from being consumed regardless of user's intention.

The wearable device 300 determines whether or not information satisfying a preset condition is included in information associated with the event (or whether or not information satisfying the preset condition is displayed). As a result of the determination, when information satisfying the preset condition is displayed, the wearable device 300 generates and transmits notification information notifying that information satisfying the preset condition is displayed to the mobile terminal 100.

The information satisfying the preset condition (or information set to generate notification information) denotes information for which the display of the mobile terminal 100 is required since the display of the wearable device 300 is disallowed or information for which the display of the wearable device 300 is more efficient than the display of the mobile terminal 100.

An example of information for which the display of the mobile terminal 100 is required may be a file itself which is not supported by the wearable device 300 (or non-executable file) or a link or graphic object formed to execute the relevant file. For example, it may be a case where an attachment file that is non-executable on the wearable device 300 is contained when displaying the detailed content of a received message.

An example of information for which the display of the mobile terminal 100 is more efficient may be a uniform resource locator (URL), an image, a video, a virtual keypad, an input method editor (IME), an attachment file, a link or graphic object formed to execute an attachment file, and the like. For example, in displaying the detailed content of a received message, when an attachment file executable on the wearable device 300 is contained therein but an amount of information contained in the attachment file is large, it is efficient that an execution screen of the attachment file is displayed on the mobile terminal 100 rather than the wearable device 300. It is because the mobile terminal can display more information since the touch screen 151 of the mobile terminal 100 is larger than the touch screen 351 of the wearable device 300.

For another example, when a cursor is displayed on an input window formed to receive a text, a number, a symbol or the like, the cursor may correspond to information satisfying a preset condition. A virtual keypad should be displayed to receive a text or the like at the input window, but it is convenient for the user that the virtual keypad is displayed on the mobile terminal 100 rather than the wearable device 300.

Moreover, information satisfying a preset condition may be an execution screen of a preset application. For example, when a preset application is carried out on the wearable device 300, the resultant execution screen is displayed, and even in this case, it may be included in a case where information satisfying a preset condition is displayed thereon. The preset application may include an application associated with video play, an application associated with the display of images stored in the memory of the wearable device 300, and the like. The preset application may be added, deleted or edited by the user.

However, the present disclosure may not be necessarily limited to this, and information satisfying a preset condition may be modified in various ways according to the embodiment.

On the other hand, the mobile terminal 100 display visual information indicating that information satisfying the preset condition is displayed on the wearable device 300 based on notification information received from the wearable device 300. More specifically, when the notification information is received, the mobile terminal 100 may display visual information corresponding to information satisfying the preset condition.

Hereinafter, information displayed on the mobile terminal 100 due to the notification information is referred to as "visual information."

The visual information denotes all types of information indicating that information satisfying the preset condition is displayed on the transmitting terminal. For an example, the visual information may be implemented in an image form as illustrated in FIG. 5A or implemented in a text form such as "an attachment file received from MOM can be checked on the mobile terminal."

On the other hand, the visual information may be defined as information indicating that a function linked with a function being executed on the wearable device 300 can be executed on the mobile terminal 100. In other words, the mobile terminal 100 may display the visual information when there exists a function linked with a function being executed on the wearable device 300 or there exists an additional information associated with information being displayed on the wearable device 300.

On the other hand, different visual information may be displayed on the mobile terminal 100 according to a type of information satisfying the preset condition or according to a function being executed on the wearable device 300.

More specifically, the preset conditions may have a plurality of conditions, and when displaying information corresponding to any one of the plurality of conditions, the wearable device 300 generates and transmits notification information corresponding to the any one to the mobile terminal 100. In other words, the visual information displayed on the mobile terminal 100 varies according to information satisfying which one of the preset conditions being displayed on the wearable device 300. For example, the visual information may be a different image according to the type of information satisfying a preset condition. Here, the different image may be an image having a different shape, length, color or the like.

For an example, a case where a graphic object formed to execute an attachment file is information satisfying a preset condition will be described with reference to the accompanying drawings.

Referring to FIG. 5A, the wearable device 300 displays the content of a message 502 on the touch screen 351 as a message reception event occurs. When an attachment file is contained in the message, information satisfying a preset condition, namely, a graphic object 510 formed to execute the attachment file, is displayed. The wearable device 300 transmits notification information corresponding to the graphic object 510 to the mobile terminal 100 since the graphic object 510 corresponds to information satisfying a preset condition. In other words, the wearable device 300 generates notification information and transmits the generated notification information to the mobile terminal 100 in response to the display of the graphic object 510.

When the notification information is received while the touch screen 151 is in an inactive state, the mobile terminal 100 switches at least one region of the touch screen 151 to an active state, and displays the visual information 512 in at least one region that has been switched to the active state. On the contrary, when the notification information is received while displaying a notification according to an event occurrence, the mobile terminal 100 displays the visual information instead of the notification.

As a result, the user may recognize that information satisfying a preset condition is being displayed on the wearable device 300, and know which type of information is the information satisfying the preset condition.

On the other hand, the wearable device 300 may switch screen information displayed on the touch screen 351 to another screen information based on an event occurrence or user input. Accordingly, the display of information satisfying a preset condition may be ended or another information satisfying another preset condition may be displayed.

More specifically, when a preset condition includes a first and a second condition, the wearable device 300 may display first information satisfying the first condition and then end the display of the first information or display second information satisfying the second condition instead of the first information.

In this case, the wearable device 300 generates and transmits notification information to the mobile terminal 100 based on information being displayed on the wearable device 300. For example, the wearable device 300 may transmit first notification information to the mobile terminal 100 to display first visual information corresponding to the first information on the mobile terminal 100 when the first information is displayed, and generate and transmit second visual information to the mobile terminal 100 to display second time information corresponding to the second information on the mobile terminal 100 when the second information is displayed.

Figure 5B:
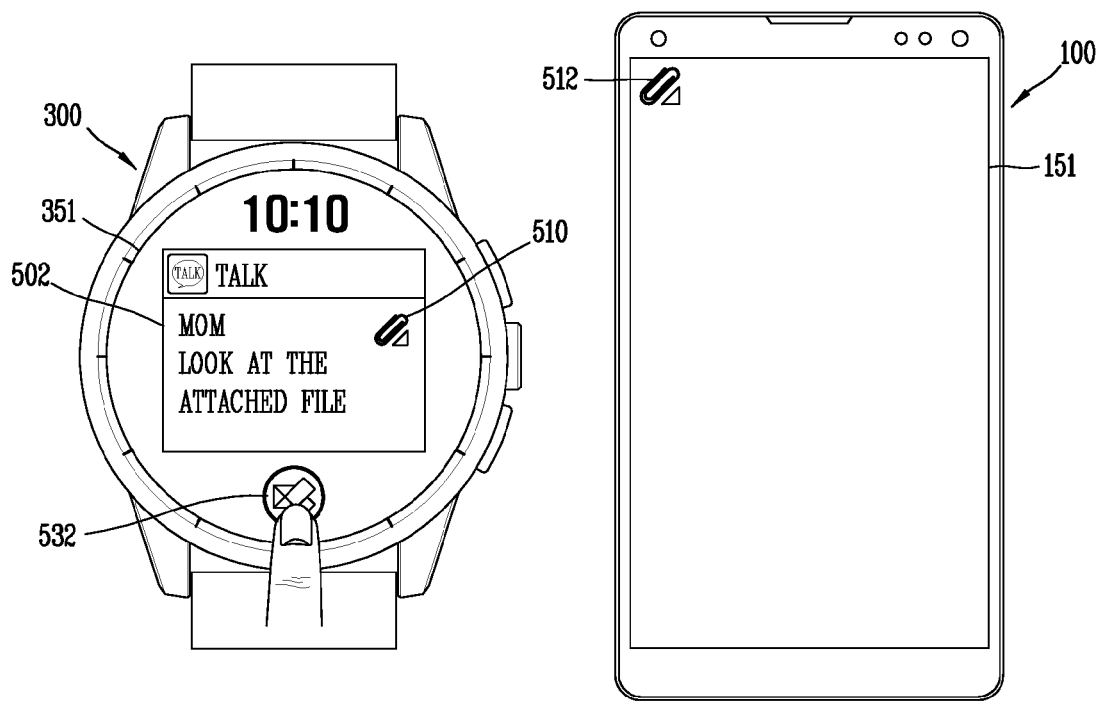
Figure 5B:
Figure 5B:
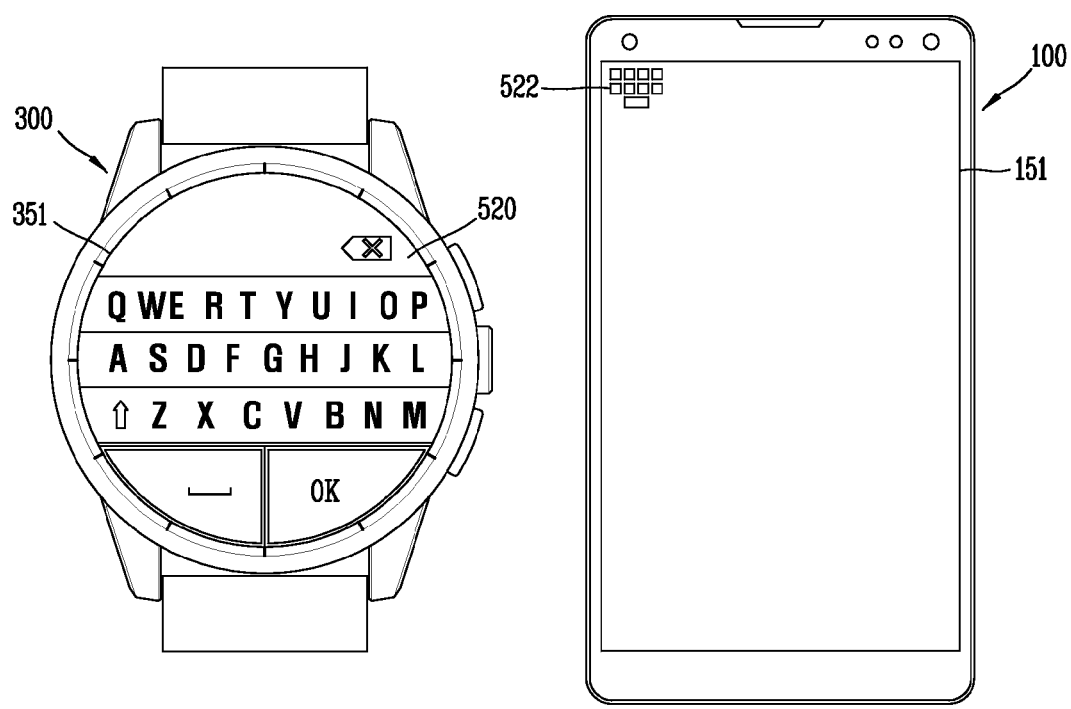

For example, as illustrated in FIG. 5B, when the content of a received message 502 is displayed on the wearable device 300, a graphic object 532 linked with a reply function may be displayed thereon at the same time. When a touch is applied to the graphic object 532, the wearable device 300 executes the reply function, and display a virtual keypad 520 instead of the content of the received message 502. When first information satisfying a first condition is a graphic object 510 formed to execute an attachment file and second information satisfying a second condition is a virtual keypad 520, the mobile terminal 100 displays first time information 512 while the first information is displayed on the wearable device 300, and displays second time information 522 while the second information is displayed on the wearable device 300. In order to assist the operation of the mobile terminal, the wearable device 300 generates and transmits different notification information to the mobile terminal 100 according to whether or not information satisfying a preset condition is displayed on the touch screen 351.

On the contrary, when the display of information satisfying a preset condition is ended, the wearable device 300 generates and transmits a notification end command to the mobile terminal 100. The mobile terminal 100 ends the display of visual information in response to the notification end command. For example, the display of information satisfying the preset condition may be ended when the touch screen 351 of the wearable device 300 is switched from an active state to an inactive state or another event occurs. In this case, the wearable device 300 transmits a notification end command to the mobile terminal 100 to end the display of visual information, and the mobile terminal 100 ends the display of the visual information in response to the notification end command. As a result, it may be possible to prevent battery power from being consumed due to continuous display of visual information, and indirectly guide the user that the display of information satisfying a preset condition has been ended on the wearable device 300.

On the other hand, the mobile terminal 100 may sense a touch applied to visual information while displaying the visual information. As a touch is applied to visual information displayed on the mobile terminal 100, the mobile terminal 100 may execute a function associated with information being displayed on the wearable device 300 (or information satisfying a preset condition), or display additional information associated with the information satisfying the preset condition, or display the information satisfying the preset condition in a predetermined enlargement ratio.

In other words, the mobile terminal 100 may display preset screen information in response to a touch applied to the visual information. The preset screen information corresponds to information satisfying a preset condition being displayed on the wearable device 300, and varies according to the type of information satisfying the preset condition. Hereinafter, screen information displayed on the touch screen 151 of the mobile terminal 100 in response to a touch applied to the visual information is referred to as "preset screen information."

Figure 5C:
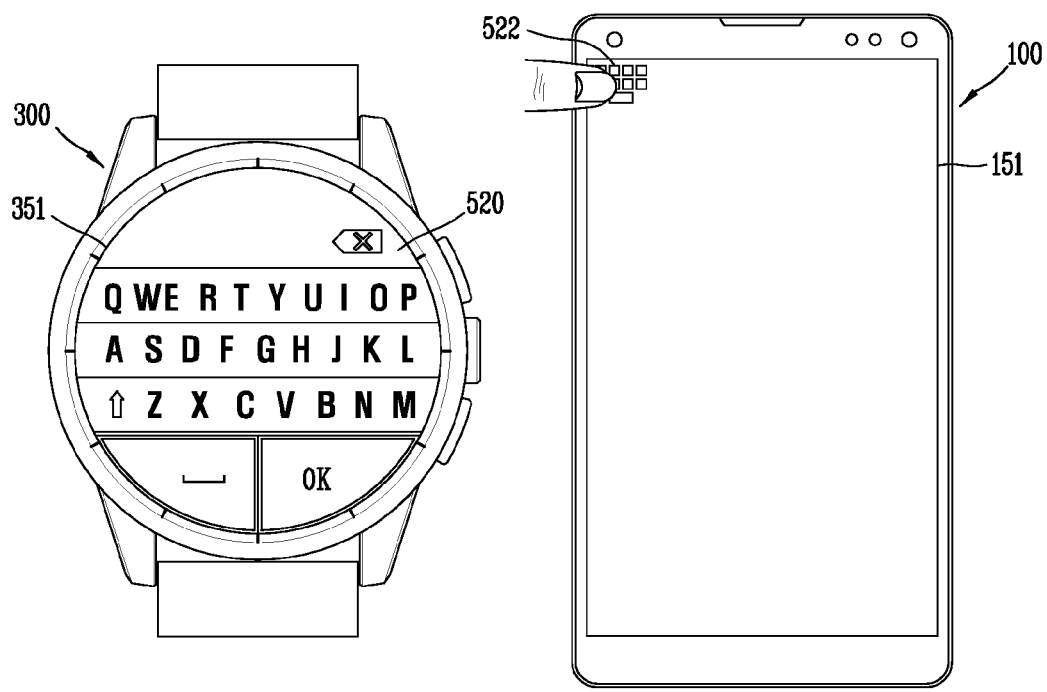
Figure 5C:
Figure 5C:
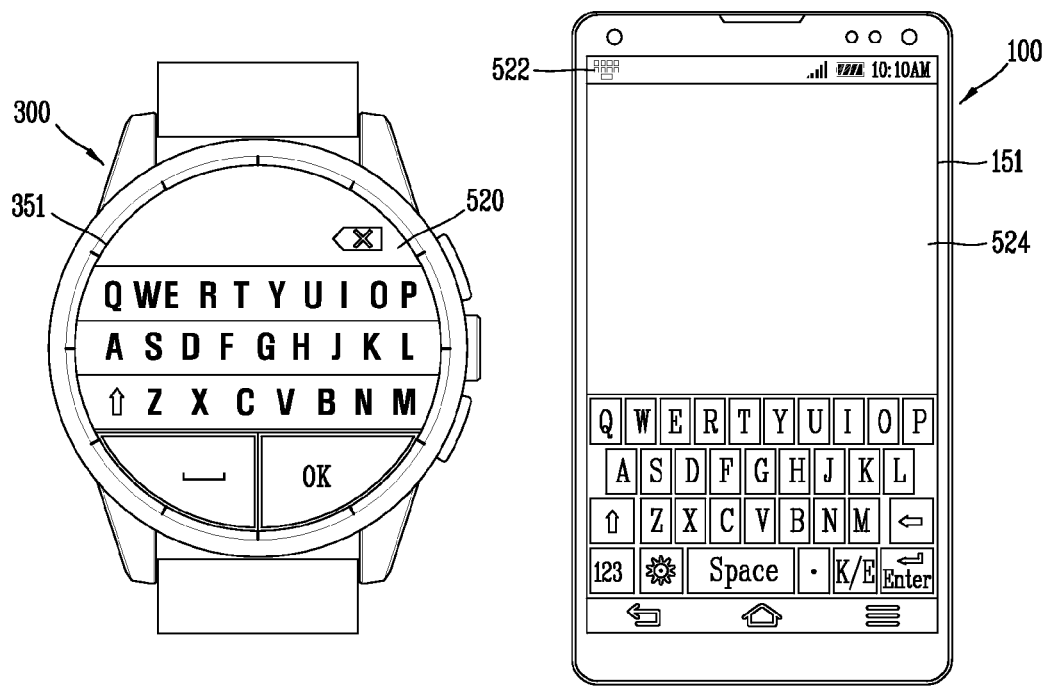

For an example, referring to FIG. 5C, the information satisfying the preset condition may be a virtual keypad 520, and the visual information may be an image 522 indicating that a virtual keypad is displayed on the wearable device 300, and the preset screen information may be a reply writing screen 524 including a text input window and a virtual keypad according to the execution of the reply function.

Specifically, when a first virtual keypad is displayed, the wearable device 300 transmits notification information indicating that the first virtual keypad is being displayed to the mobile terminal 100. The mobile terminal 100 displays visual information 522 indicating that a first virtual keypad is being displayed based on the received notification information. Due to the visual information 522, the user may recognize that a function linked with the wearable device 300 is executable on the mobile terminal 100.

Then, when a touch is applied to the visual information 522, the mobile terminal 100 display preset screen information containing a second virtual keypad. The user may enter text using a first virtual keypad being displayed on the wearable device 300 or enter text using a second virtual keypad being displayed on the mobile terminal 100.

Figure 5D:
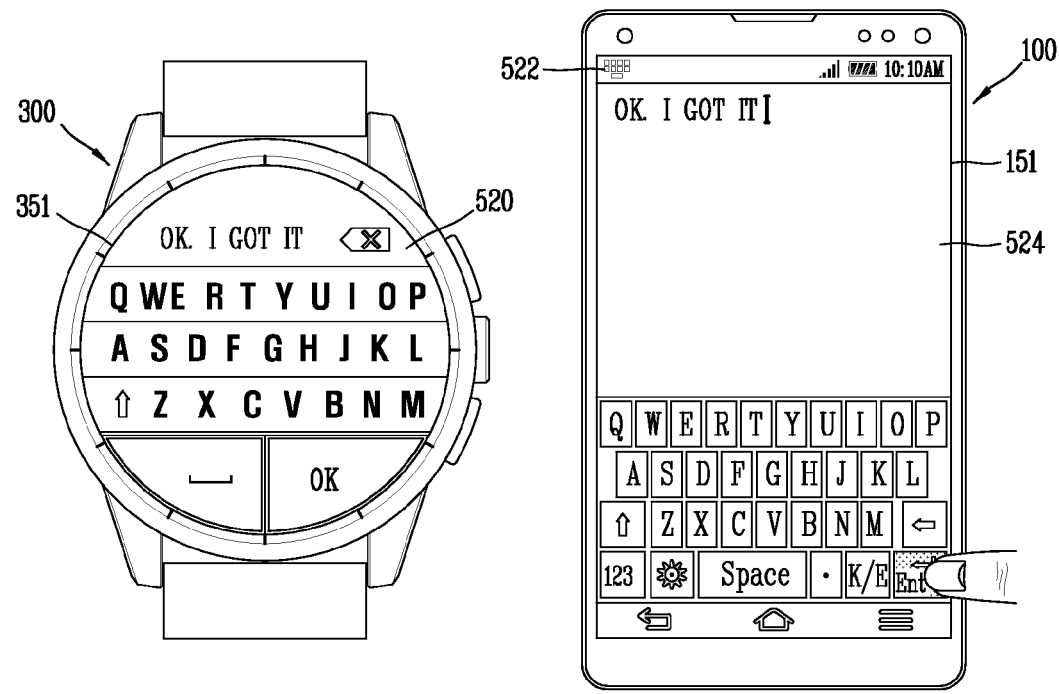
Figure 5D:
Figure 5D:
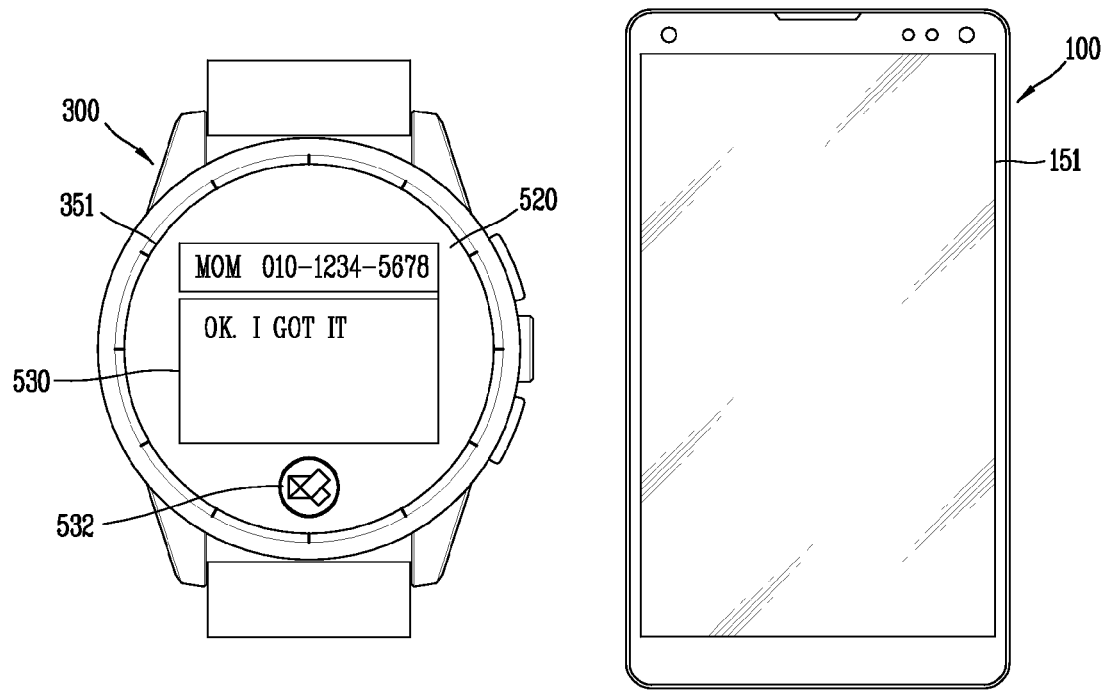

For example, as illustrated in FIG. 5D, the mobile terminal 100 may generate and display text on the touch screen 151 of the mobile terminal 100 based on a touch input applied to the second virtual keypad, and transmit data corresponding to the generated text to the wearable device 300. The wearable device 300 display the generated text on the touch screen 351 of the wearable device 300 based on the transmitted data. In other words, the mobile terminal 100 is operated as an input method editor (IME) for entering text on the wearable device 300.

As described above, since visual information is displayed on the mobile terminal 100 and preset screen information is displayed by a touch to the visual information as information satisfying a preset condition is displayed on the wearable device 300, the user may execute a function associated with the wearable device 300 using the mobile terminal 100 in a simple and fast manner. Furthermore, the mobile terminal 100 may display different visual information according to information being displayed on the wearable device 300, thereby proposing a function capable of complementing the wearable device 300 to the user depending on the situation.

Then, a user input for completing text generation may be received at the mobile terminal 100. For example, when a touch is applied to a graphic object (or virtual keypad) linked with a text generation complete command such Enter or the like, the mobile terminal 100 generates a text generation complete command, and transmits it to the wearable device 300. Here, the mobile terminal 100 has completed the role of an input method editor (IME), and switch the touch screen 151 of the mobile terminal 100 from an active state to an inactive state for battery saving.

On the other hand, the wearable device 300 may end the display of a first virtual keypad 520 to transmit a reply to the counterpart and display the content of the reply 530 in response to the transmitted text generation complete command.

As described above, according to the present disclosure, the mobile terminal 100 and wearable device 300 may be operated in an organically linked manner to provide a new type of user interface, thereby enhancing user convenience.

Figure 6:
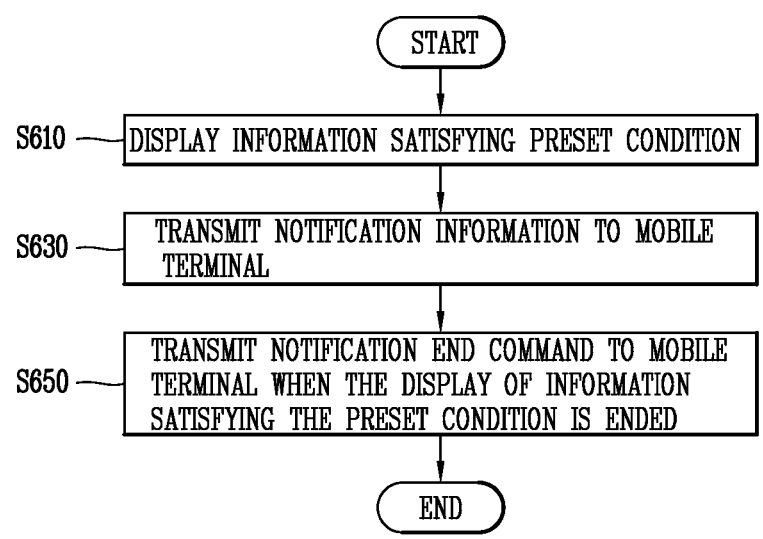
FIG. 6 is a flow chart representatively illustrating a control method of a wearable device according to the present disclosure.

FIG. 6 is a flow chart representatively illustrating a control method of a wearable device according to the present disclosure.

First, the wearable device 300 display information satisfying a preset condition (S610).

The information satisfying the preset condition denotes information for which the display of the wearable device 300 is disallowed or information for which the display of the wearable device 300 is more efficient than the display of the mobile terminal 100. For example, the information satisfying the preset condition may be an icon, a uniform resource locator (URL), an image, a video, a virtual keypad, an input method editor (IME), an attachment file, a link or graphic object formed to execute an attachment file, and the like, and modified in various ways according to the embodiment.

Next, the wearable device 300 transmits notification information to the mobile terminal 100 (S630).

When the information satisfying the preset condition is displayed on the touch screen 351 of the wearable device 300, the wearable device 300 generates and transmits notification information to the mobile terminal 100. More specifically, the wearable device 300 transmits the notification information to the mobile terminal 100 to display visual information indicating that the information satisfying the preset condition is being displayed on the wearable device 300 on the mobile terminal 100.

As information indicating that the information satisfying the preset condition is being displayed on the wearable device 300, the notification information may include various information according to the information satisfying the preset condition. The notification information may include specific information being displayed on the wearable device 300, visual information corresponding to the specific information, application information linked with the specific information, and the like.

For an example, when the information satisfying the preset condition is an attachment file, the notification information may include at least one of the attachment file, a title of the attachment file, a link formed to execute the attachment file, a link to download the attachment file, a server address providing the attachment file, information on the counterpart terminal that has transmitted the attachment file, information on an application that has received the attachment file, and visual information that should be displayed on the mobile terminal.

The notification information may be transmitted to the mobile terminal 100 when the information satisfying the preset condition is displayed on the wearable device 300 or transmitted to the mobile terminal 100 when the display of the information satisfying the preset condition is maintained for a predetermined period of time from a time point at which the information is displayed on the wearable device 300.

If the notification information is immediately transmitted to the mobile terminal 100 when displaying the information satisfying the preset condition, then the user may immediately recognize that the information satisfying the preset condition is being displayed on the wearable device 300. On the contrary, if the display of the notification information is not maintained for a predetermined period of time, then the user does not have any intention to use the information of the preset condition, and thus visual information may be displayed to prevent the power of the mobile terminal 100 from being consumed.

Furthermore, the notification information may be periodically or non-periodically transmitted to the mobile terminal 100 while the information satisfying the preset condition is displayed on the wearable device 300.

The mobile terminal 100 may display visual information indicating that the attachment file is being displayed on the wearable device 300 based on the notification information received from the wearable device 300.

Next, when the display of the information satisfying the preset condition is ended, the wearable device 300 transmits a notification end command to the mobile terminal (S650).

The display of information satisfying the preset condition may be ended in various reasons. For example, when the user input unit 123 (refer to FIG. 1) formed to switch the touch screen 351 of the wearable device 300 to an inactive state is pressed, the touch screen 351 is switched from an active state to an inactive state, and the display of information satisfying the preset condition is ended. For another example, when a user input is not applied for a predetermined period of time in a state that information satisfying the preset condition is displayed, the touch screen 351 is switched from an active state to an inactive state, and the display of information satisfying the preset condition is ended. For still another example, when a new event occurs, information satisfying the preset condition is switched to information associated with the new event, and thus the display of information satisfying the preset condition is ended.

When the display of information satisfying the preset condition is ended, the visual information is not required to be no longer displayed, and thus the wearable device 300 transmits a notification end command to the mobile terminal 100 to end the display of the visual information on the mobile terminal 100.

Then, an operation associated with information satisfying the preset condition may be carried out on the mobile terminal 100. For example, information satisfying the preset condition may be displayed in a predetermined enlargement ratio on the mobile terminal 100 or a file corresponding to the information satisfying the preset condition may be carried out to display an execution screen of the file on the mobile terminal 100. An operation carried out on the mobile terminal 100 varies according to information satisfying the preset condition being displayed on the wearable device 300.

FIGS. 7A, 7B, 7C, 7D, 7E and 7F are conceptual views illustrating the control of a wearable device as an example of operation implemented by the control method of FIG. 6.

The wearable device 300 according to the present disclosure displays screen information while the touch screen 351 is in an active state. When information satisfying the preset condition is contained in the screen information, the wearable device 300 transmits notification information corresponding to information satisfying the preset condition to the mobile terminal 100.

The mobile terminal 100 receiving the notification information may be a terminal registered to perform pairing with the wearable device 300 in advance as a terminal located within a predetermined distance from the wearable device 300.

The wearable device 300 does not generate the notification information when there is no terminal located within a predetermined distance or there is no terminal paired therewith in advance. However, the wearable device 300 may display guide information for guiding the registration of a mobile terminal to be paired therewith.

The wearable device 300 generates and transmits notification information to the mobile terminal 100 to display visual information corresponding to information satisfying the preset condition on the mobile terminal 100. There may exist various information satisfying the preset condition, and the wearable device 300 transmits different notification information to the mobile terminal 100 according to the type of the information satisfying the preset condition. Accordingly, the mobile terminal 100 displays different visual information based on the received notification information.

Figure 7A:
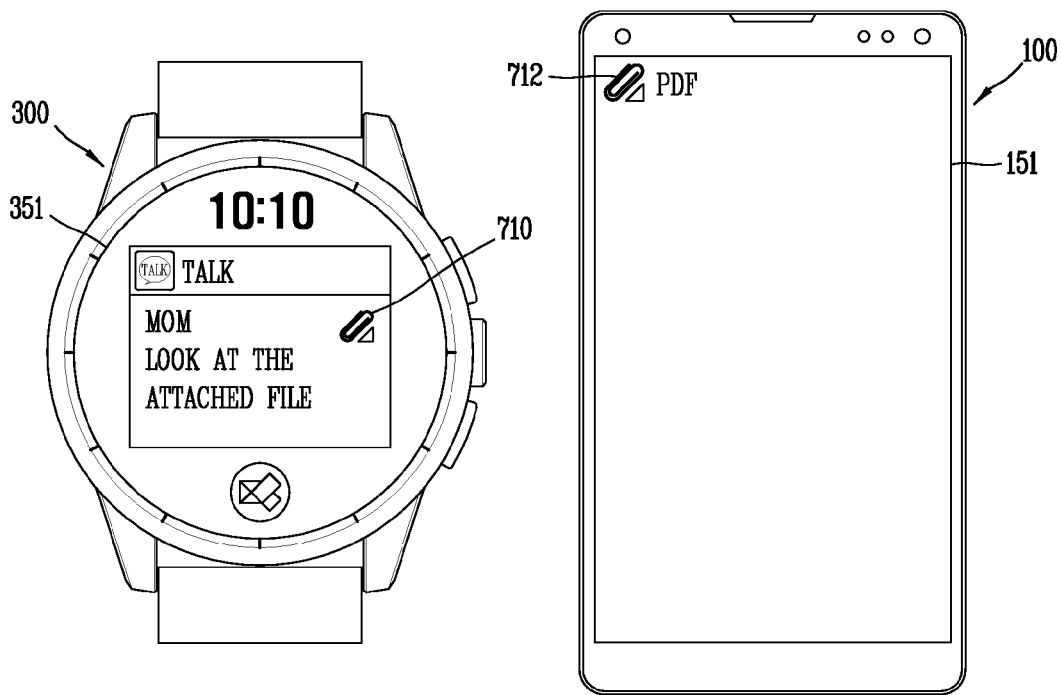
FIGS. 7A, 7B, 7C, 7D, 7E and 7F are conceptual views illustrating the control of a wearable device as an example of operation implemented by the control method of FIG. 6.

For an example, referring to FIG. 7A, when a message containing an attachment file is received, the wearable device 300 displays the content of the received message on the touch screen 351 of the wearable device 300. The content of the received message may include information associated with an attachment file, and the information associated with the attachment file may include at least one of a title of the attachment file, and a link or graphic object formed to execute the attachment file.

Various types of files may be transmitted as an attachment file, and a graphic object formed to execute the attachment file may be the same regardless of the type of the file. For example, when a PDF file is transmitted as an attachment file as illustrated in FIG. 7A or a video file is transmitted as an attachment file as illustrated in FIG. 7B, a graphic object 710, 720 formed to execute the attachment file may have the same shape.

On the other hand, since a graphic object formed to execute the attachment file is information satisfying the preset condition, the wearable device 300 generates and transmits notification information corresponding to the attachment file to the mobile terminal 100. The notification information may include at least one of visual information that should be displayed on the mobile terminal, the attachment file, a title of the attachment file, a link formed to execute the attachment file, a link to download the attachment file, a server address providing the attachment file, information on the counterpart terminal that has transmitted the attachment file, and information on an application that has received the attachment file.

The mobile terminal 100 may display visual information indicating that the attachment file is being displayed on the wearable device 300 based on the notification information received from the wearable device 300. In other words, when a link or graphic object formed to execute a file is displayed on the wearable device 300, a "file icon" may be displayed as visual information on the mobile terminal 100.

Figure 7B:
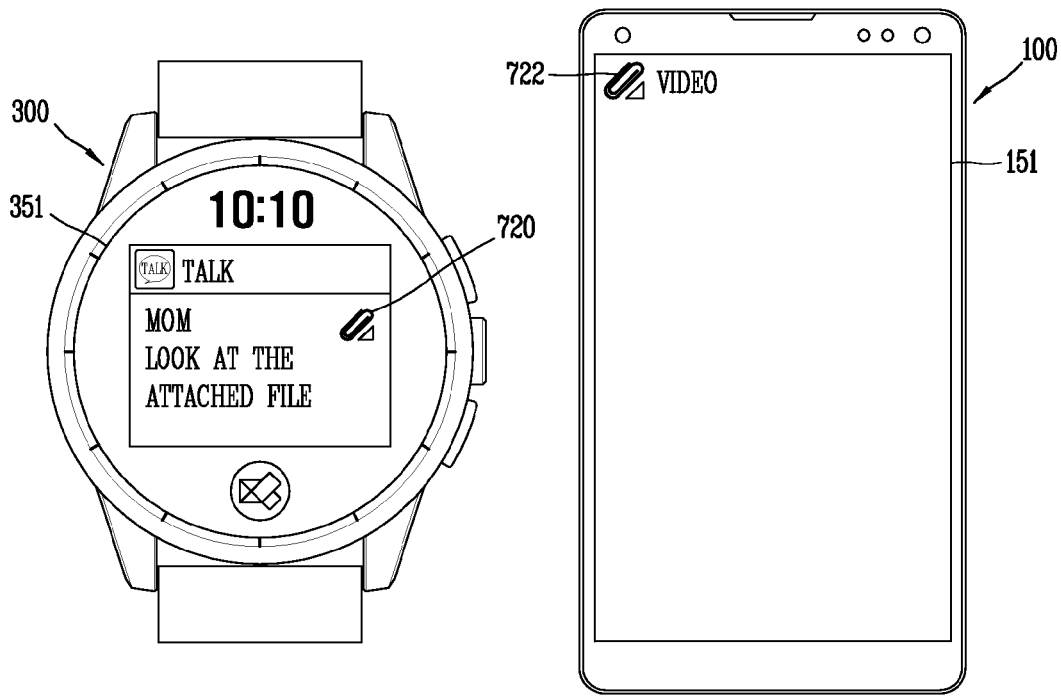

For example, the mobile terminal 100 may display visual information 712 indicating that a PDF file is being displayed as an attachment file on the wearable device 300 as illustrated in FIG. 7A or display visual information 722 indicating that a video file is being displayed as an attachment file on the wearable device 300 as illustrated in FIG. 7B. Text information guiding a file type may be displayed as visual information along with the foregoing file icon.

Furthermore, the wearable device 300 may display a web document through the execution of a browser or the like. When an image or video is contained in the web document, the wearable device 300 may determine that information satisfying the preset condition is being displayed. In this case, the wearable device 300 generates and transmits notification information to the mobile terminal 100 to display visual information corresponding to information satisfying a preset condition on the mobile terminal 100.

Figure 7C:
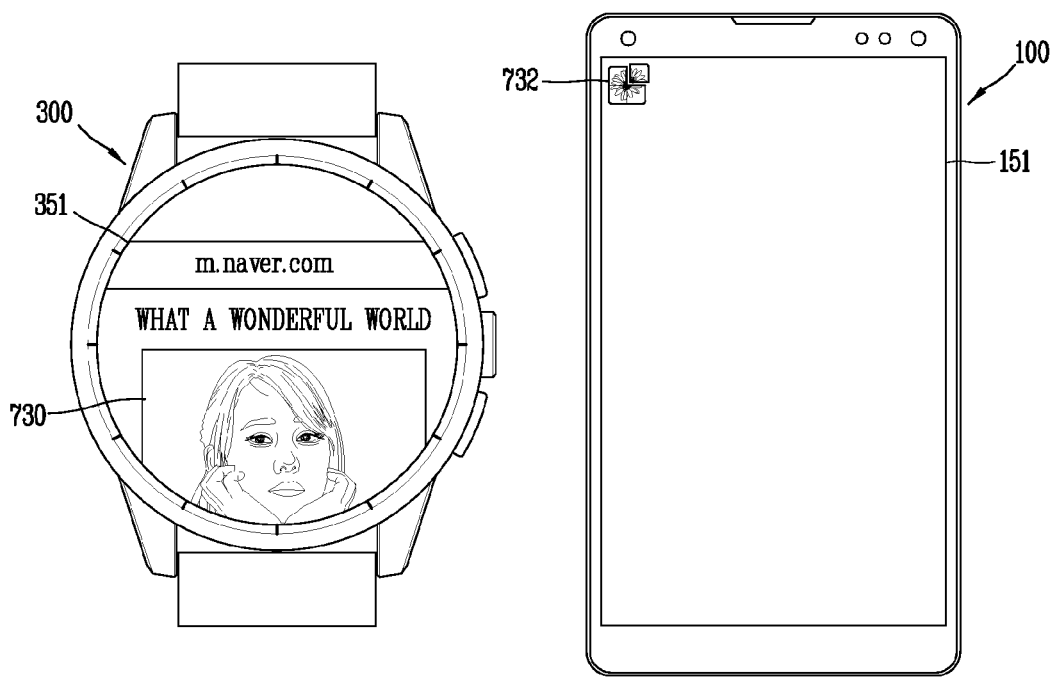

For example, as illustrated in FIG. 7C, when an image 730 is displayed on the wearable device 300, the mobile terminal 100 may display visual information 732 corresponding to the image 730. When an image is displayed on the wearable device 300, a "gallery icon" may be displayed as visual information on the mobile terminal 100, and when a video is displayed on the wearable device 300, a "video icon" may be displayed as visual information on the mobile terminal 100.

Figure 7D:
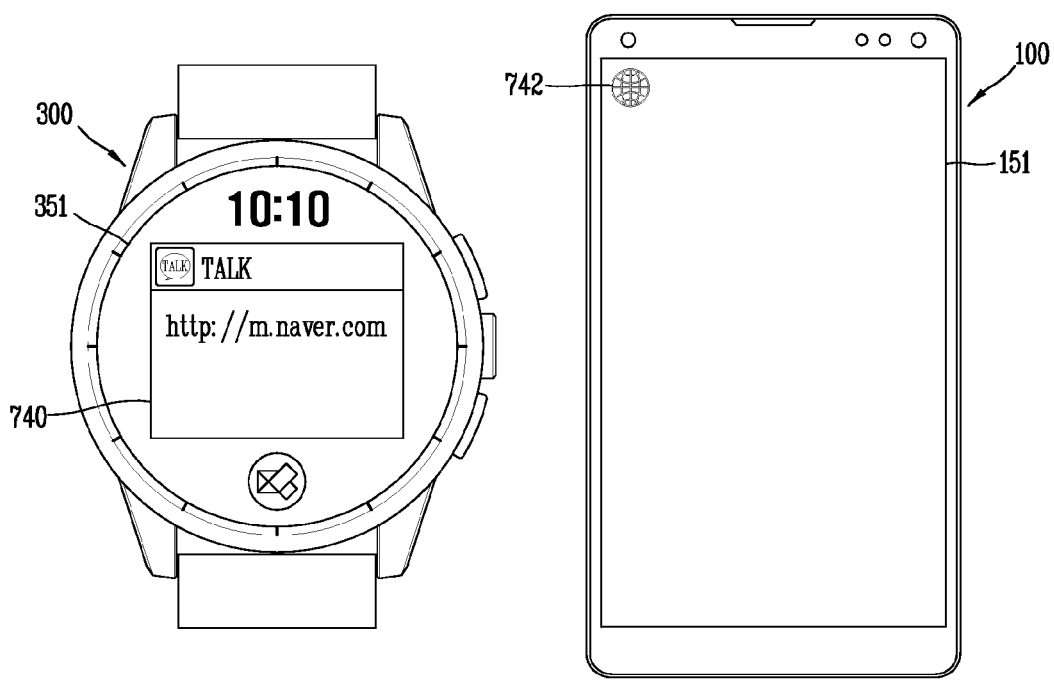

Furthermore, as illustrated in FIG. 7D, when a uniform resource locator (URL) is displayed on the touch screen 351 of the wearable device 300, a "browser icon" may be displayed as visual information 742 on the mobile terminal 100.

On the other hand, a time point at which notification information is transmitted may be modified in various ways.

For example, when information satisfying the preset condition is displayed on the wearable device 300, notification information may be transmitted to the mobile terminal 100. For another example, notification information may be transmitted to the mobile terminal 100 when information satisfying the preset condition is displayed for a predetermined period of time.

For still another example, upon receiving an execution command for a file that is non-executable on the wearable device 300, the wearable device 300 may generate and transmit notification information for the non-executable file to the mobile terminal 100.

In general, when a touch is applied to a link or graphic object formed to execute an attachment file, the wearable device 300 downloads an attachment file from a server, and executes the downloaded attachment file. Then, an execution screen of the attachment file is displayed on the touch screen 351 of the wearable device 300.

Figure 7E:
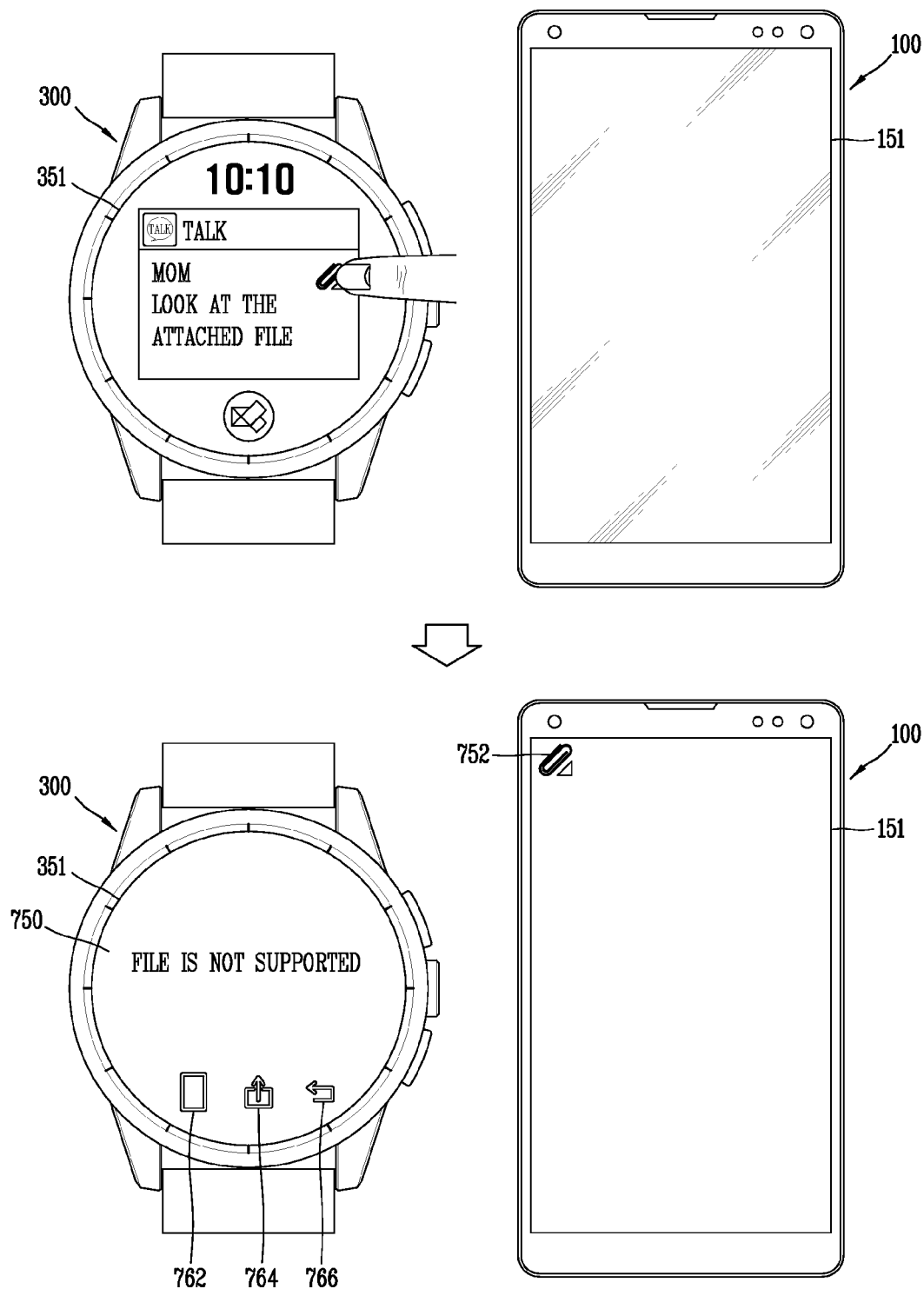

However, upon receiving an execution command for a non-executable file, the wearable device 300 displays guide information 750 indicating that it is a non-executable file on the wearable device 300 as illustrated in FIG. 7E, and transmits notification information to the mobile terminal 100. Accordingly, the mobile terminal 100 displays visual information 752 for guiding that a file that is non-executable on the wearable device 300 is being displayed.

The guide information 750 may include a first icon 762 formed to execute a file that is non-executable on the wearable device 300, a second icon 764 formed to transfer the file to a server or the like, and a third icon 766 formed to display a previous screen. When a touch is applied to the first icon 762, the touch screen 351 of the wearable device 300 displays time information or is switched to an inactive state, and the touch screen 151 of the mobile terminal 100 displays an execution screen of the file.

Figure 7F:
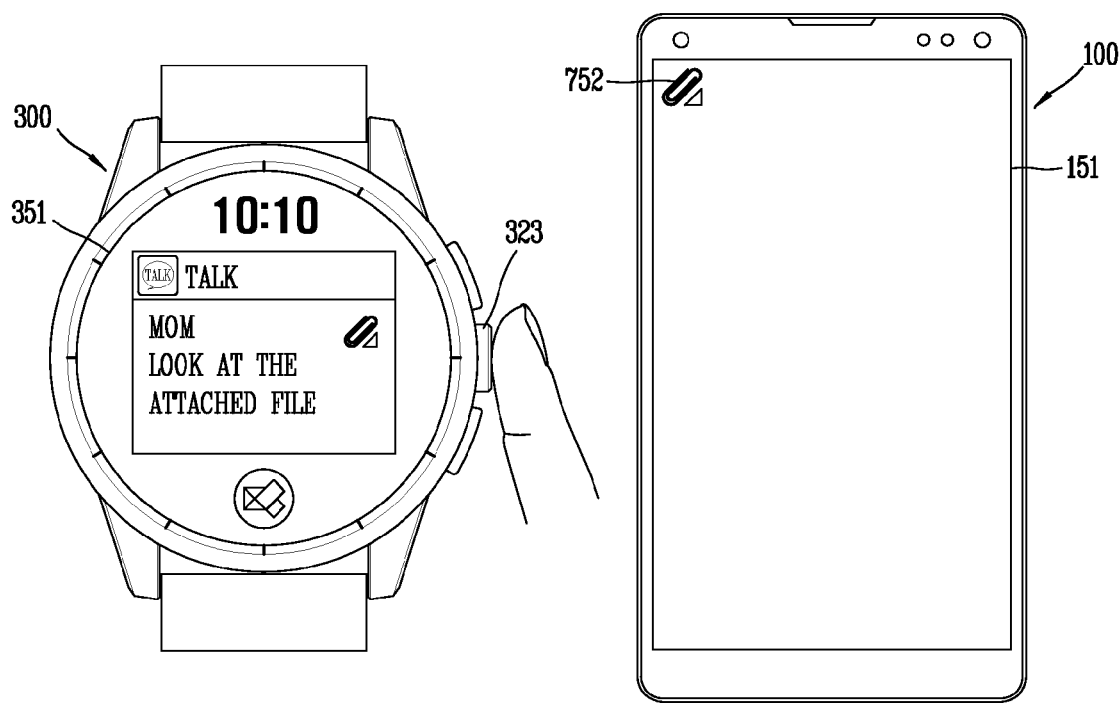
Figure 7F:
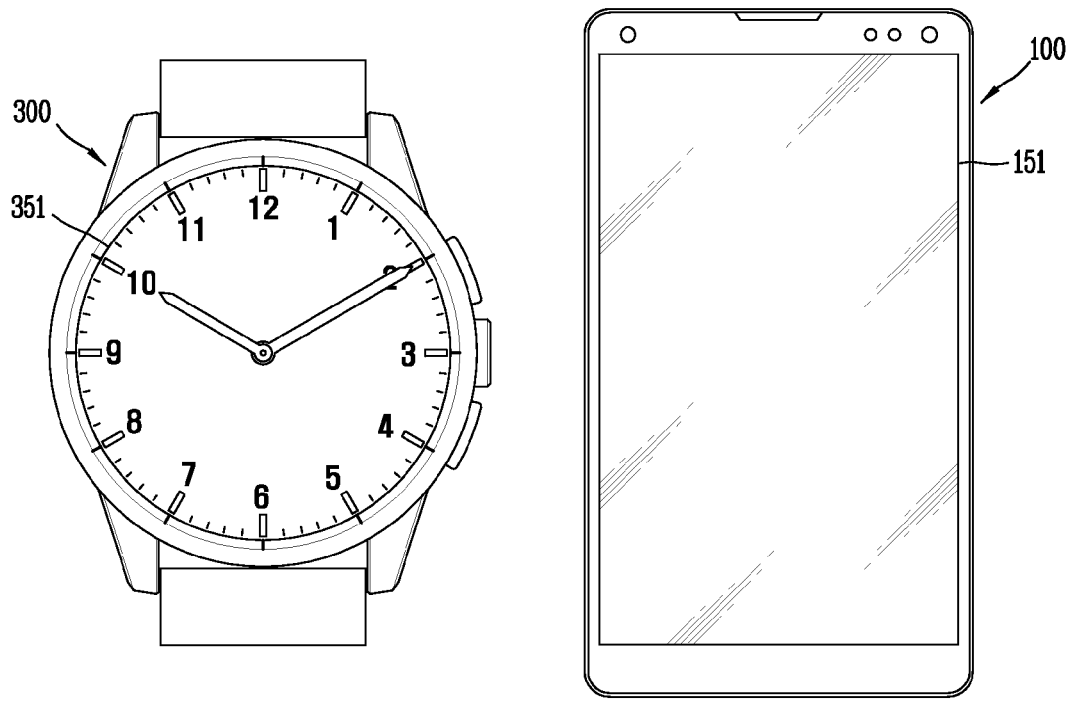

On the other hand, referring to FIG. 7F, a user input unit 323 is disposed on a lateral surface of the wearable device 300, and the user input unit 323 may have a crown shape. The wearable device 300 controls the touch screen 351 to display time information as a preset user input is applied to the user input unit 323. As time information is displayed, the display of information satisfying a preset condition that has been previously displayed thereon is ended, and at this time, the wearable device 300 generates and transmits a notification end command to the mobile terminal 100. The mobile terminal 100 ends the display of visual information, and switches the touch screen 151 from an active state to an inactive state in response to the notification end command.

Figure 8:
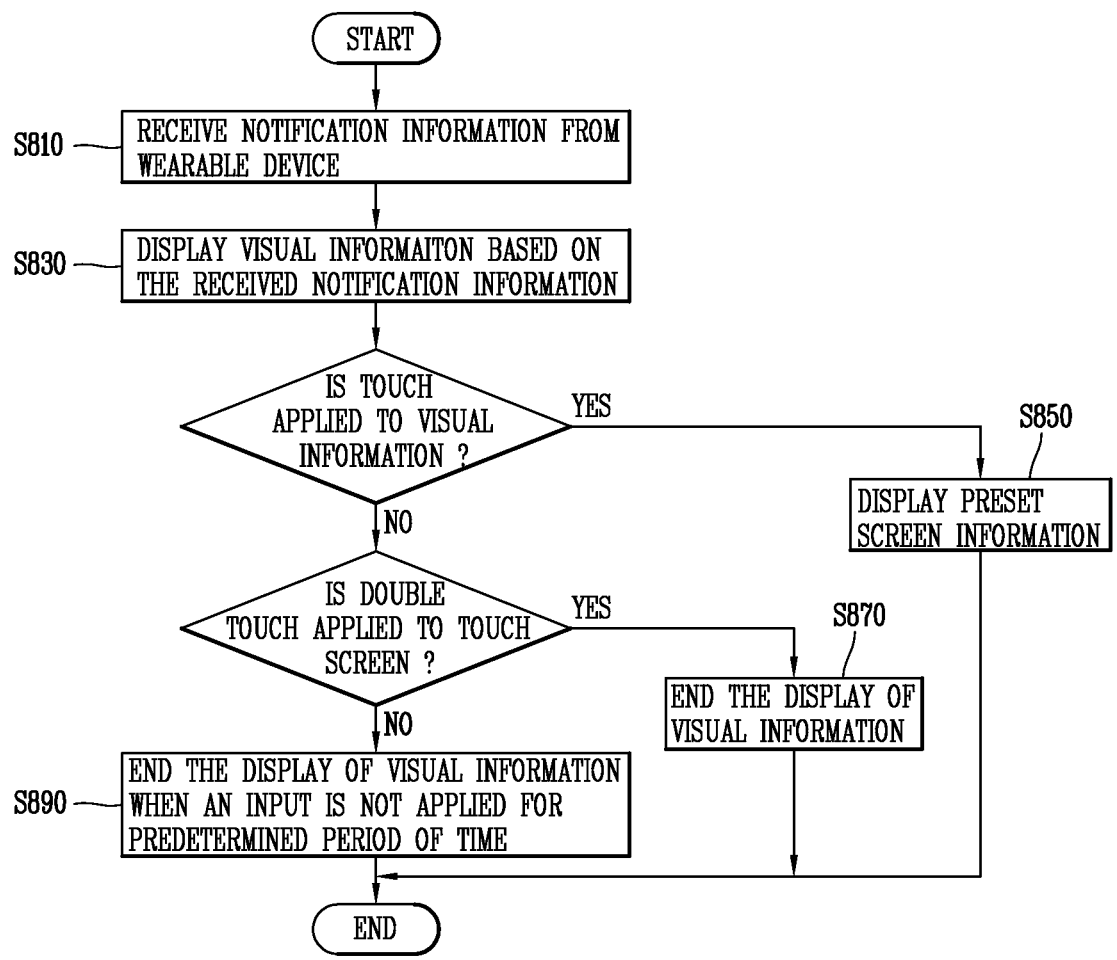
FIG. 8 is a flow chart representatively illustrating a control method of a mobile terminal according to the present disclosure.
Figure 9A:
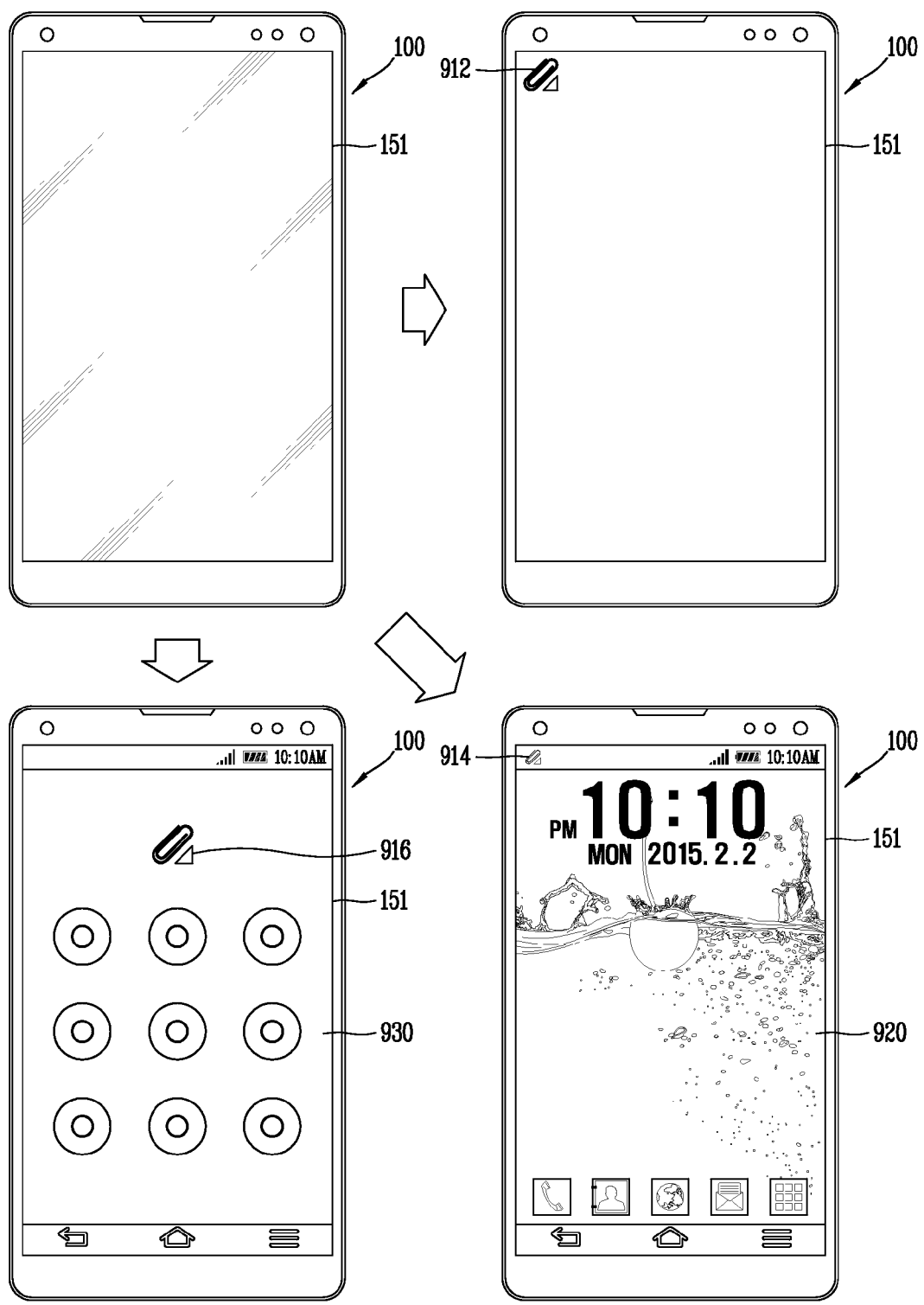
FIGS. 9A and 9B are conceptual views illustrating the control of a mobile terminal corresponding to the reception of notification information as an example of operation implemented by the control method of FIG. 8.
Figure 9B:
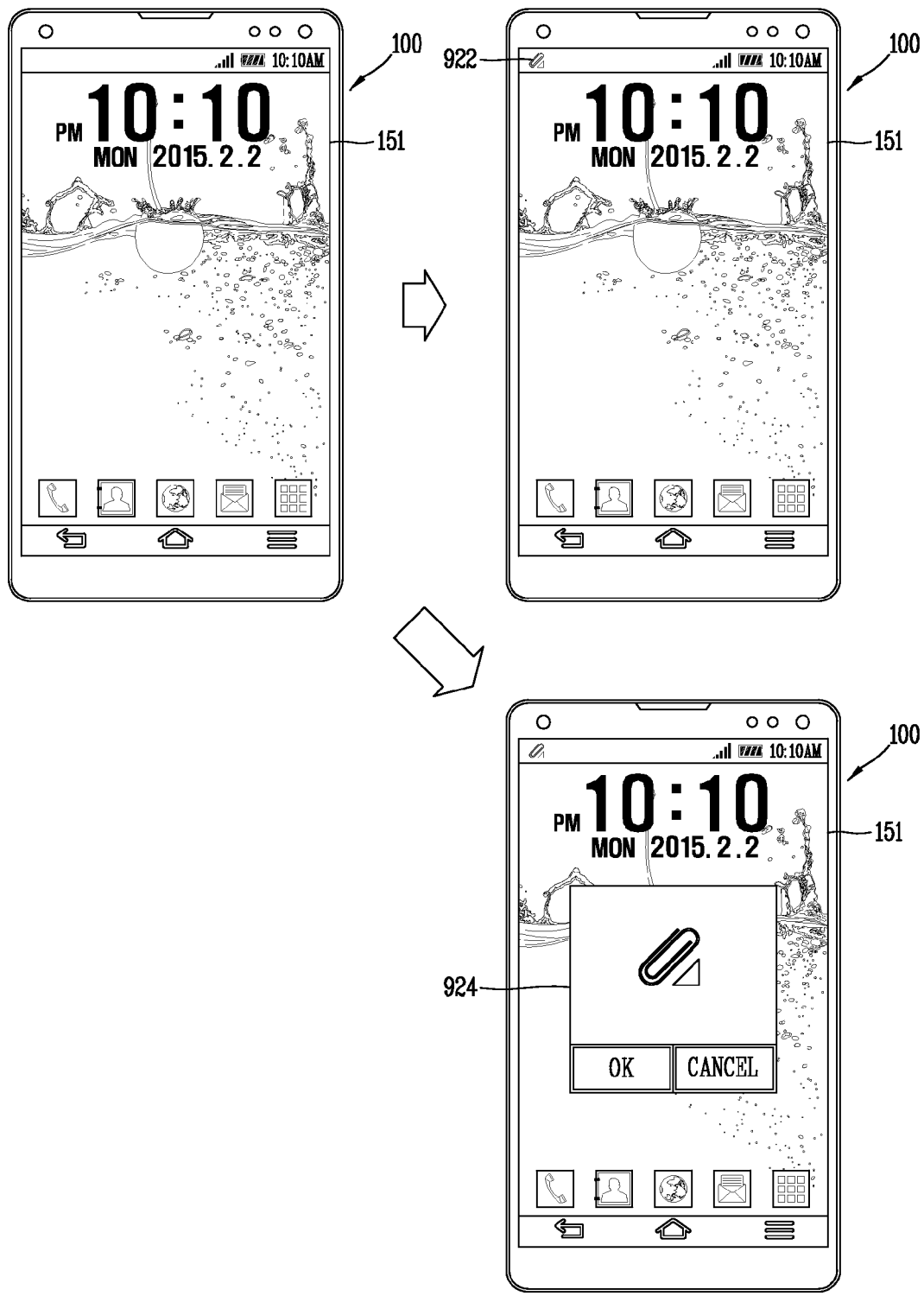

FIG. 8 is a flow chart representatively illustrating a control method of a mobile terminal according to the present disclosure, and FIGS. 9A and 9B are conceptual views illustrating the control of a mobile terminal corresponding to the reception of notification information as an example of operation implemented by the control method of FIG. 8.

The mobile terminal 100 according to the present disclosure may display visual notification whether or not information satisfying a preset condition is displayed on the wearable device 300. More specifically, the wireless communication unit, touch screen and controller of the mobile terminal 100 cooperate together to perform a notification output function.

The notification output function may be carried out in the sequence of receiving notification information from the wearable device 300 connected thereto in a wireless manner (S810), and displaying visual information based on the received notification information (S830).

When the visual information is displayed, the mobile terminal 100 may differently operate according to the status of the touch screen 151. Specifically, the mobile terminal 100 may perform a different operation according to whether or not the touch screen 151 is in an active state or in an inactive state upon receiving the notification information.

For example, as illustrated in FIG. 9A, when the touch screen 151 is in an inactive state, the mobile terminal 100 may switch at least one region of the touch screen 151 from the inactive state to an active state, and display visual information 912, 914, 916 in one region that has been switched to the active state in response to the received notification information.

When a partial region of the touch screen 151 is switched to an active state, the mobile terminal 100 may switch a partial region adjacent to an edge of the touch screen 151 to an active state, and maintain the remaining region in an inactive state.

On the other hand, when the entire region of the touch screen 151 is switched to an active state, different screen information may be displayed according to whether or not it is in a locked state. A home screen 920 may be displayed when it is in a released state, and a lock screen 930 may be displayed in at least one region of the touch screen 151 when it is in a locked state in which the execution of an application is restricted. Furthermore, visual information 914, 916 is displayed in at least one region of the touch screen 151.

On the contrary, as illustrated in FIG. 9B, when the touch screen 151 is in an active state, a home screen may be displayed on the touch screen 151 of the mobile terminal. The home screen may include at least one object, and the object may be an icon or widget of an application installed on the mobile terminal 100. However, a home screen being displayed on the touch screen 151 is only an example, and a graphic user interface (GUI) of an application currently being executed may be displayed on the display unit 151.

At this time, visual information may be displayed in a status information region (922) or displayed within a pop-up window (S924). Here, the status information region denotes a region in which at least one of antenna information, communication mode information, battery information, information on an occurred event, information on a set function and time information of the mobile terminal 100 is displayed.

On the other hand, when a touch is applied to the visual information, the mobile terminal 100 displays preset screen information (S850). The preset screen information corresponds to information satisfying a preset condition being displayed on the wearable device 300, and varies according to the type of information satisfying the preset condition.

For example, when a URL is displayed on the wearable device 300, a web document corresponding to the URL may be displayed as the preset screen information on the mobile terminal 100.

For another example, when a link or graphic object formed execute a file is displayed on the wearable device 300, an execution screen of the file may be displayed as the preset screen information on the mobile terminal 100. At this time, the mobile terminal 100 may receive a file in a wireless manner from the wearable device 300 or acquire a hyperlink capable of downloading a file to download the file.

For still another example, when a first virtual keypad is displayed on the wearable device 300, a second virtual keypad may be displayed as the preset screen information on the mobile terminal 100.

When a double touch is applied to the touch screen 151 displayed with visual information, the mobile terminal 100 ends the display of the visual information (S870). Then, the mobile terminal 100 may switch at least one region of the touch screen 151 in an active state to an inactive state.

A double touch may include at least two or more touches consecutively applied within a reference period of time. The double touch is limited to a case where the at least two or more touches are sensed within the reference period of time, and moreover, applied within a predetermined region of the touch screen 151. For example, the double touch may denote a plurality of knocks consecutively sensed within a predetermined region within a reference period of time. Here, the reference time may be a very short period of time, for example, 300 ms to 2 seconds. Furthermore, the predetermined region may denote a small region in which a position to which the tap gestures are applied is the same, or regarded as the same position.

When a double touch is applied, the mobile terminal 100 limits the display of visual information for a reference period of time. More specifically, even though new notification information is received from the wearable device 300 within a reference period of time from a time point at which the display of visual information is ended by a double touch, the mobile terminal 100 limits the display of visual information due to the new notification information. A user's double touch applied to the mobile terminal 100 is a positive intention not to use visual information. Here, the reference time may be set to 30 minutes, 1 hour or the like in various ways, and changed by the user.

On the other hand, when a user input is not applied for a predetermined period of time in a state that visual information is displayed, the mobile terminal 100 ends the display of visual information (S890). In other words, unless a touch is applied to the touch screen 151 of the mobile terminal 100 within the predetermined period of time from a time point at which the display of the visual information is initiated, the mobile terminal 100 switches the touch screen 151 from the active state to the inactive state. It is to prevent the battery of the mobile terminal 100 from being consumed unnecessarily.

Figure 10:
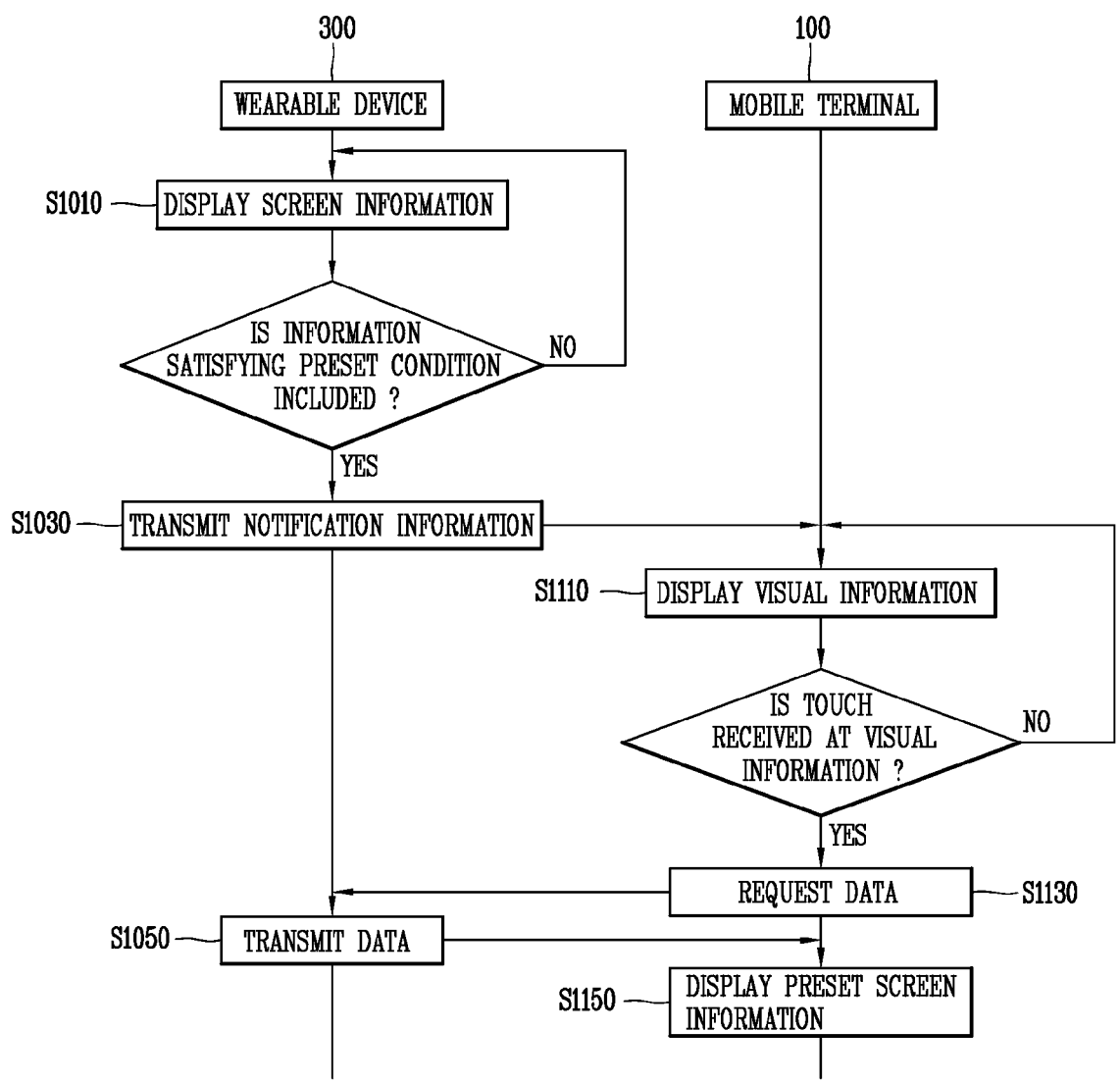
FIG. 10 is a flow chart representatively illustrating a control method of a mobile terminal system including a wearable device and a mobile terminal according to the present disclosure.

FIG. 10 is a flow chart representatively illustrating a control method of a mobile terminal system including a wearable device and a mobile terminal according to the present disclosure. A mobile terminal system according to the present disclosure may include a wearable device 300 and a mobile terminal 100.

First, the wearable device 300 displays screen information (S1010). When information satisfying a preset condition is included in the screen information, the wearable device 300 transmits notification information to the mobile terminal 100 (S1030).

The mobile terminal 100 displays visual information in response to the transmitted notification information (S1110). As a result, the screen information including information satisfying the preset condition is displayed on the wearable device 300, and the visual information is displayed on the mobile terminal 100. At this time, the visual information varies according to information satisfying the preset condition.

Next, upon receiving a touch to the visual information, the mobile terminal 100 requests data for information satisfying the preset condition (S1130), and the wearable device 300 transmits data to the mobile terminal 100 in response to the request (S1050).

When the information satisfying the preset condition is associated with a file, the data may be data corresponding to the file, and when the information satisfying the preset condition is a URL, the data is data corresponding to the URL. However, when needed data is contained in notification information, the mobile terminal 100 may omit the step of requesting data (S1110).

Next, the mobile terminal 100 displays preset screen information in response to the data received from the wearable device 300 (S1150). The preset screen information corresponds to information satisfying the preset condition, and varies according to the type of information satisfying the preset condition.

A control method associated with the present disclosure illustrated in FIG. 10 may be implemented in various forms as illustrated in FIGS. 11A through 15B. According to a specific embodiment which will be described below, the same or similar reference numerals are designated to the same or similar configurations, and the description thereof will be substituted by the earlier description.

FIGS. 11A, 11B, 11C, 11D and 11E are conceptual views for explaining the operation of a wearable device and a mobile terminal when a video file or video link is displayed on the wearable device.

Figure 11A:
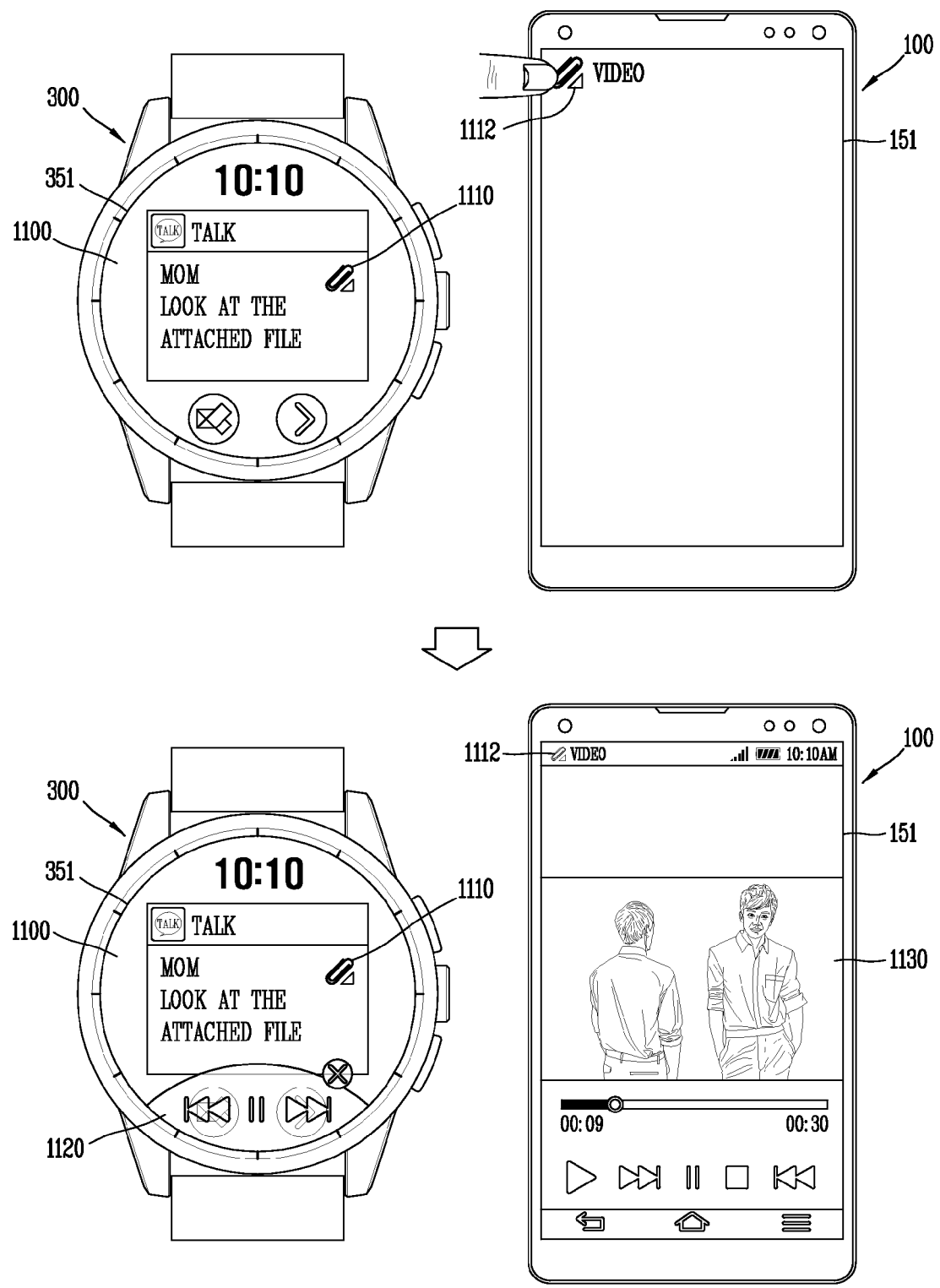
FIGS. 11A, 11B, 11C, 11D and 11E are conceptual views for explaining the operation of a wearable device and a mobile terminal when a video file or video link is displayed on the wearable device.

Referring to FIG. 11A, upon receiving a message attached with a video file, the wearable device 300 may display a graphic object 1110 formed to execute the video file along with the content of the message 1100.

The mobile terminal 100 displays visual information 1112 corresponding to the graphic object 1110 in response to displaying the graphic object 1110 on the wearable device 300.

When a touch is applied to the visual information 1112, the mobile terminal 100 receives and plays the video file from the wearable device 300, and display screen information 1130 based on the playback on the touch screen 151. As a result, the user may check a received message using the wearable device 300, and check a playback screen of the video file using the mobile terminal 100.

On the other hand, the wearable device 300 may display at least one graphic object associated with video playback as the video file is played on the mobile terminal 100. For example, the graphic object may be linked with a control function such as video play, pause, skip forward, skip backward, and the like.

When a touch is applied to the graphic object, the wearable device 300 transmits a control command to the mobile terminal 100 to execute a control function linked with the graphic object on the mobile terminal 100. In other words, the mobile terminal 100 performs the role of a video player and the wearable device 300 performs the role of a remote controller.

Though not shown in the drawing, when at least one graphic object associated with the video play is displayed on the wearable device 300, the mobile terminal 100 may control not to display an interface formed to perform the same function as the graphic object on the touch screen 151. It is to prevent a video screen from being hidden by a graphic object.

On the other hand, when at least one graphic object associated with video play is displayed, the wearable device 300 may set at least one region of the touch screen 351 to a controller region to display at least one graphic object associated with the video play in the controller region.

For example, as illustrated in FIG. 11A, at least one graphic object associated with the video play may be displayed in at least one region 1120 of the touch screen 351 in a state that the content of the message 1100 is displayed as it is. As a result, the user may check a playback screen of an attached video using the mobile terminal 100 while checking the content of the message using the wearable device 300.

Figure 11B:
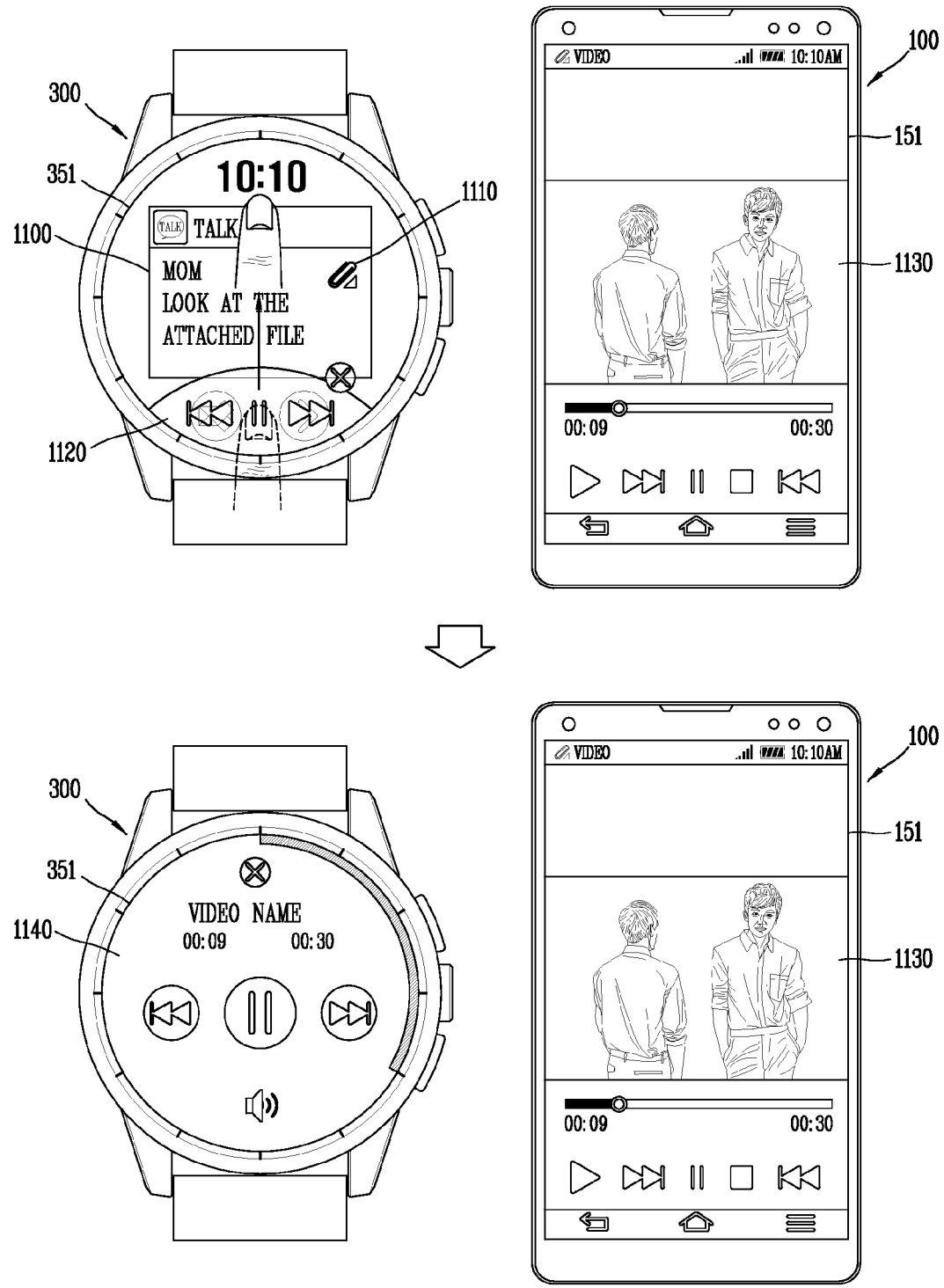

On the other hand, the size of the controller region 1120 may vary due to a drag input. For example, as illustrated in FIG. 11B, an image 1140, the size of which gradually varies along a path of drag input, is generated on the touch screen 351, and at least one graphic object associated with the video play is displayed within the image 1140. In other words, information is provided in a shape that the image 1140 is unfolded, and the graphic object may move along with the drag input. Furthermore, an amount of information displayed within the image 1140 may gradually increased. For an example, a graphic object associated with volume control, information associated with video being played, a playback progress status, and the like may be additionally displayed.

Figure 11C:
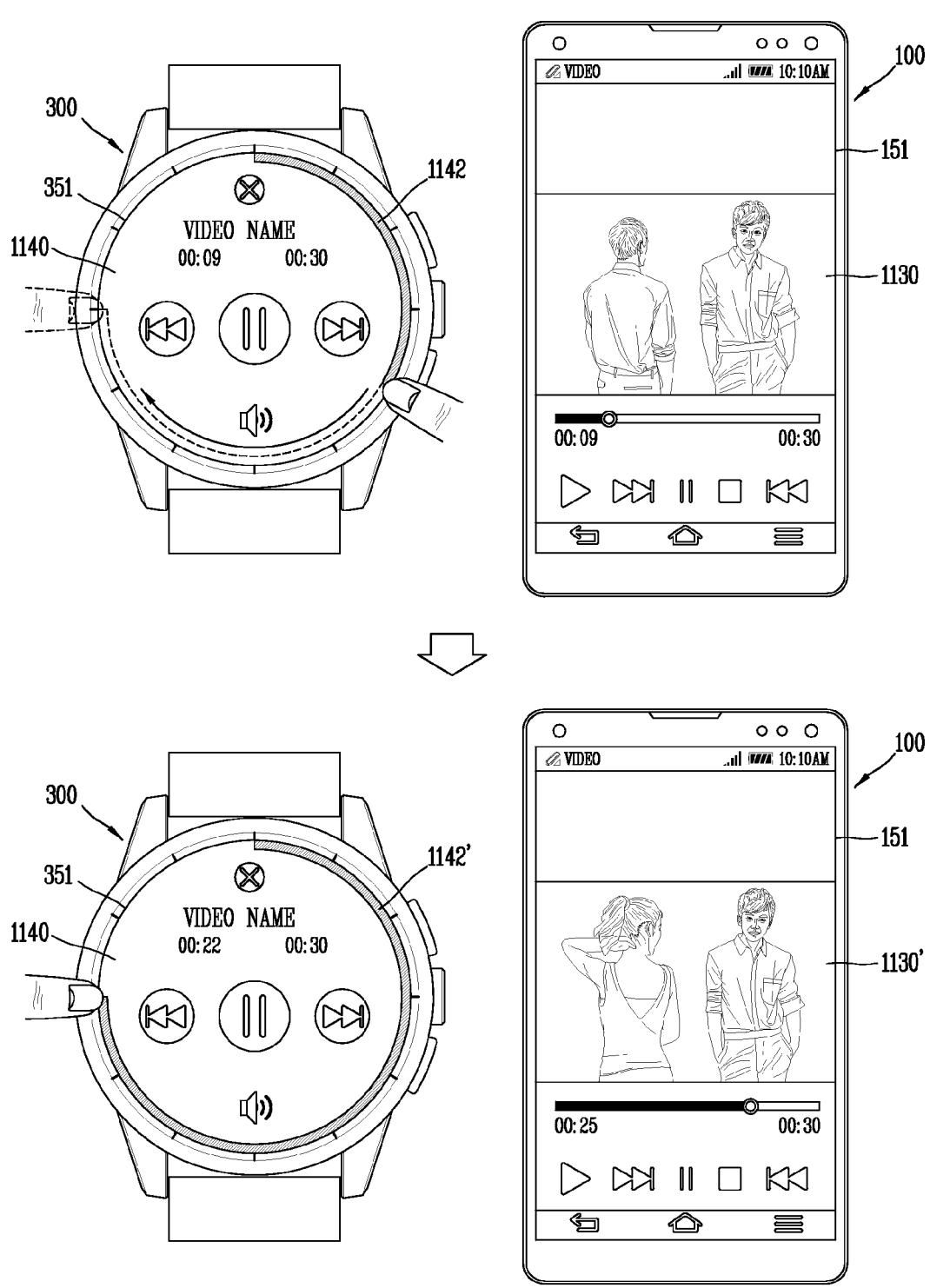

On the other hand, as illustrated in FIG. 11C, when the controller region is changed from a partial region of the touch screen 351 to the entire region (1120→1140), the wearable device 300 may show the playback progress status of the video using an edge of the touch screen 351.

More specifically, one position on an edge of the touch screen 351 is set to a start position and an end position. Furthermore, as video is being played back, an image 1142 started from the one position, the length of which is gradually changed in a clockwise direction along the edge of the touch screen 351, is displayed.

Due to the image 1142, the user may know the playback progress status. For example, when a 12 o'clock position is set to a start position and an end position, and an image started from the 12 o'clock position is extended to a 6 o'clock position, the playback progress ratio corresponds to 50%. When an image started from 12 o'clock is rotated in a clockwise direction and extended to the 12 o'clock, the playback progress ratio corresponds to 100%.

The playback progress status indicates an entire playback time of video, a playback position at which video is being played on the entire playback time, a remaining playback time up to the playback end, and a playback progress ratio.

On the other hand, when a drag input to one end of the image 1142 is sensed, the wearable device 300 produces a new playback position based on the drag input. Furthermore, a control command for moving a playback position of video being played on the mobile terminal 100 to the produced playback position is transmitted based on the drag input. The mobile terminal 100 moves a playback position to the produced playback position based on the transmitted control command (1130→1130').

Figure 11D:
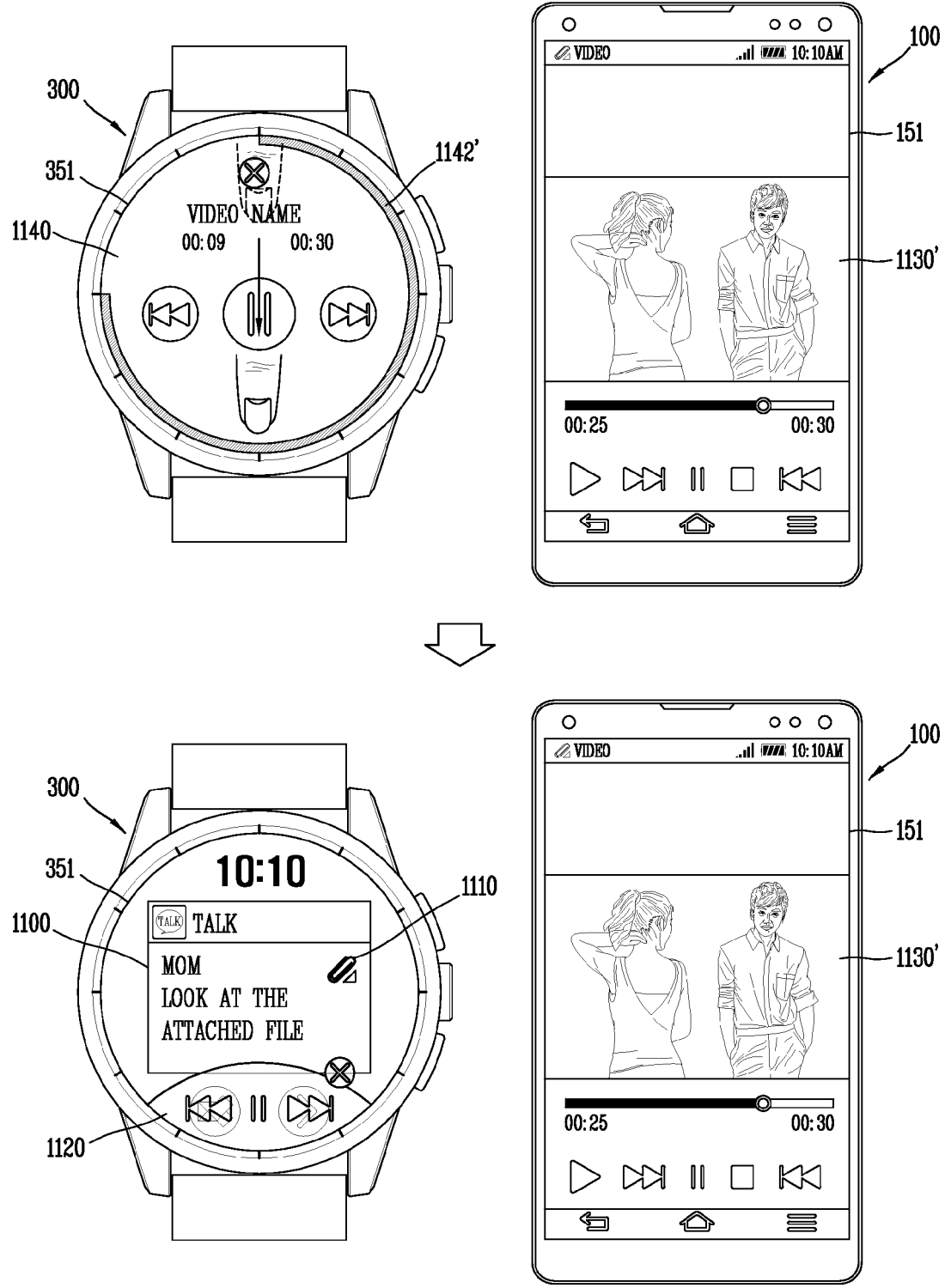

Referring to FIG. 11D, the controller region may be return to a partial region from the entire region of the touch screen 351 by a drag input (1140→1120). As a result, the user may adjust the size of the controller region not to disturb his or her viewing of content displayed on the wearable device 300.

Figure 11E:
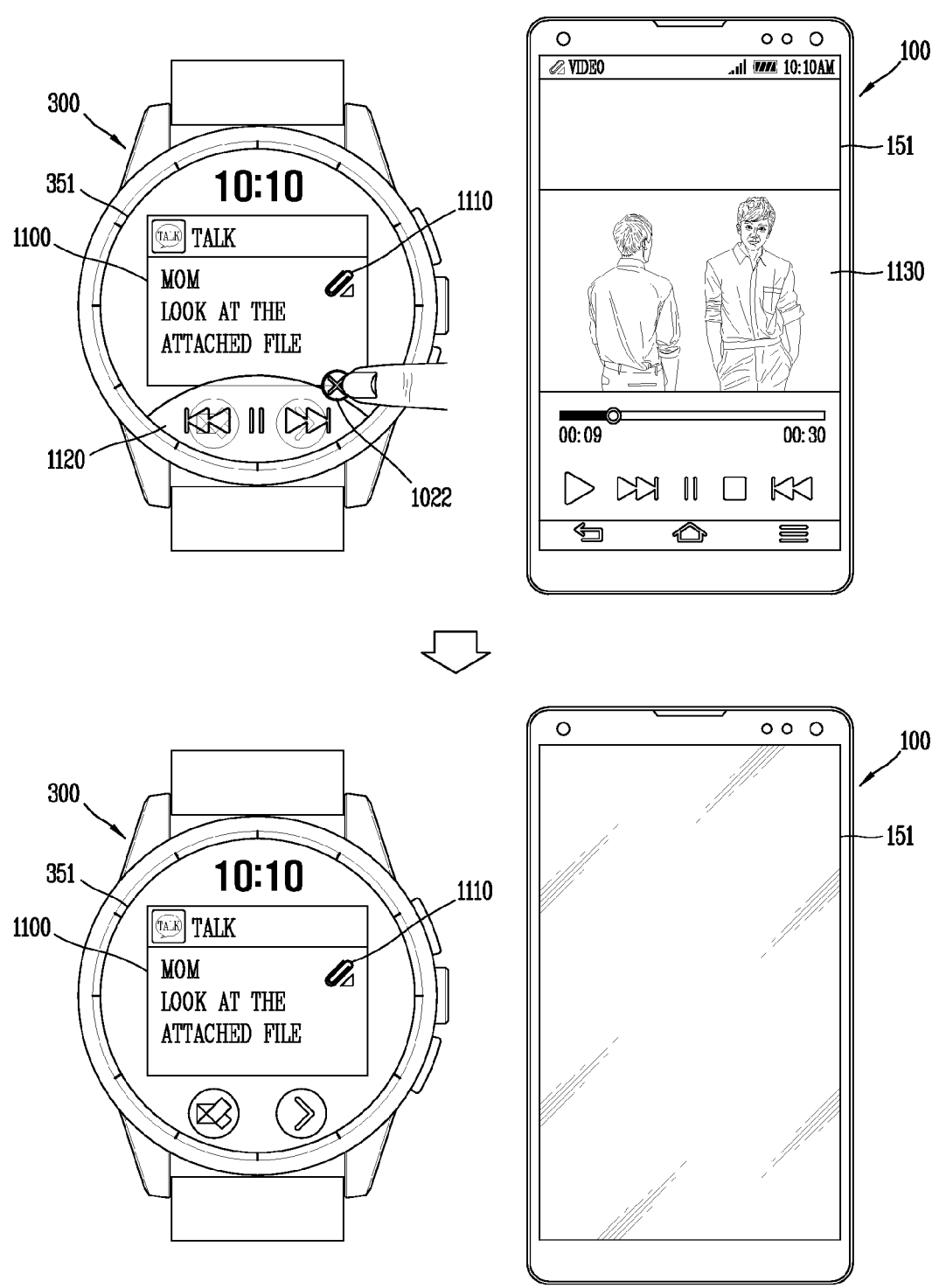

Furthermore, Referring to FIG. 11E, the wearable device 300 may transmit a control command to end video playback on the mobile terminal 100. More specifically, when a controller region is formed on the touch screen 351, an "X" indicator is generated. In this case, when the "X" indicator is touched, video playback is ended. As video play is ended, the wearable device 300 controls the touch screen 351 not to display the controller region, and the mobile terminal 100 switches the touch screen 151 from an active state to an inactive state.

Figure 12A:
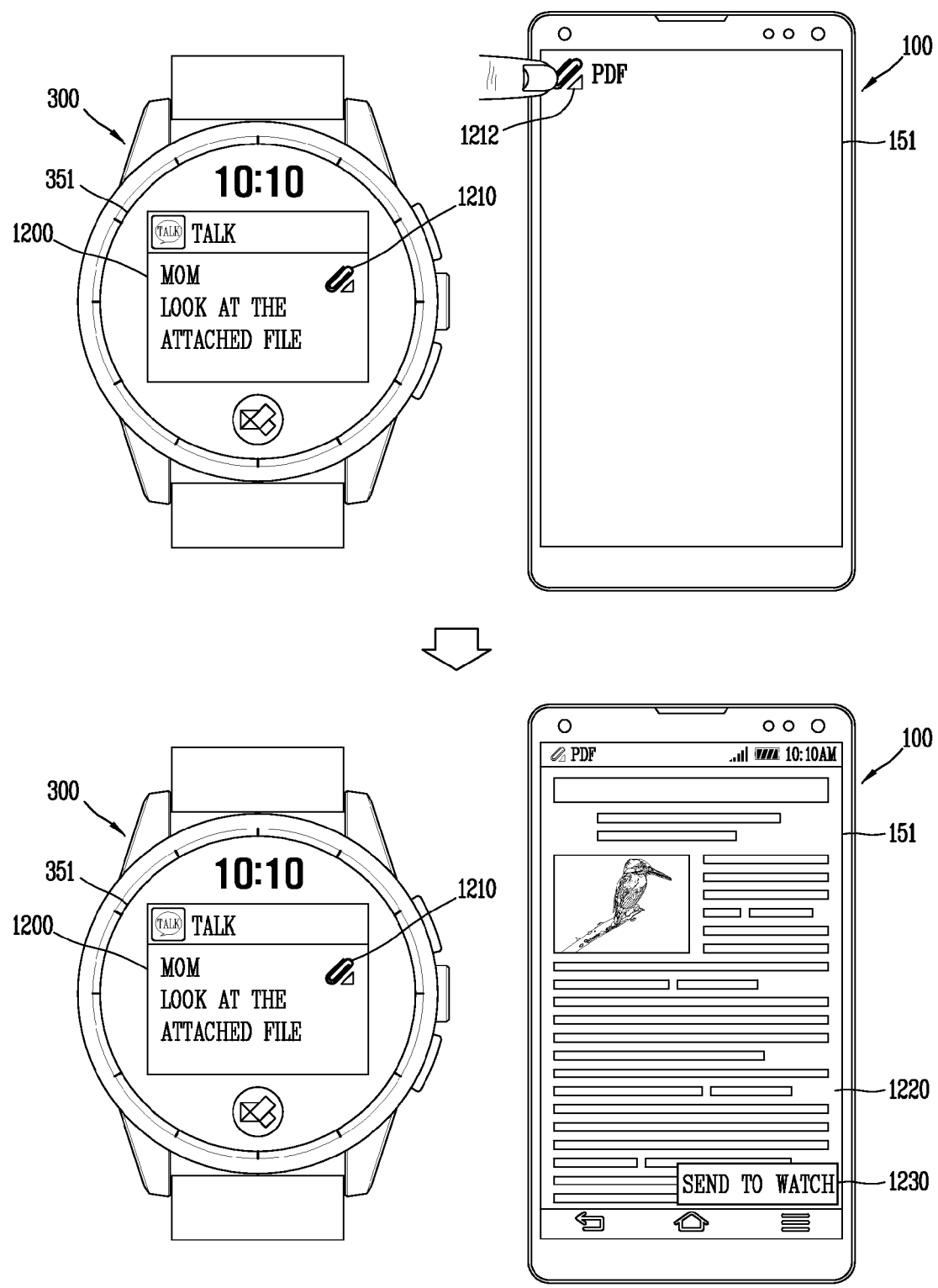
FIGS. 12A, 12B and 12C are conceptual views for explaining the operation of a wearable device and a mobile terminal when a non-executable file or file link is displayed on the wearable device.
Figure 12B:
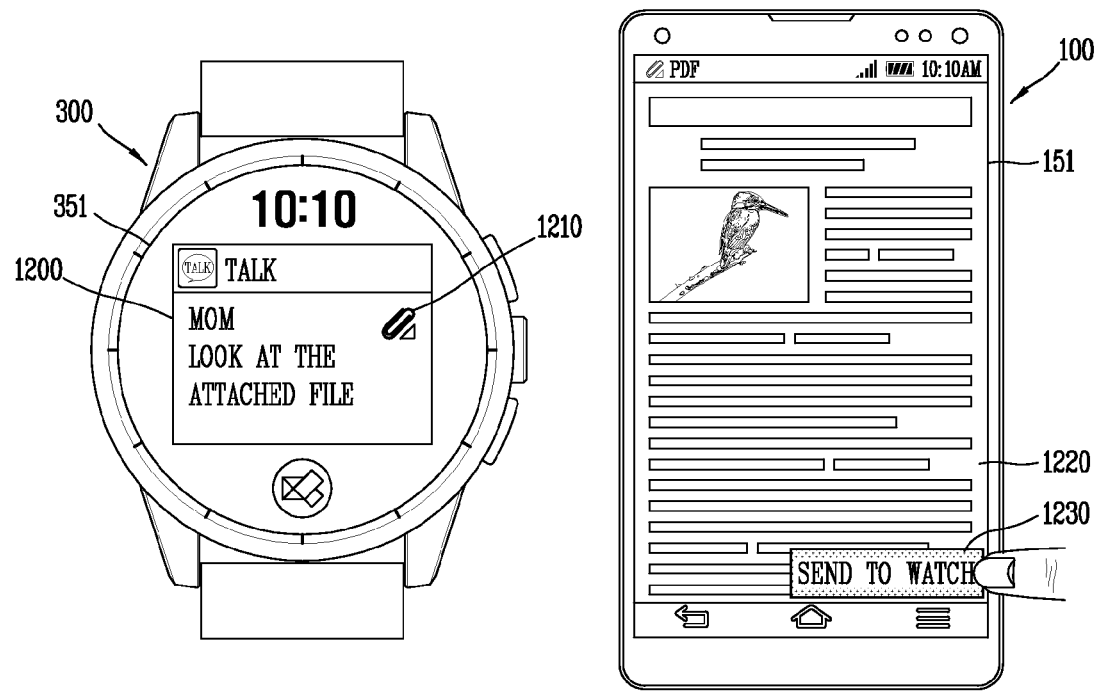
Figure 12B:
Figure 12B:
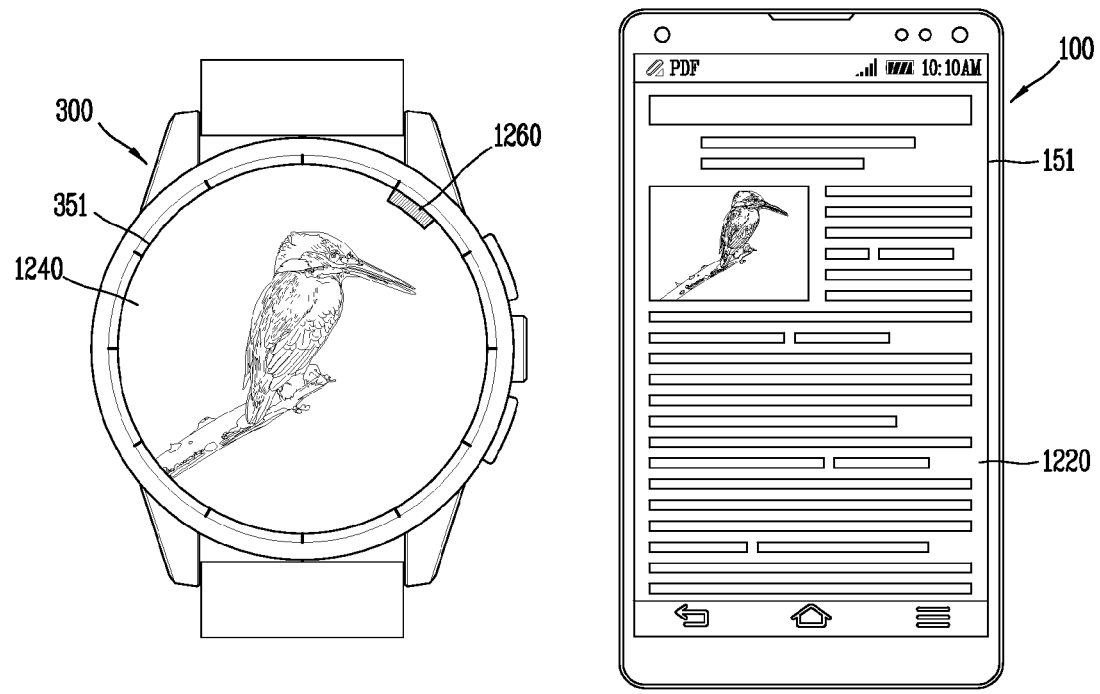
Figure 12C:
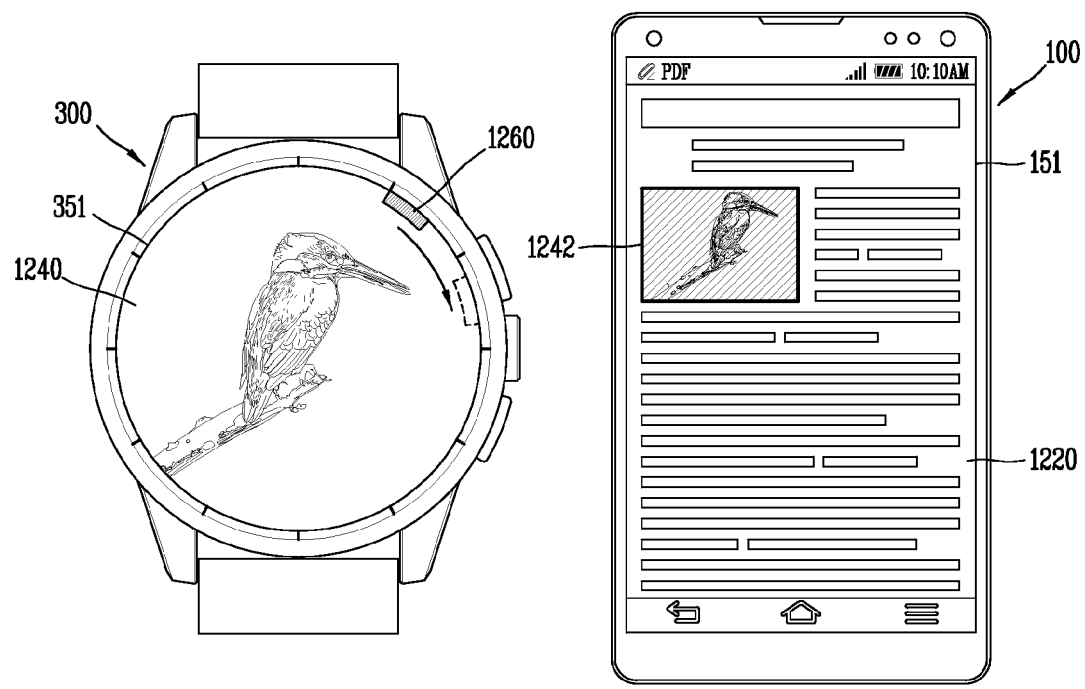
Figure 12C:
Figure 12C:
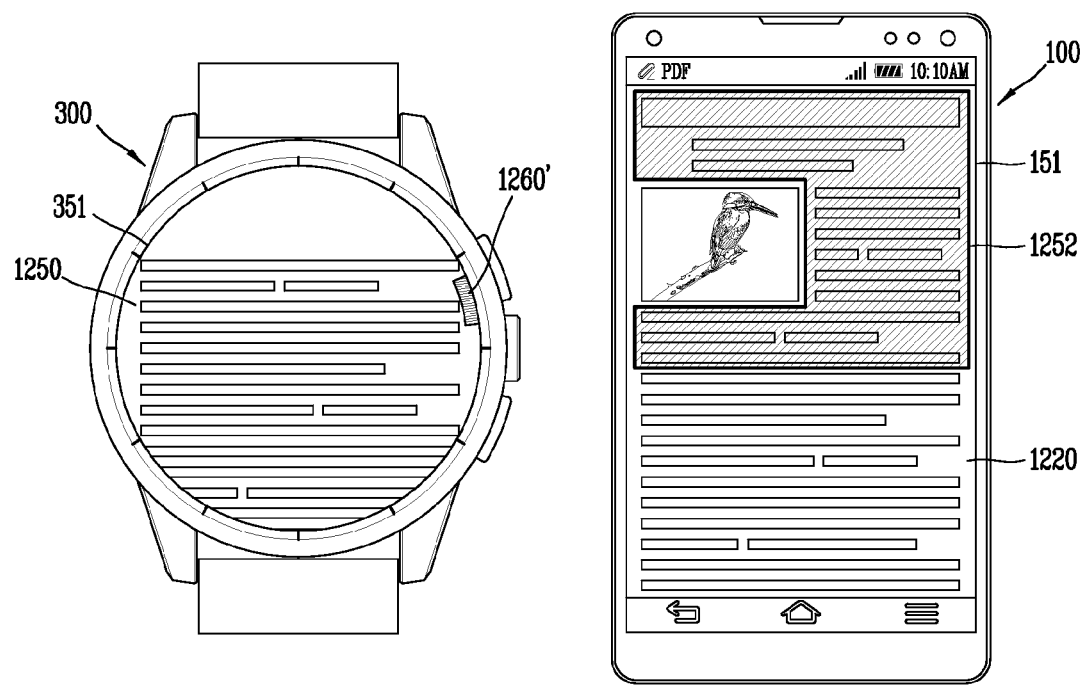

FIGS. 12A, 12B and 12C are conceptual views for explaining the operation of a wearable device and a mobile terminal when a non-executable file or file link is displayed on the wearable device.

As illustrated in FIG. 12A, screen information 1200 is displayed on the touch screen 351 of the wearable device 300, and the screen information 1200 may include a file link 1210. In this case, the mobile terminal 100 may display visual information 1212 corresponding to the file link 1210. The visual information 1212 may include text indicating a file icon, a file name, a file type corresponding to the file.

When a touch is applied to the visual information 1212, the mobile terminal 100 may receive a file corresponding to the file link from the wearable device 300 or access the file link to download the file. Furthermore, the mobile terminal 100 executes the file to display an execution screen 1220 of the file.

The screen information 1200 is information associated with a text received event, and the file link 1210 may be a link formed to download a file attached to the text. In this case, the user may check information associated with a text received event using the wearable device 300, and check an attachment file using the mobile terminal 100.

If the execution of the file is impossible on the mobile terminal 100, then the mobile terminal 100 may display guide information for guiding that the execution is impossible or search applications capable of executing the file to display the searched applications list.

On the other hand, when the execution screen 1220 of the file is displayed, the mobile terminal 100 may edit and transmit the execution screen 1220 of the file to the wearable device 300 to display the execution screen 1220 of the file on the wearable device 300.

More specifically, as illustrated in FIG. 12B, when the execution screen 1220 of the file is displayed on the touch screen 151 of the mobile terminal 100, a graphic object 1230 may be displayed at the same time. The graphic object 1230 is linked with a function for transmitting the execution screen 1220 of the file to the wearable device 300.

When a touch is applied to the graphic object 1230, the mobile terminal 100 edits the execution screen 1220 of the file to be suitable to the characteristics of the wearable device 300 to generate a new electronic document. The electronic document may include various screen information which is displayable on the touch screen 151. For example, the electronic document may include a web page, a digital image, a word processing, a spreadsheet, a presentation document, a PDF document, a flash image, and the like.

The electronic document may include a document length and a document width. Here, when at least one of the document length and width of an electronic document exceeds a display area of the touch screen 151, at least part of the electronic document may not be displayed. In other words, when at least one of the document length and width of an electronic document exceeds a display area of a flexible display unit 251, one portion of the electronic document is displayed but the other remaining portion other than the one portion is not displayed.

On the other hand, the mobile terminal 100 receives characteristic information on the touch screen 351 of the wearable device 300 from the wearable device 300. Furthermore, the mobile terminal 100 generates the new electronic document based on the received characteristic information.

For example, the document width of the electronic document may be adjusted to be suitable to a horizontal length of the touch screen 351. In this case, the area of the new electronic document may be reduced than that of the electronic document, and the size of a content contained in the electronic document may be also reduced. Otherwise, the area of the new electronic document and the area of the electronic document are the same, but the length of the new electronic document may be larger than that of the electronic document.

For another example, the mobile terminal 100 may divide the electronic document into a portion from which text can be extracted and a portion from which text cannot be extracted, and collect portions from which text can be extracted to generate a text file, and collect portions from which text cannot be extracted to generate at least one image file. The new electronic document may include the text file and the at least one image file.

The mobile terminal 100 transmits data corresponding to the new electronic document to the wearable device 300 to display the generated new electronic document on the wearable device 300. The wearable device 300 may display at least a portion 1240 of the new electronic document or store the new electronic document in the memory based on the received data.

Referring to FIG. 12C, a portion 1220 of the electronic document may be displayed on the touch screen 151 of the mobile terminal, and a portion 1240 of the new electronic document may be displayed on the touch screen 351 of the wearable device.

Here, the wearable device 300 may display a graphic object 1260 linked with a scroll function on an edge of the touch screen 351. According to a location at which the graphic object 1260 is displayed, a portion at which the new electronic document is displayed on the touch screen 351 varies. More specifically, one position on an edge of the touch screen 351 is set to a start position. As it is located away from the start position in a clockwise direction along the edge of the touch screen 351, an amount of information being scrolled is increased. For example, an upper portion of the new electronic document may be displayed when the graphic object 1260 is displayed at the start position, and a lower portion of the new electronic document may be displayed when the graphic object 1260 is rotated one revolution in a clockwise direction from the start position.

The mobile terminal 100 may display an indicator 1220, 1250 indicating a portion displayed on the wearable device 300 as a portion displayed on the wearable device 300 varies on the new electronic document. More specifically, a portion 1220 of the electronic document may be displayed on the mobile terminal 100, and the indicator 1220, 1250 may be displayed at a portion corresponding to the portion displayed on the wearable device 300, thereby enhancing the user's convenience.

On the other hand, when an execution screen of a file that is non-executable on the wearable device 300 is displayed on the mobile terminal 100, the mobile terminal 100 may convert the file into a data format which is executable on the wearable device 300 to transmit the converted file to the wearable device 300.

The operation of a mobile terminal for converting a file to a data format which is executable on a wearable device and transmitting the converted file will be described in detail with reference to FIGS. 13 and 13B.

The mobile terminal 100 may receive and execute a file which is non-executable on the wearable device 300, and display the resultant execution screen 1310. At this time, the mobile terminal 100 may provide a "file resend function" for converting the file into a data format which is executable on the wearable device 300 to transmit the converted file.

More specifically, when the execution screen 1310 of the file is displayed, the mobile terminal 100 may display a graphic object 1320 formed to execute a "file resend function" on the execution screen 1310. As a touch is applied to the graphic object 1320, the file resend function is carried out.

When the file resend function is carried out, the mobile terminal 100 converts the file into a file which is executable on the wearable device 300. For example, the mobile terminal 100 may convert a flash file or video file into a GIF file, and convert a word processor file, such as a PDF file into a TXT file, and/or an image file (jpg, gif) which is executable on the wearable device 300. Furthermore, the mobile terminal 100 may immediately transmit the converted file to the wearable device 300 or transmit it to a preset server such as a cloud server. As a result, the user may convert a file that is non-executable on the wearable device 300 using the mobile terminal 100 to use it on the wearable device 300.

On the other hand, when the file resend function is carried out, the mobile terminal 100 may divide an execution screen of the file into a plurality of pages in consideration of the touch screen characteristics (horizontal length and vertical length) of the wearable device 300, and transmit the divided pages to the wearable device 300.

More specifically, the mobile terminal 100 may adjust the size according to the horizontal length of the touch screen 351 of the wearable device 300, and divide the size-adjusted electronic document into a plurality of pages according to the vertical length of the touch screen 351. Then, the mobile terminal 100 captures the divided pages to generate a plurality of images, and transmits the generated images to the wearable device 300. The wearable device 300 may sequentially display the plurality of images to generate an effect such as executing a file that is non-executable on the wearable device 300.

Figure 13A:
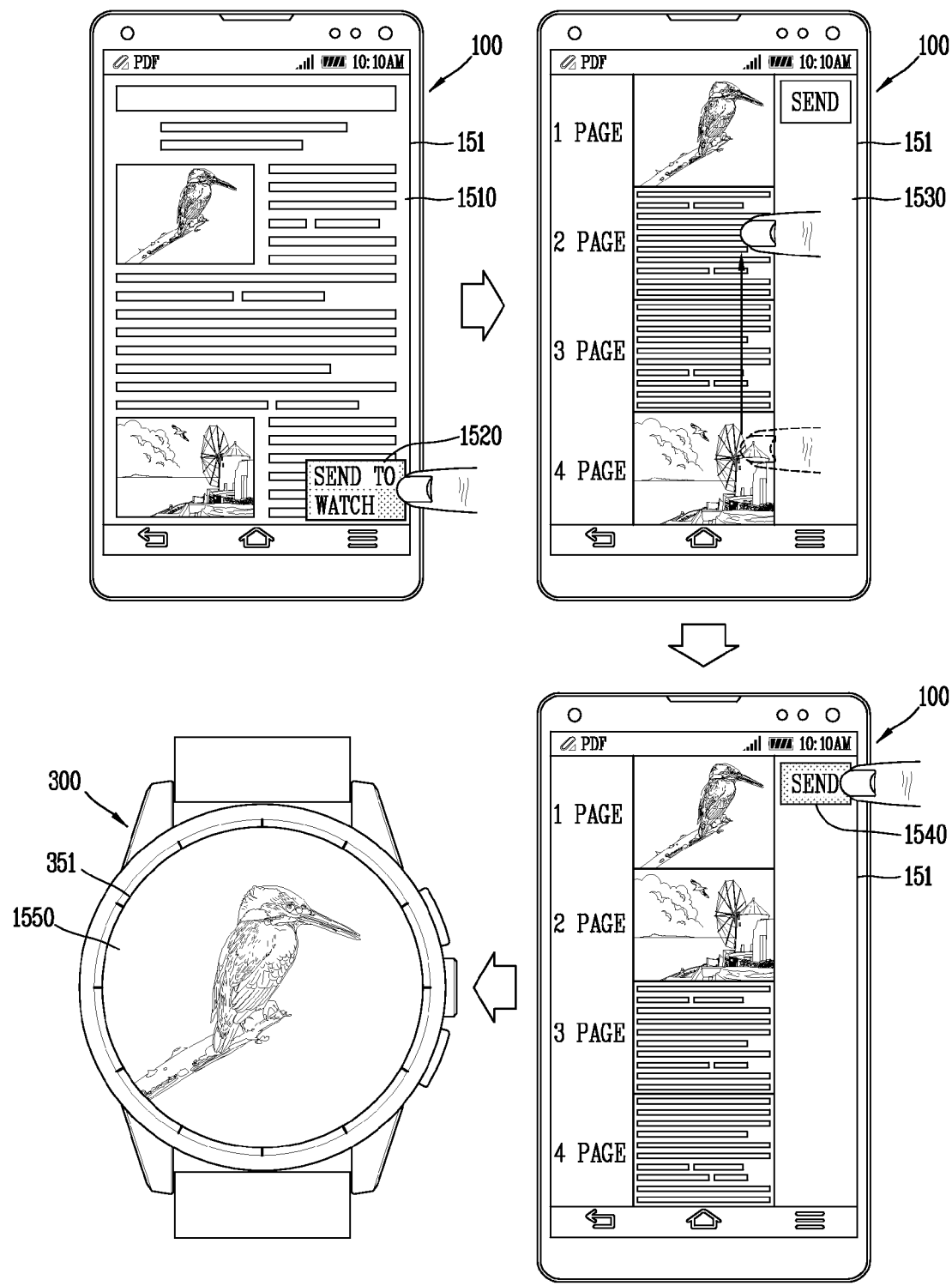
FIGS. 13A and 13B are conceptual views for explaining the operation of a mobile terminal for converting a file to a data format which is executable on a wearable device and transmitting the converted file.

On the other hand, the divided pages may be generated in a sequence to be displayed, and as illustrated in FIG. 13A, the sequence of at least one of the divided pages to be displayed may be changed or deleted by a user input.

Figure 13B:
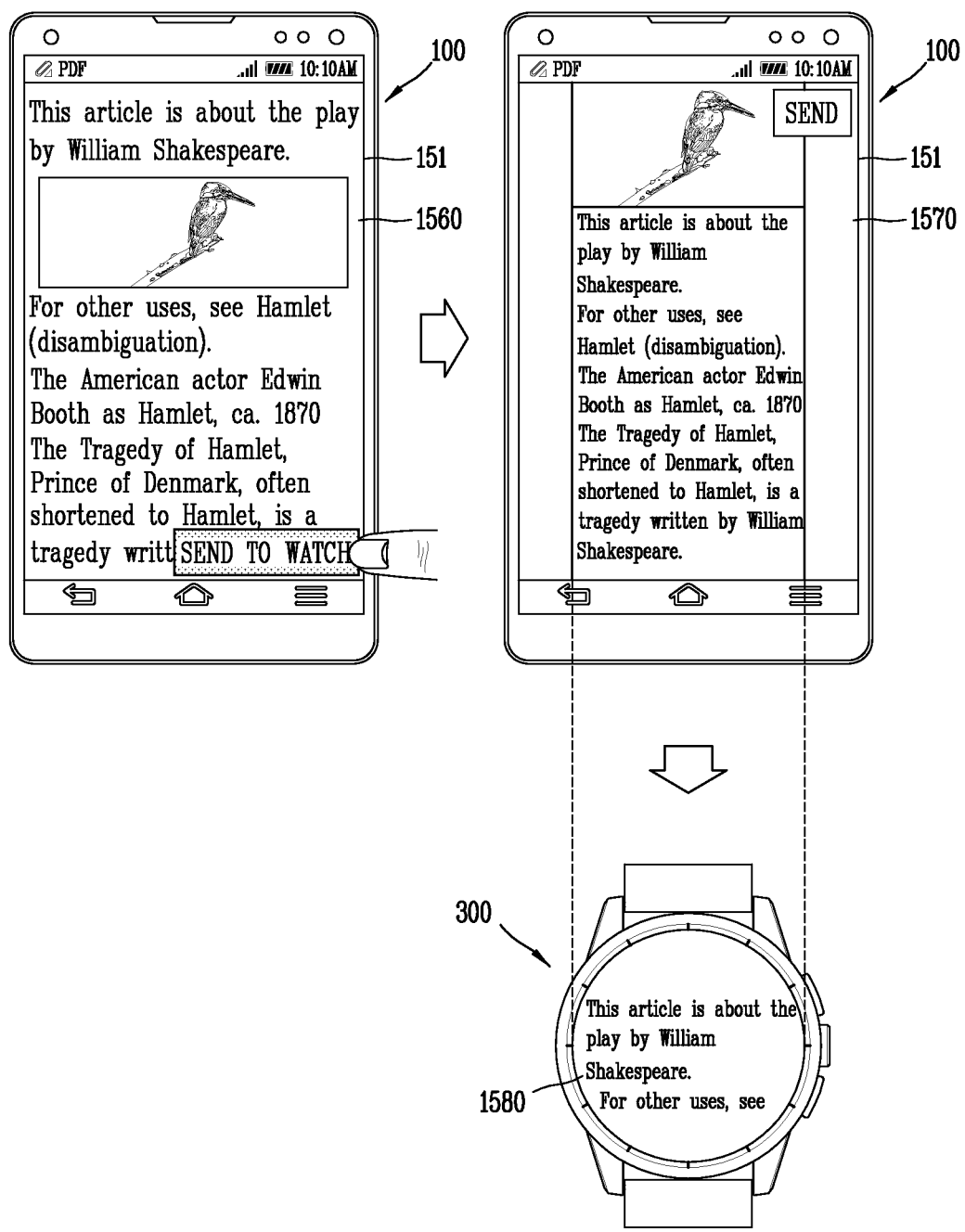

When the file resend function is carried out, as illustrated in FIG. 13B, the mobile terminal 100 may convert an execution screen 1560 of a file that is non-executable on the wearable device 300 into a new electronic document in consideration of the touch screen characteristics (horizontal length, vertical length, etc.) of the wearable device 300. For example, the mobile terminal 100 may convert a document width of the execution screen 1560 according to the horizontal length of the touch screen 351 of the wearable device 300 to generate the new electronic document. In other words, the mobile terminal 100 may adjust the document width of the electronic document according to the horizontal length of the touch screen 351 of the wearable device 300. As a result, text contained in the new electronic document may be rearranged or the size of text may be adjusted.

More specifically, the mobile terminal 100 divides the electronic document into a portion from which text can be extracted and a portion from which text cannot be extracted, and collect portions from which text can be extracted to generate a text screen, and collect portions from which text cannot be extracted to generate an image screen. The new electronic document may include the text screen and the image screen.

The text screen may include text contained in the electronic document, but is characterized in that the layout and size of text is changed according to the characteristics of the touch screen 351 of the wearable device 300. Here, text denotes a character, a symbol, a number and the like, which can be temporarily stored in the memory due to a copy function.

The image screen may include a portion other than text contained in the electronic document. The portion other than the text may denote all types of information excluding the text, for example, an image, a video, a flash, and the like. The mobile terminal 100 may capture a portion other than text to extract an image file that can be executed by the wearable device 300 or convert it to an image screen that can be displayed by the wearable device 300 using pre-installed software or the like.

As the new electronic document is generated, the mobile terminal 100 displays a portion of the generated electronic document on the touch screen 151 of the mobile terminal 100. Furthermore, the mobile terminal 100 transmits data corresponding to the new electronic document to the wearable device 300 to display the generated new electronic document on the wearable device 300. The wearable device 300 may display at least a portion 1240 of the new electronic document or store the new electronic document in the memory based on the received data.

Figure 14A:
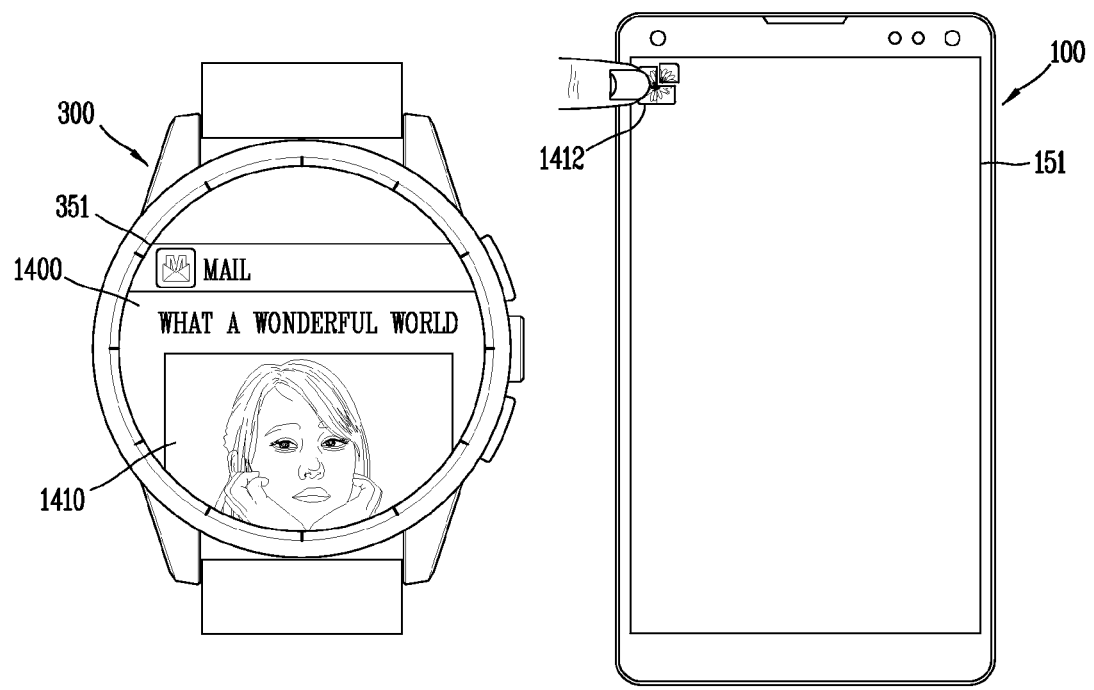
FIGS. 14A and 14B are conceptual views for explaining the operation of a wearable device and a mobile terminal when an image is displayed on the wearable device.
Figure 14A:
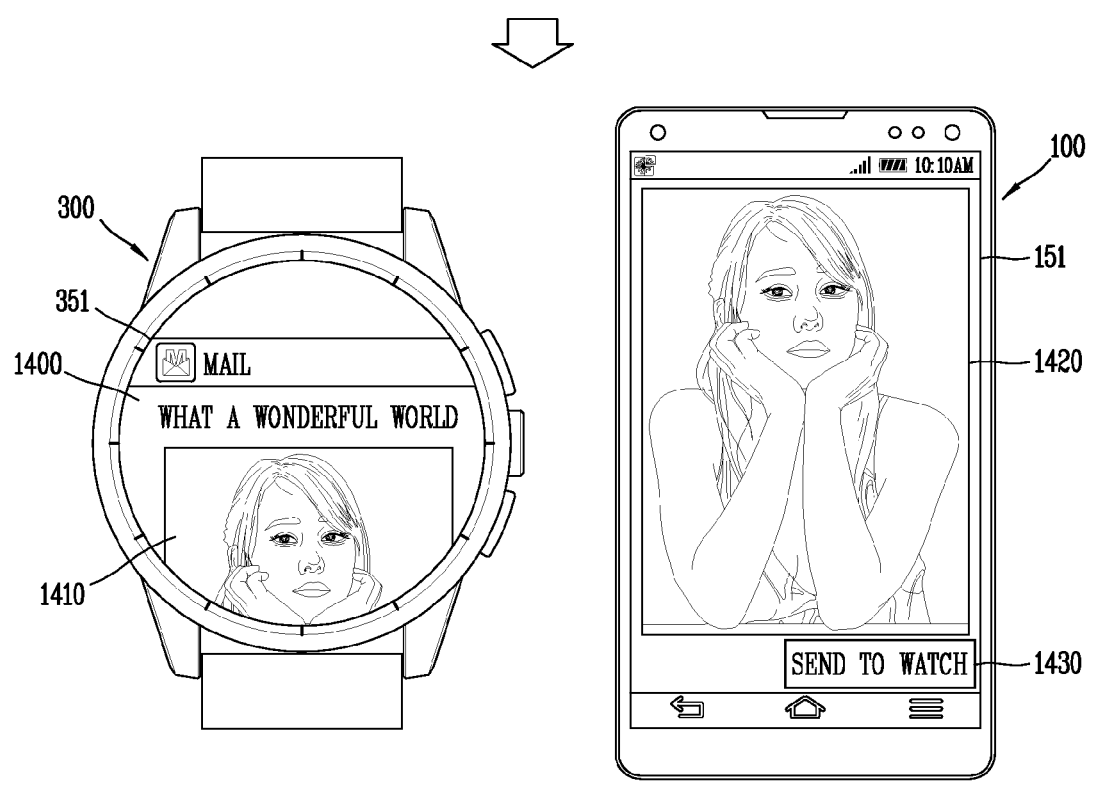
Figure 14B:
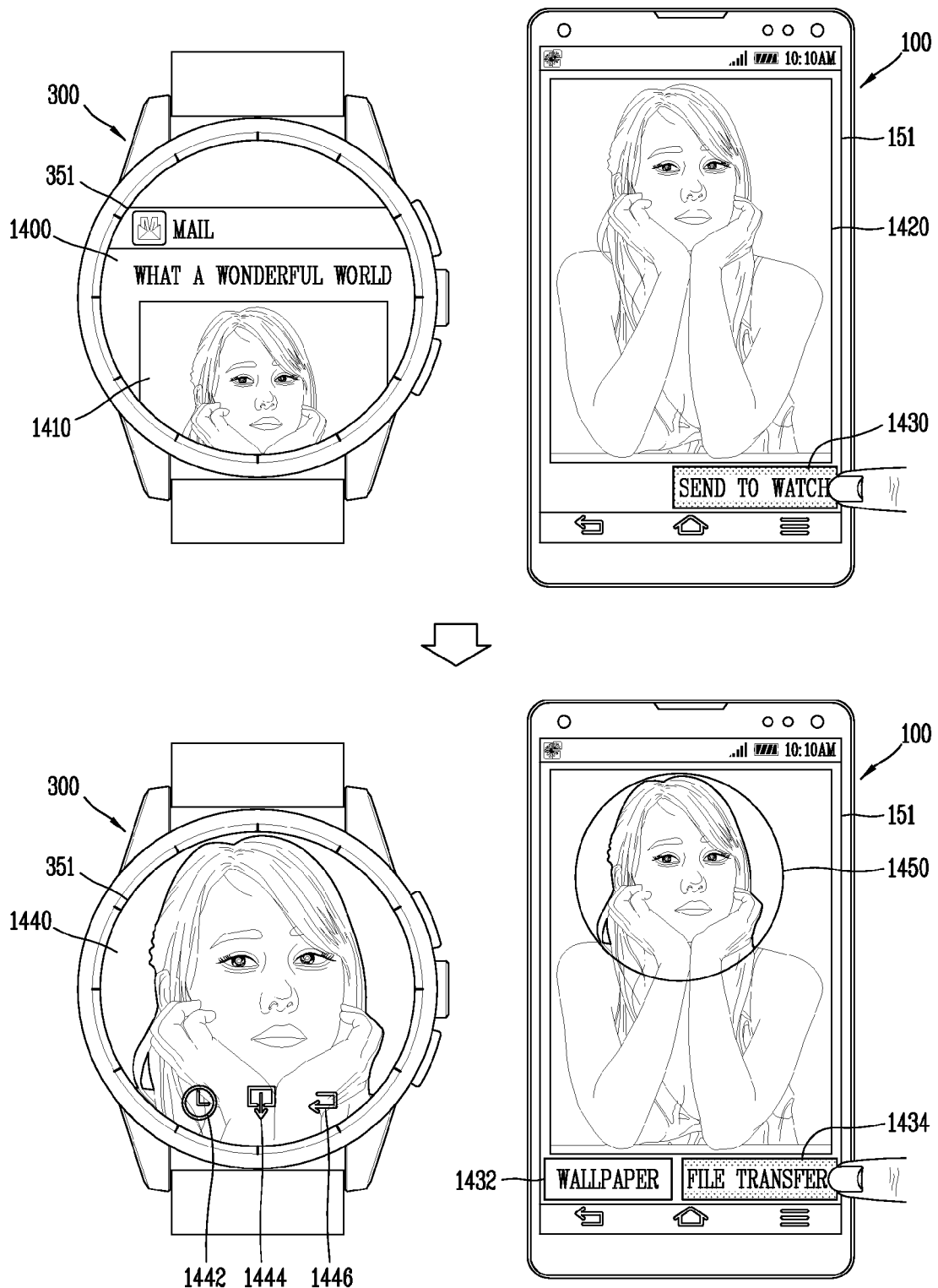

FIGS. 14A and 14B are conceptual views for explaining the operation of a wearable device and a mobile terminal when an image is displayed on the wearable device.

As illustrated in FIG. 14A, screen information 1400 is displayed on the touch screen 351 of the wearable device 300, and the screen information 1400 may include an image 1120. In this case, the mobile terminal 100 may display visual information 1412 corresponding to the image 1410.

When a touch is applied to the visual information 1412, the mobile terminal 100 may receive the image 1410 from the wearable device 300, and transmit the received image 1420. At this time, the mobile terminal 100 may adjust and display the size of the image according to the size of the touch screen 151. Since the touch screen 151 of the mobile terminal 100 is larger than the touch screen 351 of the wearable device 300, the user can check the image on a larger screen.

On the other hand, as illustrated in FIG. 14B, when an image is displayed on the mobile terminal 100, a function of editing the image in consideration of the characteristics of the touch screen 351 of the wearable device 300 may be provided. More specifically, since the touch screen 351 of the wearable device 300 has a circular shape, when a rectangular image is displayed, a portion of the image may be cut or a margin may be created on a portion of the touch screen. An image edit function may be carried out on the wearable device 300, but there is inconvenience in editing since the touch screen 351 of the wearable device 300 is small. Accordingly, when a received image is displayed on the wearable device 300, the mobile terminal 100 according to the present disclosure provides an image edit function.

For example, when an image received from the wearable device 300 is displayed, the mobile terminal 100 provide a menu such as "send to watch." When the menu is selected by the user, the mobile terminal 100 displays a circular-shaped indicator 1450 having the same size as that of the touch screen 351 of the wearable device 300 along with the image. The user may edit an image according to his or her preference while adjusting the size of the image with a pinch-in or pinch-out gesture or adjusting the location of the circular-shaped indicator 1450 with a drag input. Since the circular-shaped indicator 1450 is displayed, the user may generate an image perfectly fit to the touch screen 351 of the wearable device 300.

Figure 15A:
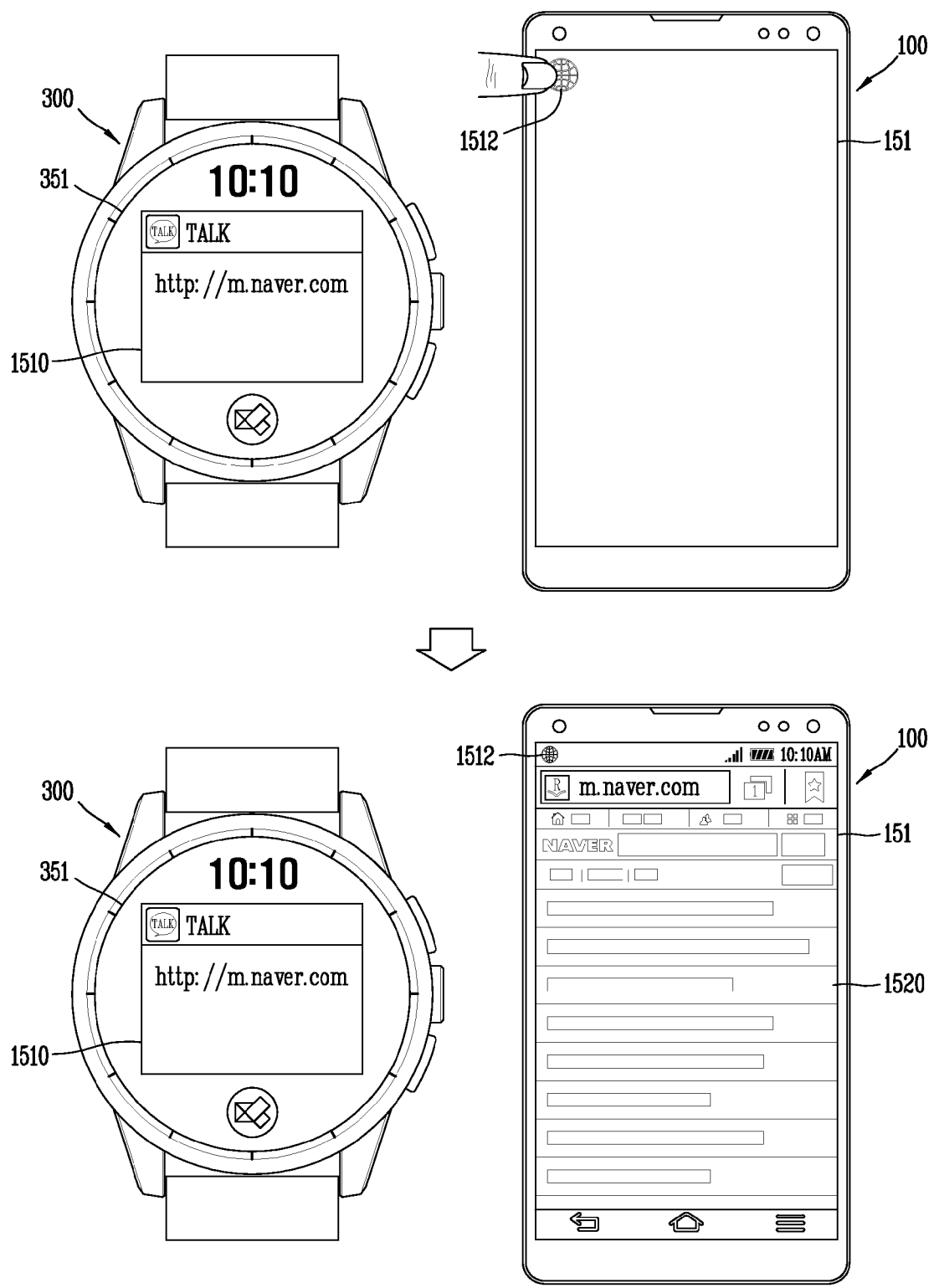
FIGS. 15A and 15B are conceptual views for explaining the operation of a wearable device and a mobile terminal when a URL is displayed on the wearable device.
Figure 15B:
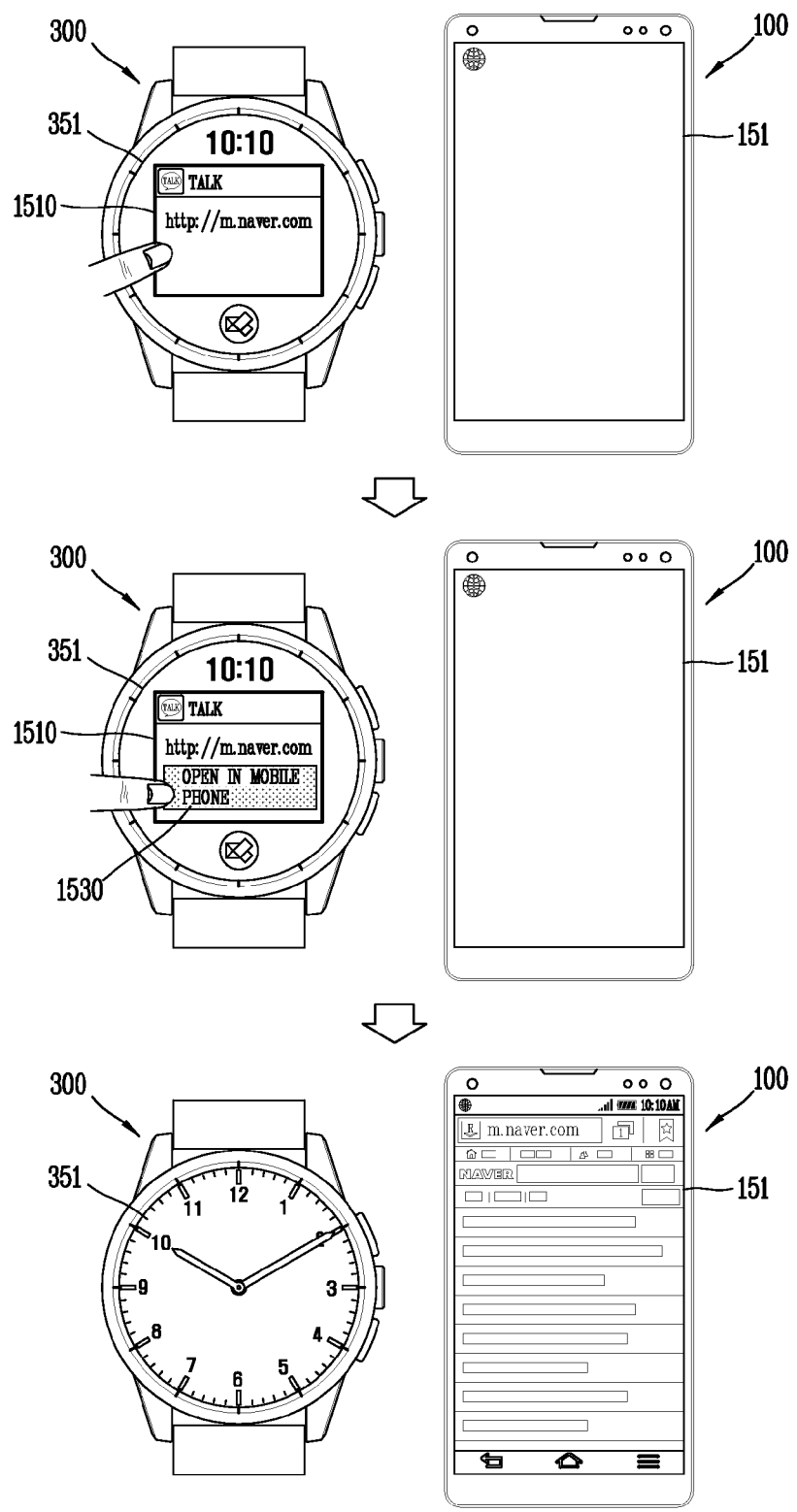

FIGS. 15A and 15B are conceptual views for explaining the operation of a wearable device and a mobile terminal when a URL is displayed on the wearable device.

As illustrated in FIG. 15A, when a URL is displayed on the wearable device 300, the mobile terminal 100 may display visual information indicating that an URL is being displayed on the wearable device 300 in at least one region of the touch screen 151. The visual information may be a browser icon 1512.

When a touch is applied to the browser icon 1512, the mobile terminal 100 displays a web document 1520 corresponding to the URL. As a result, the user may check a URL using the touch screen 351 of the wearable device 300, and check a web document using the touch screen 151 of the mobile terminal 100.

On the other hand, as illustrated in FIG. 15B, when a touch is applied to a URL, the wearable device 300 may display a graphic object 1530 formed to immediately display a web document corresponding to the URL on the mobile terminal 100. When a touch is applied to the graphic object 1530, the wearable device 300 ends the display of the URL, and displays time information. The mobile terminal 100 display a web document corresponding to the URL on the entire region of the touch screen 151. As a result, the user may execute an operation to be carried out on the wearable device 300 on the mobile terminal 100, thereby continuously performing the operation.

The wearable device 300 according to the present disclosure transmits notification information to the mobile terminal 100 in response to the display of information satisfying a preset condition, and the mobile terminal 100 displays visual information corresponding to the information satisfying the preset condition in response to the notification information. Moreover, the mobile terminal 100 displays the preset screen information in response to a touch being applied to the visual information. As a result, the user may use a function associated with information that has been displayed on the wearable device 300 on the mobile terminal 100 in an easy and fast manner.

On the other hand, according to the present disclosure, the preset screen information may be displayed on the mobile terminal 100 even when a touch is not applied to the visual information. More specifically, when a preset gesture is sensed on either one of the wearable device 300 and mobile terminal 100 in a state that information satisfying a preset condition is displayed, the preset screen information may be displayed on the mobile terminal 100. The detailed operation associated with this will be described below.

Figure 16A:
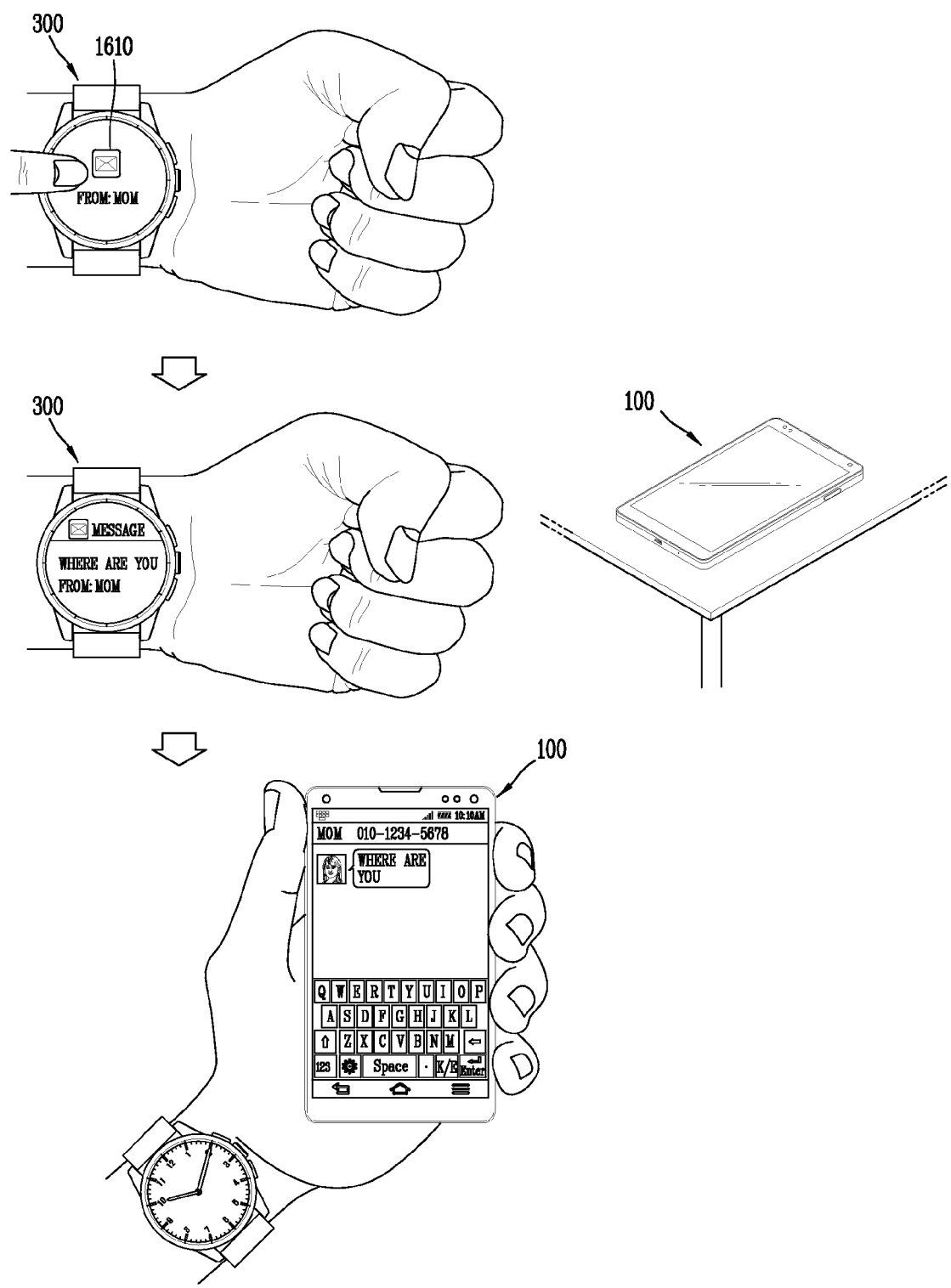
FIG. 16A is a conceptual view for explaining the operation of a mobile terminal and a wearable device corresponding to a gesture received at the mobile terminal.
Figure 16B:
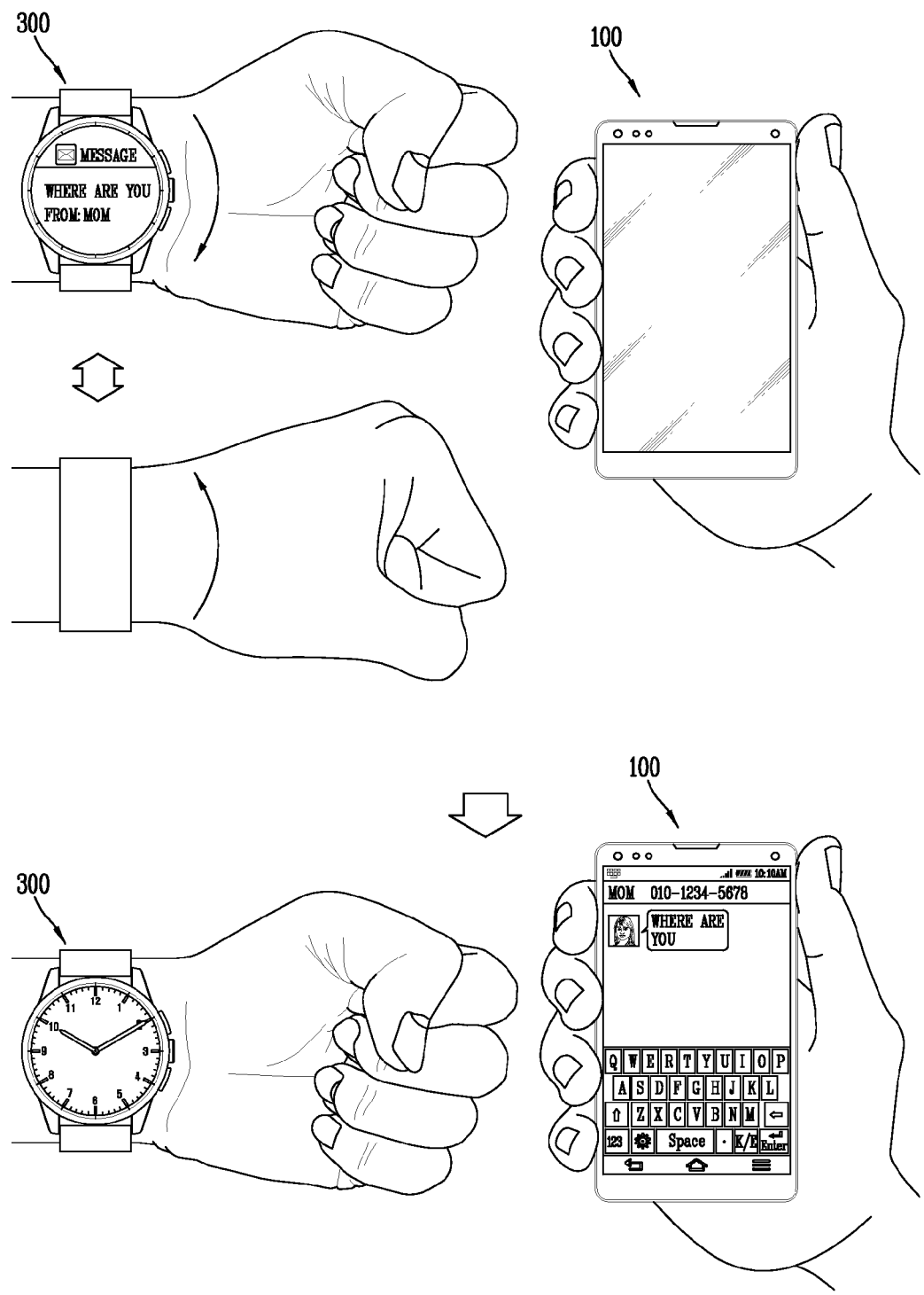
FIGS. 16B, 16C and 16D are conceptual views for explaining the operation of a wearable device and a mobile terminal corresponding to a gesture received at the wearable device.
Figure 16C:
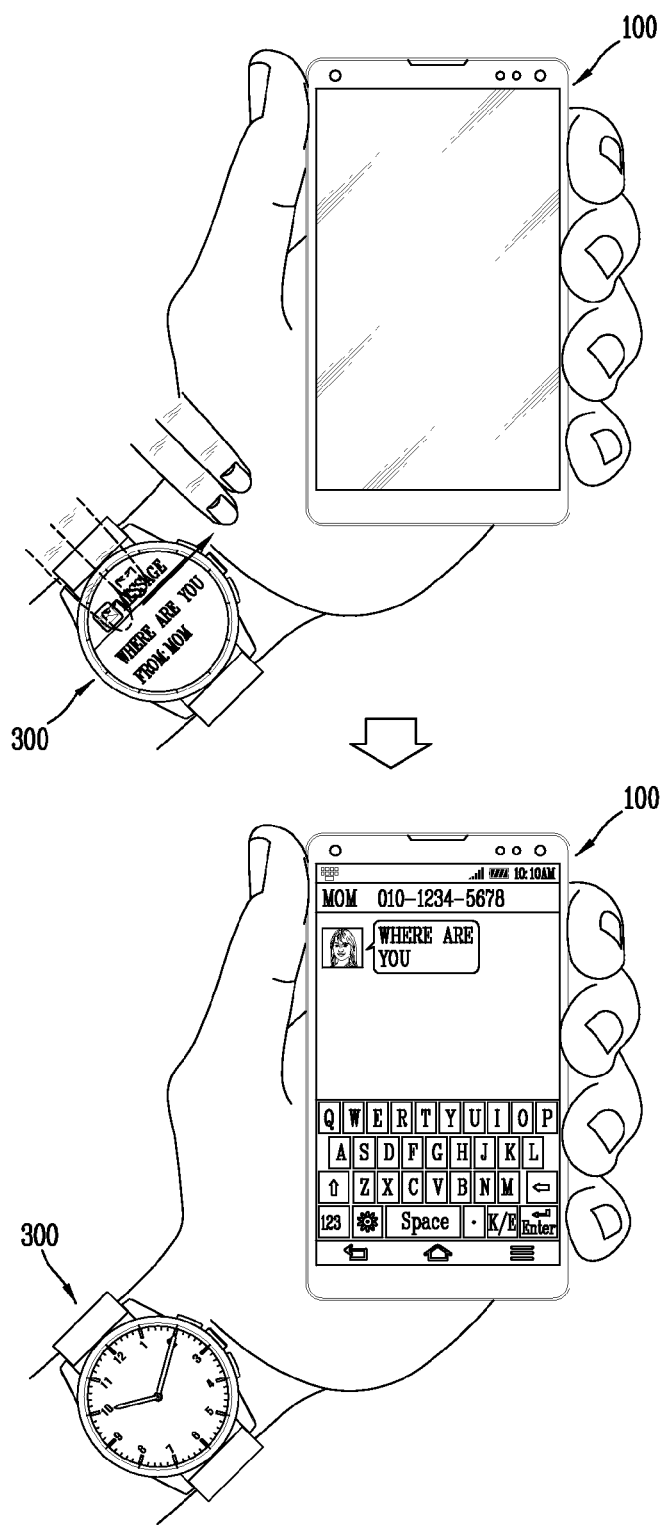
Figure 16D:
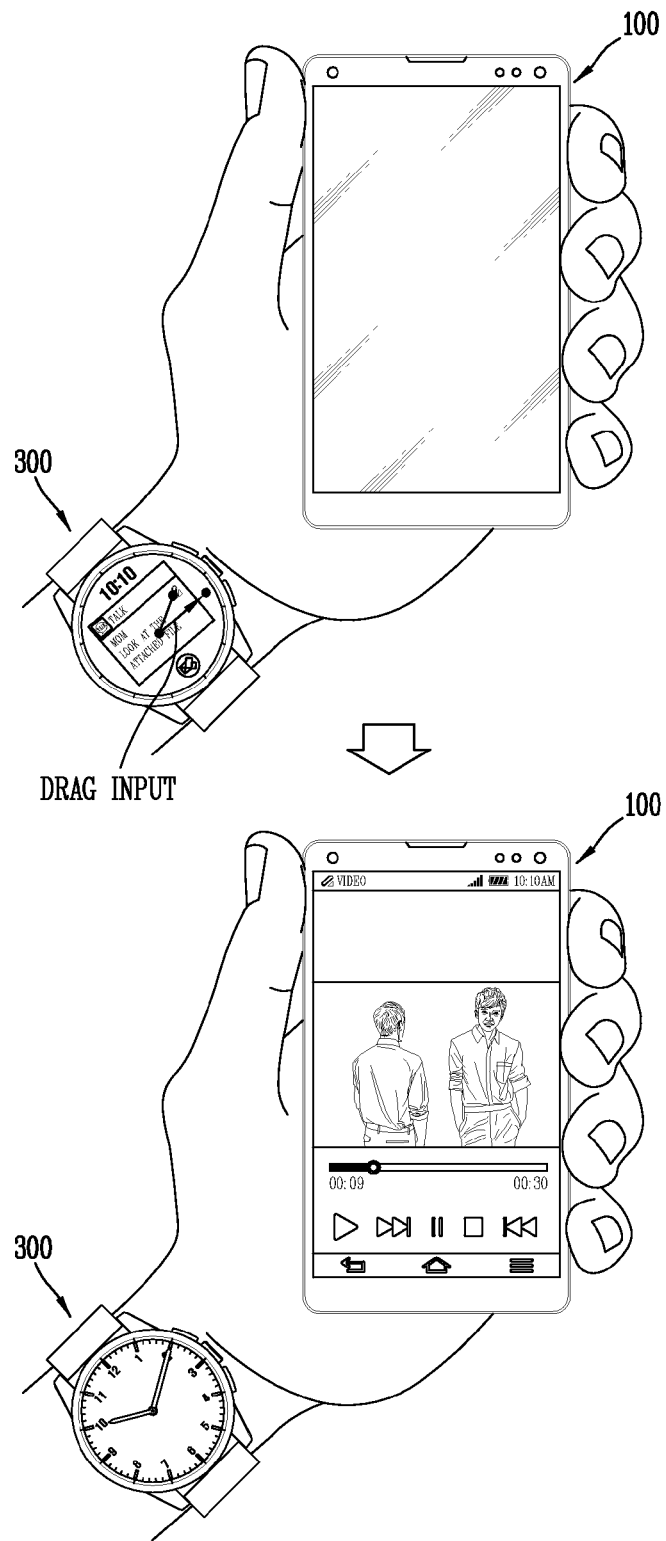

FIG. 16A is a conceptual view for explaining the operation of a mobile terminal and a wearable device corresponding to a gesture received at the mobile terminal, and FIGS. 16B, 16C and 16D are conceptual views for explaining the operation of a wearable device and a mobile terminal corresponding to a gesture received at the wearable device.

Referring to FIG. 16A, when an event occurs from at least one application on the wearable device 300, the controller displays a notification icon 1610 indicating the event on the touch screen 351.

According to the present example, the notification icon 1610 may indicate the arrival of a message, and when a user applies a touch input to the notification icon 1610, the wearable device 300 displays information associated with the event on the touch screen 351. The information associated with the event is at least part of the message content, and it may be also displayed in a preview manner. However, the notification icon 1610 according to the arrival of a message is only an example, and various events may occur from various applications on the wearable device 300.

In a state that information associated with the event is displayed on the touch screen 351 of the wearable device 300, the mobile terminal 100 may sense a preset gesture. At this time, the mobile terminal 100 displays information associated with the event on the touch screen 151 of the mobile terminal 100, and the wearable device 300 ends the display of information associated with the event in response to the preset movement. Here, the wearable device 300 may display time information instead of information associated with the event. Such a function is referred to as a "output device change function."

Here, a preset gesture may be a movement of being held on a user's hand in a state that the mobile terminal 100 is placed in a user' bag or pocket, on a table or the like. Otherwise, it may be a movement allowing the mobile terminal 100 and wearable device 300 to be closer to each other.

For another example, referring to FIG. 16B, the preset gesture may be a movement of rotating a wrist on which the wearable device 300 is worn and then returning it back in an original direction. More specifically, it may be a movement of rotating the touch screen 351 of the wearable device 300 from a first configuration facing a first direction to a second configuration facing a second direction on the basis of a gravity direction, and then returning it back to the first configuration.

The mobile terminal 100 and wearable device 300 may include the sensing unit 140 illustrated above in FIG. 1, respectively, to determine whether or not the movement of the body matches the preset movement using a signal generated from the sensing unit 140.

For another example, referring to FIG. 16C, the preset gesture may be a drag input started from one position of the wearable device 300 to continuously move in a direction at which the mobile terminal 100 is located.

The preset gesture may be limited to a drag input due to a multi-touch to distinguish it from a drag input for executing a scroll function. In other words, a scroll function is carried out when a drag input due to one finger is applied, and an output device change function may be carried out when a drag input due to a plurality of fingers is applied.

Consequently, when a preset gesture is sensed on at least one of the mobile terminal 100 and wearable device 300 in a state that information associated with an event occurred from any application is displayed on the wearable device 300, the wearable device 300 ends the display of the information associated with the event, and the mobile terminal 100 executes the any application to display the information associated with the event.

According to such a driving method, the user may apply a preset gesture to simply change a device for displaying message content from the wearable device 300 to the mobile terminal 100.

Furthermore, in the related art, there is a drawback in which several terminals are individually operated and thus it is not allowed to move a task that has been carried out in any one terminal as it is to the other terminal to be continuously operated, but the above example solves such a drawback.

In this manner, the mobile terminal 100 and wearable device 300 may perform a link operation due to a preset gesture, thereby providing a new type of user convenience.

On the other hand, as illustrated in FIG. 16D, when a first touch is applied to a graphic object formed to execute an attachment file, and a second touch started from the first touch and continuously moved to the center of the touch screen 351 is applied, and a third touch started from the second touch and continuously moved to a direction at which the mobile terminal 100 is located, the mobile terminal 100 may display an execution screen of the attachment file other than information associated with an event. For example, when the attachment file is a video file, a screen for playing the video may be displayed on the mobile terminal 100. A user may apply a different gesture to the wearable device 300, thereby controlling different screen information to be displayed on the mobile terminal 100.

Figure 17:
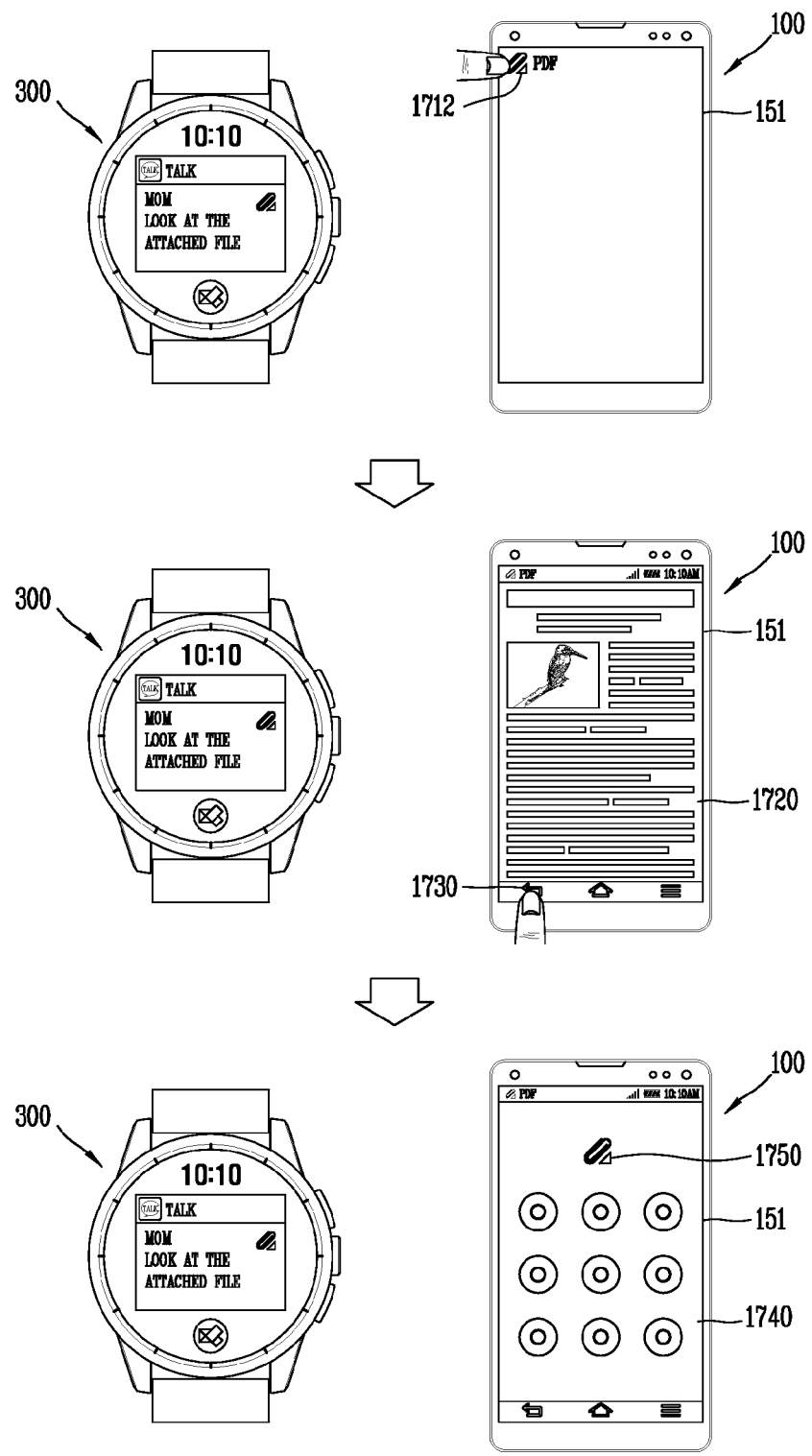
FIG. 17 is a conceptual view illustrating the control of a mobile terminal corresponding to the reception of notification information in a locked state.

FIG. 17 is a conceptual view illustrating the control of a mobile terminal corresponding to the reception of notification information in a locked state.

Referring to FIG. 17, an event may occur on at least one of the wearable device 300 and mobile terminal 100 in a situation that the mobile terminal 100 is in a locked state.

The locked state denotes a state in which at least one execution of applications which are executable on the mobile terminal 100 is restricted. Moreover, it denotes a state in which a preset gesture or password should be entered to solve the restriction. When the touch screen 151 is activated from the locked state, the mobile terminal 100 display a lock screen formed to enter the preset gesture or the password to the touch screen 151.

On the other hand, when notification information is received from the wearable device 300, the mobile terminal 100 displays visual information 1712 based on the notification information. In other words, when information satisfying a preset condition is displayed on the wearable device 300 in a locked state, the mobile terminal 100 displays visual information 1712 corresponding to information satisfying the preset condition other than the lock screen.

The mobile terminal 100 may display preset screen information in response to a touch applied to the visual information. For example, as illustrated in FIG. 17, when a message including an attachment file is displayed on the wearable device 300, an execution screen of the attachment file instead of the preset screen information may be displayed on the mobile terminal 100. The preset screen information has been described above, and thus the detailed description thereof will be omitted.

On the other hand, the mobile terminal 100 ends the display of the preset screen information 1720 due to a user request. For example, when a home button formed to display a home screen is touched or a back button 1730 formed to display a previous screen is touched, the mobile terminal 100 may end the display of the preset screen information 1720.

When the display of the preset screen information is ended in the locked state, the wearable device 300 displays a lock screen. For example, even when the home button is touched, the wearable device 300 displays the lock screen instead of the home screen while maintaining a locked state. For another example, as illustrated in FIG. 17, when the back button 1730 is touched, the wearable device 300 displays a lock screen 1740 since there exists no previous screen displayed other than the preset screen information in the locked state.

When a lock screen is displayed, the mobile terminal 100 may determine whether or not to display visual information according to whether or not information satisfying a preset condition is being displayed on the wearable device 300. For example, as illustrated in FIG. 17, when information satisfying a preset condition is being displayed on the wearable device 300, the lock screen 1740 includes visual information 1750 corresponding to the information satisfying the preset condition. On the contrary, when information satisfying a preset condition is not displayed on the wearable device 300, the visual information is not included on the lock screen 1740.

The mobile terminal 100 may display visual information indicating that information satisfying a preset condition is being displayed on the wearable device 300 or preset screen information corresponding thereto even in a locked state. However, the execution of an application is restricted in a locked state, a lock screen is displayed when the display of the preset screen information is ended. As a result, the execution of an application for which its execution is restricted against the user's intention may be prevented.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk drive (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A communication system comprising:
 a first terminal comprising a display and a first wireless communication unit; and
 a second terminal comprising a touch screen and a second wireless communication unit,
 wherein the second terminal is configured to:
  communicate with the first terminal wirelessly via the second wireless communication unit;
  display, via the touch screen, a first notification when an event associated with an application is detected;
  transmit a signal to the first terminal via the second wireless communication unit to cause the display of the first terminal to display a second notification indicating that the first notification is displayed on the touch screen of the second terminal; and
  display, via the touch screen, first information relating to the first notification in response to a touch input received via the touch screen displaying the first notification, and
 wherein the first terminal is configured to:
  display, via the display, a graphic object when the first information comprises a link associated with a file that cannot be executed at the second terminal, wherein the graphic object corresponds to the link;

display, via the display, an execution screen for executing the file in response to an input received via the graphic object;
convert a format of the file from a first format that is not executable at the second terminal to a second format that is executable at the second terminal; and
transmit the file, of which the format has been converted from the first format to the second format, to the second terminal via the first wireless communication unit.

2. The communication system of claim 1, wherein the first terminal is further configured to display, via the display, a third notification instead of the second notification when an execution screen of the application is displayed on the touch screen of the second terminal in response to an input received via the touch screen displaying the first notification, the third notification informing presence of extra information associated with the execution screen and a type of the extra information.

3. The communication system of claim 1, wherein the second terminal is further configured to display, via the touch screen, an icon for performing a function related to the first information while the first information is displayed on the touch screen.

4. The communication system of claim 3, wherein:
the second terminal is further configured to display, via the touch screen, a first virtual keypad in response to an input received via the icon; and
the first terminal is further configured to display via the display:
an indicator indicating the displaying of the first virtual keypad on the touch screen of the second terminal; and
a second virtual keypad in response to an input applied via the indicator such that the second virtual keypad is displayed on the display of the first terminal while the first virtual keypad is displayed on the touch screen of the second terminal.

5. The communication system of claim 4, wherein:
the first terminal is further configured to display, via the display, first text generated according to an input applied via the second virtual keypad; and
the second terminal is further configured to display, via the touch screen, second text corresponding to the first text based on data relating to the first text, the data received from the first terminal.

6. The communication system of claim 1, wherein:
the second terminal is further configured to generate and transmit a notification end command to the first terminal when the first notification or information associated with the first notification is no longer displayed on the touch screen; and
the first terminal is further configured to stop the displaying, via the display, of the second notification or information related to the first notification or the second notification in response to the notification end command.

7. The communication system of claim 6, wherein the first notification or the information associated with the first notification is no longer displayed on the touch screen of the second terminal in response to an input received at the second terminal such that the notification end command is transmitted to the first terminal in response to the input.

8. A mobile terminal comprising:
a wireless communication unit configured to communicate with a second terminal;
a touch screen; and
a controller configured to:
cause the touch screen to display a second notification in response to a signal received from the second terminal displaying a first notification, the first notification displayed at the second terminal when an event associated with an application is detected, and the second notification indicating that the first notification is displayed at the second terminal, wherein first information relating to the first notification is displayed at the second terminal;
cause the touch screen to display a graphic object when the first information displayed at the second terminal comprises a link associated with a file that cannot be executed at the second terminal, wherein the graphic object corresponds to the link;
cause the touch screen to display an execution screen for executing the file in response to a touch input received via the link;
convert a format of the file from a first format that is not executable at the second terminal to a second format that is executable at the second terminal; and
cause the wireless communication unit to transmit the file, of which the format has been converted from the first format to the second format, to the second terminal.

9. The mobile terminal of claim 8, wherein the controller is further configured to cause the touch screen to display a third notification instead of the second notification when an execution screen of the application is displayed at the second terminal in response to an input received at the second terminal displaying the first notification, the third notification informing presence of extra information associated with the execution screen and a type of the extra information.

10. The mobile terminal of claim 8, wherein the controller is further configured to cause the touch screen to display first information relating to the second notification in response a touch input applied to the touch screen displaying the second notification, the touch input applied while the first notification is displayed at the second terminal, and the displaying of the first information on the touch screen causing the second terminal to stop the displaying of the first notification at the second terminal.

11. The mobile terminal of claim 8, wherein when the second terminal displays a first virtual keypad for performing a function related to the first notification, the controller is further configured to cause the touch screen to display:
an indicator indicating the displaying of the first virtual keypad at the second terminal; and
a second virtual keypad in response to an input applied via the indicator such that the second virtual keypad is displayed on the touch screen while the first virtual keypad is displayed at the second terminal.

12. The mobile terminal of claim 11, wherein the controller is further configured to:
cause the touch screen to display first text generated in response to an input applied via the second virtual keypad; and
transmit data relating to the first text to the second terminal such that second text corresponding to the first text is displayed at the second terminal based on the data.

13. The mobile terminal of claim 8, wherein the link is a uniform resource locator (URL), and the controller is further configured to cause the touch screen to display a web document corresponding to the URL as the execution screen in response to the touch input received via the link.

14. The mobile terminal of claim 8, wherein the signal is received when the touch screen is in an inactive state in which illumination is off, and the controller is further configured to:
  switch at least a portion of the touch screen to an active state in which illumination is on in response to the signal; and
  cause the touch screen to display the second notification in at least the portion of the touch screen that is in the active state.

15. The mobile terminal of claim 14, wherein the controller is further configured to:
  cause the touch screen to not display the second notification and switch the touch screen to the inactive state when the second terminal no longer displays the first notification or information associated with the first notification.

16. A wearable terminal, comprising:
  a touch screen;
  a wireless communication unit configured to communicate with a second terminal; and
  a controller configured to:
    receive a message via the wireless communication unit;
    cause the touch screen to display a first notification notifying the received message;
    cause the wireless communication unit to transmit a signal to the second terminal to notify the received message, wherein the signal causes the second terminal to display a second notification indicating that the first notification is displayed on the touch screen;
    cause the touch screen to display the message in response to a touch input received via the touch screen displaying the first notification; and
    cause the wireless communication unit to transmit a file or a link associated with the file to the second terminal when the message comprises the file that cannot be executed at the wearable terminal such that an execution screen of the file is displayed at the second terminal in response to an execution command for the file received at the second terminal.

17. The wearable terminal of claim 16, wherein the controller is further configured to cause the touch screen to display a graphic object associated with the execution screen displayed at the second terminal.

18. The wearable terminal of claim 17, wherein the controller is further configured to cause the wireless communication unit to transmit a control command to the second terminal to cause the second terminal to execute a control function linked to the graphic object in response a touch applied to the graphic object.

19. The wearable terminal of claim 16, wherein:
  the execution command is received via a graphic object displayed at the second terminal; and
  the graphic object corresponds to the link.

20. The wearable terminal of claim 16, wherein:
  a format of the file is converted at the second terminal from a first format that is not executable at the wearable terminal to a second format that is executable at the wearable terminal; and
  the controller is further configured to cause the wireless communication unit to receive the file, of which the format has been converted from the first format to the second format, from the second terminal.

\* \* \* \* \*